United States Patent [19]
Ryu et al.

[11] Patent Number: 5,481,718
[45] Date of Patent: Jan. 2, 1996

[54] OBJECT-ORIENTED SYSTEM HAVING OBJECT MODELS CONTAINING PLURAL OBJECTS WITH INSTANTIATION FOLLOWING STATIC CLASSIFICATION BY CLASS RELATIONSHIPS, DYNAMIC CLASSIFICATION BY TEMPORAL INSTANTIATION, AND CAUSALITY RESTRICTIONS

[75] Inventors: Tadamitsu Ryu, Kawasaki; Naomi Ichikawa, Yokohama; Masahiko Murakawa, Kawasaki; Takeshi Adachi; Masanobu Toyota, both of Kanagawa, all of Japan

[73] Assignee: Fujitsu Limited, Kawasaki, Japan

[21] Appl. No.: 246,430

[22] Filed: May 20, 1994

[30] Foreign Application Priority Data

May 21, 1993 [JP] Japan .................................. 5-119457

[51] Int. Cl.$^6$ .................................................. G06F 9/00
[52] U.S. Cl. .............................. 395/700; 364/DIG. 2; 364/280; 364/280.4; 395/650
[58] Field of Search ................................ 395/700, 650, 395/280, 280.4

[56] References Cited

U.S. PATENT DOCUMENTS

| | | | |
|---|---|---|---|
| 4,525,780 | 6/1985 | Bratt et al. | 364/200 |
| 4,658,351 | 4/1987 | Teng | 364/200 |
| 4,805,107 | 2/1989 | Kieckhafer et al. | 364/200 |
| 5,325,526 | 6/1994 | Cameron et al. | 364/650 |

*Primary Examiner*—Kevin A. Kriess
*Assistant Examiner*—Jonathan Hall Backenstose
*Attorney, Agent, or Firm*—Staas & Halsey

[57] ABSTRACT

An object-oriented data processing system performs a desired processing based upon an object model including a plurality of objects each formed of data and methods. The data processing system includes an external definition that identifies the object and including an identifier for identifying the object, an internal definition for carrying out a procedure of the object and including an identifier corresponding to the identifier in the external definition, a model classification function for classifying the object model, based upon the external definition, into a static model that indicates a relationship between classes, and a dynamic model that indicates the time sequential relationship between instances forming the classes as a session, a causality restriction function that imposes a causality existing between the static model and the dynamic model, to the static model, a class generation function for creating the classes by combining existing and/or newly created methods; and an instance generation function for creating the instances in correspondence to each of the classes, wherein the class includes a composite class formed of a plurality of classes.

23 Claims, 48 Drawing Sheets

SEMANTIC CONV TABLE

| OBJ COM | CLASS NAME |
|---------|------------|
| 0 0 0 0 | A |
| 0 0 0 1 | A A |
| ⋮ | ⋮ |
| 0 1 F F | A C D D |
| ⋮ | ⋮ |

360

COMMUNICATION BETWEEN TERMINALS

FIG.34A
MESSAGE FORMAT
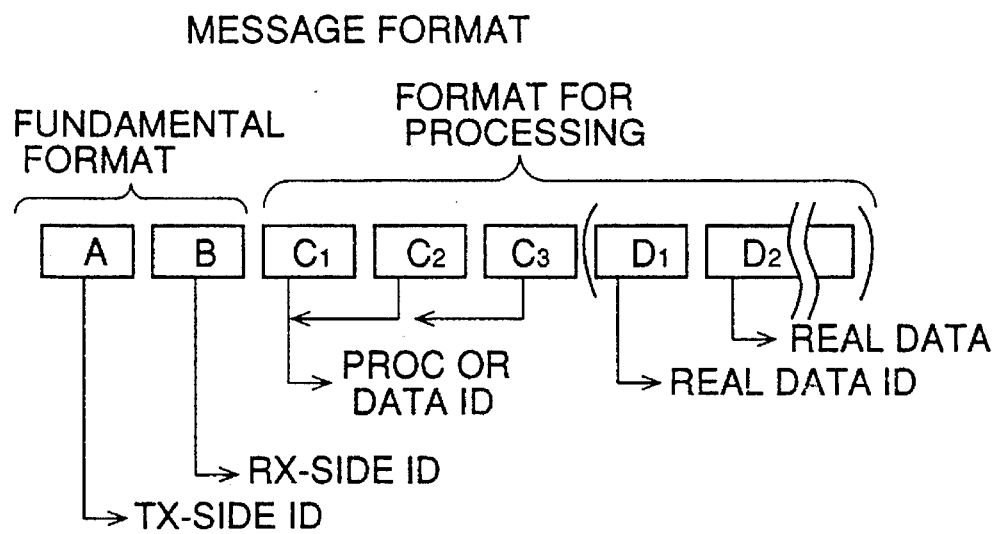
FIG.34B
MAIN LINE FORMAT
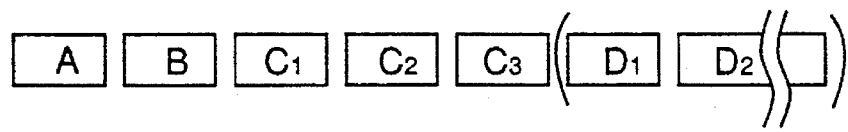
CONTROL LINE FORMAT
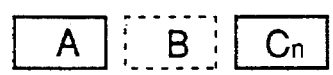
SUB LINE FORMAT
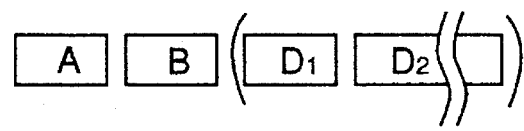

OBJECT-ORIENTED SYSTEM HAVING OBJECT MODELS CONTAINING PLURAL OBJECTS WITH INSTANTIATION FOLLOWING STATIC CLASSIFICATION BY CLASS RELATIONSHIPS, DYNAMIC CLASSIFICATION BY TEMPORAL INSTANTIATION, AND CAUSALITY RESTRICTIONS

BACKGROUND OF THE INVENTION

The present invention generally relates to object-oriented data processing systems, and more particularly to an object-oriented data processing system that describes the real world in terms of an object model.

In the object-oriented data processing system, the real world is grasped as an external definition and a corresponding internal definition, wherein the internal definition describes the details of the external definition. More specifically, the external definition includes iD information that identifies a corresponding internal definition, while the internal definition specified by the iD information is set in a concealed area which is concealed from outside. Thus, the real world is represented substantially by the external definitions only, in the form of an object world, while the object world generally includes a dynamic world and a static world. The static world includes classes and/or composite classes, wherein the classes and the composite classes provides the structure of the system. On the other hand, the dynamic world includes instances of the foregoing classes and/or composite classes, and these instances provide the motion of the dynamic world.

First, a description will be given with respect to an advantageous point of forming a capsule of objects, by referring to FIGS. 1A through 1C.

For example, executionable process data 214 are made up of a series of instructions (or instruction groups) 250 shown in FIG. 1A which are serialized in the processing sequence. A number of such instructions (or instruction groups) 250 form a processing unit 251 which executes a predetermined process or behavior.

Accordingly, the executionable process data 214 shown in FIG. 1A may be regarded as a collection of the processing units 251 which are serialized in the processing sequence as shown in FIG. 1B. The serialized executionable process data 214 shown in FIG. 1B as a whole carry out a specific operation. Hence, the executionable process data 214 for carrying out another specific operation is given as a connection of the processing units 251 having a different combination.

As the number of existing processing units 251 which make different behaviors becomes large, the individual processing units 251 are integrated under a predetermined method M as shown in FIG. 1C, so as to obtain an integrated processing unit group which carries out the same operation as the executionable process data 214 shown in FIG. 1B.

As a preliminary description, the relationship between object, object command and object component will be described.

First, a description will be given about the relationships between object, object command and object component.

FIG. 2 shows an example of the real world, that is, a model of company organization. Within a box representing "employees" in FIG. 2, there is a "secretary" belonging to a "work type=1," a "leader" belonging to a "work type=2," and a "worker" belonging to a "work type=3." A box representing "employees" belongs to a box representing a "team."

The "leader" is related to the "team" under the relationship "team leader." In addition, the "worker" is related to a "machine" under the relationship "worker/machine" within the box representing "work unit."

The "team" and the "machine" are related under the relationship "machine/workshop." The "worker" and the "machine" are related under the relationship "machine/worker." In addition, the "employee" and the "department/employee" are related under the relationship "department."

Furthermore, the "employee" and the "position" are related under the relationship "employee/attribute." The "work unit" and the "component" are related under the relationship "work unit/component."

The following relationships also exist.

(1) The "department" is related to the object "department name" and the object "dollars."
(2) The "team" is related to the object "name" by a team identification number, related to the object "employee number" by the work type, related to the object "code name" and the object "surname" by the name, related to the object "dollars" by the salary, related to the object "dollars" by the average salary, and related to the object "number" by the average number of departments.
(3) The "secretary" is related to the object "number" by the typing speed.
(4) The "position" is related to the object "name" by the name, and related to the object "year" by the age.
(5) The "component" is related to the object "component number" and the object "dollars."
(6) The "work unit/component" is related to the object "number" by the volume.
(7) The "work unit" is related to the object "time" by the required time.
(8) The "machine" is related to the object "machine number", the object "dollars" and the object "machine name."
(9) The "machine/work" is related to the object "time" by the time used.

The model shown in FIG. 2 can generally be represented as shown in FIG. 3 if the "behavior" (or method) is indicated by a circular box, the "data" is indicated by a rectangular box, and the "relationship" is indicated by a rhombic box. In other words, (1) a method "a" and data "I" are combined and function as one larger data "IV", (2) methods "b" and "c" are related to data "II" by a relationship "e" and function as one larger data "V", (3) methods "c" and "d" are related to data "III" by a relationship "β" and function as one larger data "VI" and (4) a method "e" are related to data "IV" and "V" by a relationship "τ" and function as still a larger data "VII". In other words, the behaviors (or methods) are gathered and represented as a larger group.

Each circular box, rectangular box and rhombic box shown in FIG. 3 can be treated as an individual object.

The forming of a capsule shown in FIG. 4A will now be considered for a collection of the method "a" and the data "I" shown in FIG. 3. In FIG. 4A, an opening is formed at the top of the capsule to indicate that a message communication can be made. If this opening of the capsule were closed as shown on the left side of FIG. 4B, such a capsule would then correspond to the data "IV" which is a collection of the method "a" and the data "I" in FIG. 3. If a composite object is obtained by adding a method "M" to the data "D" (capsule) shown on the left side of FIG. 4B, the data shown at the central part of FIG. 4B is obtained. Further, if a composite object is obtained by further adding a method to the data shown at the central part of FIG. 4B, the data shown on the right side of FIG. 4B is obtained. Hence, FIG. 4B shows the formation of composite objects shown in FIG. 4C by successively adding the methods.

The formation of the composite objects is not limited to that shown in FIG. 4B. For example, the composite objects may be formed as shown in FIG. 4C. In FIG. 4C, the data "D" of the object shown on the leftmost side is replaced by an object which is made up of a method and data, as shown on the second leftmost side. In this case, a message passing is required between a method "M1" and data "D1", and the method "M1" becomes one object as shown on the second rightmost side in FIG. 4C. As a result, objects "A" and "B" exist within an object "C" and the message passing exists between the objects "A" and "B".

Furthermore, if the method "M" of the object "B" is replaced by an object "B1" and the data "D" of the object "B" is replaced by an object "B2" both the object "B1" and "B2" exist within the object "B" and the message passing exists between the objects "B1" and "B2" as shown on the rightmost side in FIG. 4C.

Therefore, the composite objects are formed by successively combining the objects. For example, the so-called orimitive objects which will be described later are combined to form a capsule object, the capsule objects are combined to form an event object, and the event objects are combined to form a system object.

The data "D" described above is generally made up of a plurality of processing units which are the subject of the processing. On the other hand, the method "M" may be considered as information or information group instructing how the plurality of processing units are to be utilized. The objects represented in FIGS. 4A–4C represent a "processing unit" which is treated as an individual "processing unit" or a collection of "individual processing units".

As shown in FIG. 3, the individual objects "I", "II" and "III" form a part of the larger objects "IV", "V" and "VI" In addition, the objects "IV" "V" and "VI" form a part of still a larger object "VII". In other words the objects "IV", "V" and "VI" are in an "is-a" relationship or a "part-of" relationship with the object "VII" when viewed from the object "VII".

If the objects "I", "II" and "III" are regarded as minimum units, these objects "I", "II" and "III" may be said to be primitive objects. The capsule object is formed by a collection of such primitive objects. The event object is formed by a collection of such capsule objects. Furthermore, a still larger system object is formed by a collection of such event objects.

The objects described above which are made up of a collection of smaller objects are respectively referred to as composite object. The primitive object is included in the concept of the composite object. However, the primitive object is an object of the minimum unit as described above. For this reason, when a reference is generally made to a "composite object" or an "object", it is better to exclude the primitive object which exists by itself and cannot be decomposed further.

The object in the capsule form is generally made up of the composite objects described above in the capsule form.

The individual objects can be represented by the following model. That is, FIG. 5 is a diagram for explaining the object as a model.

An existence of the real world, such as a photograph, can be specified by the name which describes the photograph, and the nature of the photograph. The nature of the photograph indicates what kind of picture the photograph is, such as the person who took the picture and the time when the picture was taken. Hence, the photograph can be represented by a model using (i) the command which is used as the name specifying the photograph, (ii) the actual picture (entity data) of the photograph formed by black and white dots, and (iii) the link which describes the nature of the photograph, the location where the actual picture is stored, the relationship of the people in the photograph and the like.

The individual object described above can also be represented by a model such as that shown in FIG. 5 using the command, the link and the entity data.

FIG. 6 is a diagram for explaining the functions of the object as a model. As shown on the left side of FIG. 6, the object can be described using the command, the link and the entity data. It may be regarded that the dot data shown in FIG. 6 are given to the entity data. The capsule object, the event object and the system object are generally given a description specifying other objects X, Y and Z as the entity data, related to these other objects X, Y and Z, and use entity data x, y and z of these other objects X, Y and Z as shown on the right side of FIG. 6.

Thus, the real world is represented by a number of objects related with each other as indicated in FIG. 2, wherein each object represents a processing unit that may or may not include a number of subunits.

Based upon the foregoing analysis of the real world, attempts have been made to establish a relationship between information or aggregate of information and a corresponding processing.

In the case of conventional object-oriented languages, the "small-talk" is an example, one encounters following difficulties.

(a) The language is generally data-oriented in dealing with the resources.

(b) No design principle is given with regard to the attempt to handle new processing with a new objective or target.

(c) No substantial support is provided to the attempt of systematically considering the causality. The available instructions for realizing causality is applicable only within a class.

(d) The structure of the system can only be incorporated in the form of "is-a" relationship or "part-of" relationship (support of the "part-of" relationship is given by a language other than small-talk). No other support is provided.

(e) Setting of link is achieved by pointers, while such a process that uses the pointer is hardly effective for increasing the processing speed.

(f) No substantial support is provided to the composite objects. Although there are languages that support composite objects, the composite objects that are supported are generally limited to the objects that have a simple nest structure.

(g) While the system operates based upon method, which method defines the manner how to use individual information, the method available to the user is limited to those having a predetermined content. Without the method, the system does not operate. Further, the initialization of the system can be carried out only by those persons who know the content of the methods.

SUMMARY OF THE INVENTION

Accordingly, it is a general object of the present invention to provide a novel and useful object-oriented processing system wherein the foregoing problems are eliminated.

Another and more specific object of the present invention is to provide an object-oriented processing system that provides the following features.

In relation to the foregoing problem (a), the system of the present invention is capable of treating methods as an object in addition to data.

In relation to the foregoing problem (b), the system of the present invention is capable of carrying out designing by using the static model, dynamic model, and the functional model.

In relation to the foregoing problem (c), the system of the present invention is capable of handling causality within the class, in addition to the causality outside the class.

In relation to the foregoing problem (d), the system of the present invention is capable of using "relation" links and network links.

In relation to the foregoing problem (e), the system of the present invention is capable of realizing a practical processing speed with the use of high-speed internal schema.

In relation to the foregoing problem (f), the system of the present invention is capable of handling composite objects.

In relation to the foregoing problem (g), the system of the present invention provides autonomy to the methods such that a method can inform the operator of various conditions that the operator should know. As a result, the operator can easily handle the processing system.

Another object of the present invention is to provide an object-oriented data processing system for performing a desired processing based upon an object model, said object model including a plurality of objects combined with each other, each of said objects being formed of data and methods, said object-oriented data processing system comprising:

an external definition provided to each of said objects for identifying said object, said external definition including an identifier that identifies said object;

an internal definition provided to each of said objects for carrying out a procedure of said object, said internal definition including, in each of said objects, an identifier corresponding to said identifier of the same object in said external definition;

model classification means for classifying said object model, based upon said external definition, into a static model that indicates a relationship between classes, and a dynamic model that indicates the time sequential relationship between instances of said classes as a session;

causality restriction means that imposes a causality existing between said static model and said dynamic model, to said static model;

class generation means for creating said classes by combining existing and/or newly created methods; and instance generation means for creating said instances in correspondence to each of said classes;

said class including a composite class formed of a plurality of classes.

According to the present invention, it is possible to treat the methods as an object and carry out versatile processings, in response to various demands, by combining various objects, based upon the static model, the dynamic model and the functional model.

In the present invention, existing objects held in the concealed world or objects that are newly created are incorporated by the object command in accordance to the needs of the user, and the static model and the dynamic model are designed, in accordance with the needs of the user. Thus, the system of the present invention possesses a capability of flexibly complying with the demand of the user and a versatile processing becomes possible. Further, the object components thus created are accumulated for future reuse.

Other objects and further features of the present invention will become apparent from the following detailed description when read in conjunction with the attached drawings.

BRIEF DESCRIPTION OF THE DRAWINGS

FIGS. 31A–31C are diagrams showing the lateral relationship between the classes;

FIGS. 34A and 34B are diagrams showing a message format and a format for each of the lines used in the present invention;

DETAILED DESCRIPTION OF THE PREFERRED EMBODIMENTS

Figure 7:
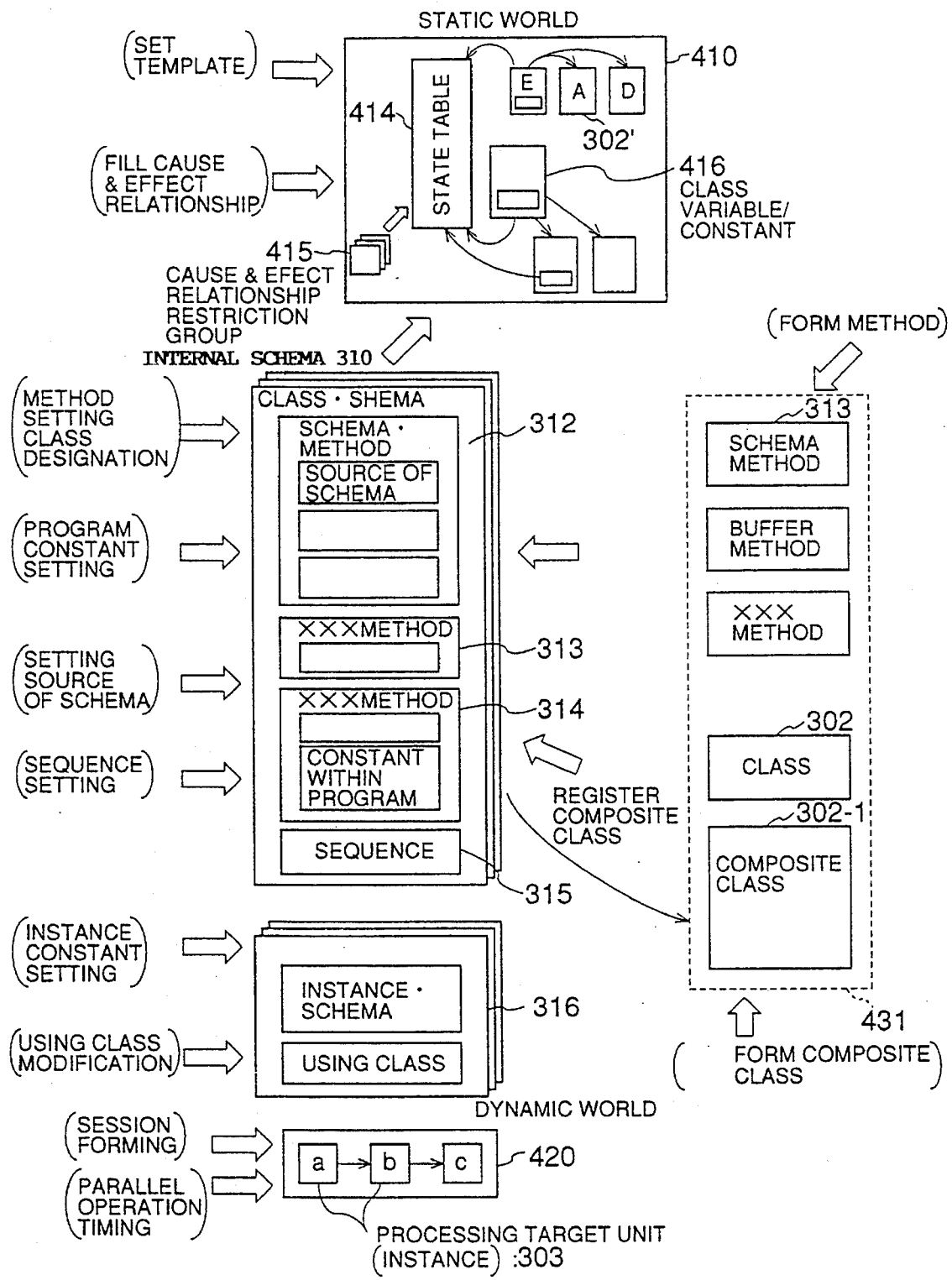
FIG. 7 is a diagram showing the principle of the present invention.

FIG. 7 shows the principle of the present invention.

Referring to FIG. 7, the system includes an internal schema 310 that creates a class or composite class in response to a new processing demand or request with a new objective or target. Further the internal schema 310 creates an instance that is related to the class or composite class thus created. Hereinafter, the term "class" may be used to indicate both the usual class and the composite class.

FIG. 7 shows a static world 410, a dynamic world 420 and a functional model 431. Thus, the system describes the real world in terms of the object model wherein the real world is described by the external definition and the internal definition such that (i) the internal definition forms a concealed area acting as a functional model 431 that stores therein existing methods 313 or classes 302. The class 302 may include newly created methods and classes. Further, the external definition is incorporated into the system in the form of the static world 410 and the dynamic world 420.

The static world 410 groups the methods 313 and the classes 302 as the class that corresponds to a new processing demand. Thus, the system for carrying out a new processing is given by combining the classes. Further, the dynamic world 420 includes the instances corresponding to the classes such that the instances are serially connected according to the order of processing, to form a session. Thus, the session provides the dynamic model for operating the system.

Further, FIG. 7 includes a class schema 312 as a functional component that creates the classes, as well as methods 313–315 that are incorporated as a constituent element of the classes for the new processing demand.

The system of FIG. 7 further includes an instance schema 316, wherein the instance schema 316 represents the functional component for creating instances corresponding to the classes, which classes in turn corresponding to the aforementioned new processing demand.

The system of FIG. 7 further includes an instance 303, a state table 414, a causality (cause and effect relationship) restriction group 415, and a class variable/constant 416. Here, the state table 414 describes the hierarchical relationship between the classes that are incorporated into the system as a constituent element, the system being arranged in correspondence to the aforementioned new of processing demand. Further, the state table 414 may be used to establish a link between the class variables/constants that are used in the system. The causality restriction group 415 is written into the state table 414, wherein the causality restriction group 415 describes the causality that restricts the execution of the session in the dynamic world 420 illustrated in FIG. 7. For example, the causality includes such a restriction that the instance a should be executed in advance before executing the instance b. Thus, such a causality has to be checked when executing the session.

When an instruction is given to construct a system tailored to a processing demand, the classes that form the constituent element of the system are created. In order to create the classes, the name of the methods and classes that are necessary for the processing is given to the class schema 312, together with the pointer data for pointing the foregoing methods and classes. Thus, the necessary methods and classes are incorporated from the functional model 431 to the internal schema 310. In response to the creation of the foregoing classes, the instance schema 316 creates the instances that are needed for executing the classes. The instances thus created are given the relationship to the classes that use the instance.

The classes thus created are linked to the state table 414 in the static world 410, and forms the constituent element of the system that is tailored to the aforementioned new processing demand. The class 302' in FIG. 7 represents the class that forms the foregoing constituent element. In the dynamic world, on the other hand, the instances 303 are connected time sequentially to execute the processing of the system, and the instances 303 thus connected form a session. Thus, by executing the session, the execution of the system is achieved. In other words, the system may be set to the state ready for execution by setting up the session.

The classes and the composite classes thus created in accordance with the new processing demand, are kept as a functional model 431 for further use to construct a new system in accordance to a still new processing demand.

Figure 8:
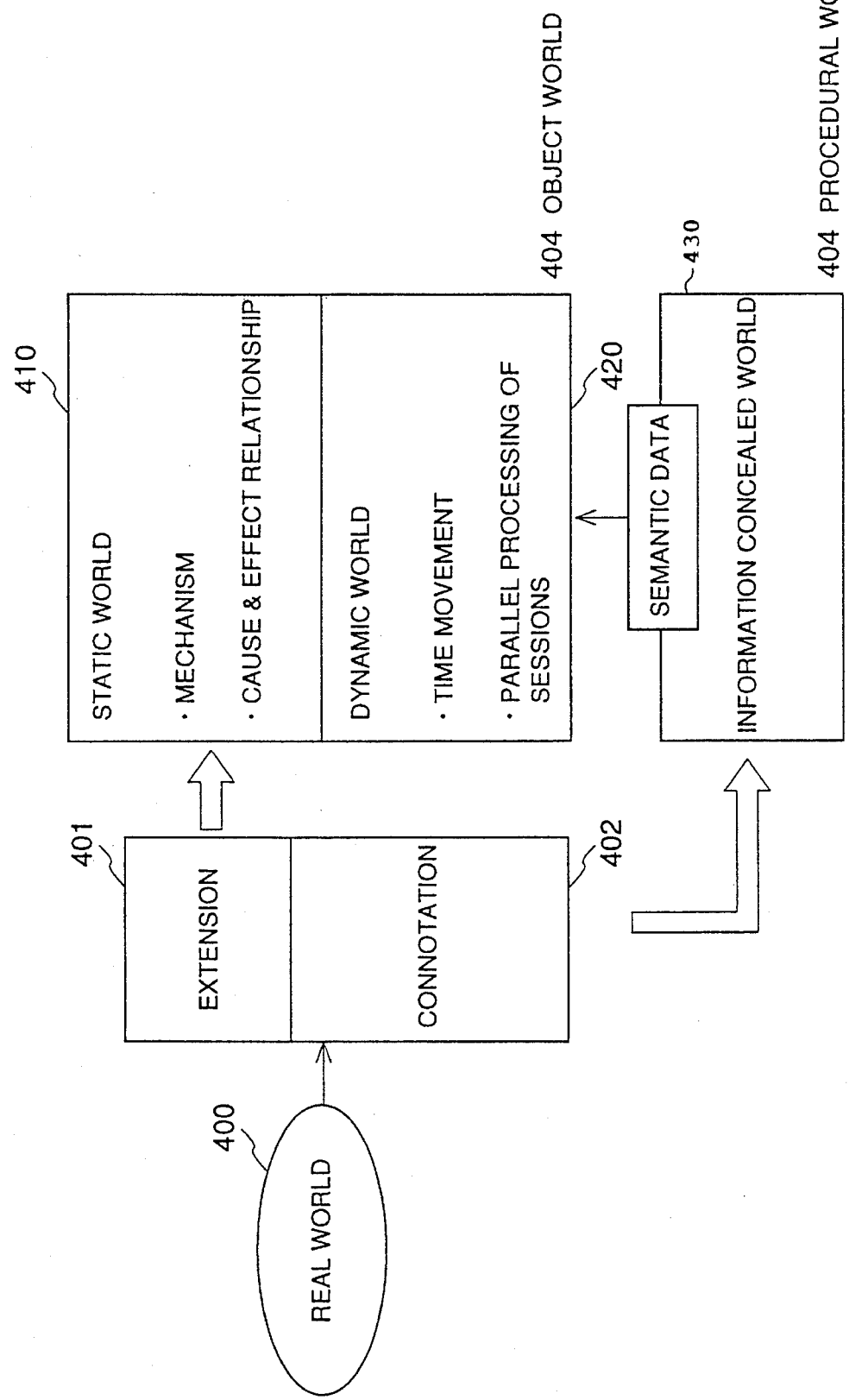
FIG. 8 is a diagram for explaining the dynamic world and the static world.
Figure 9:
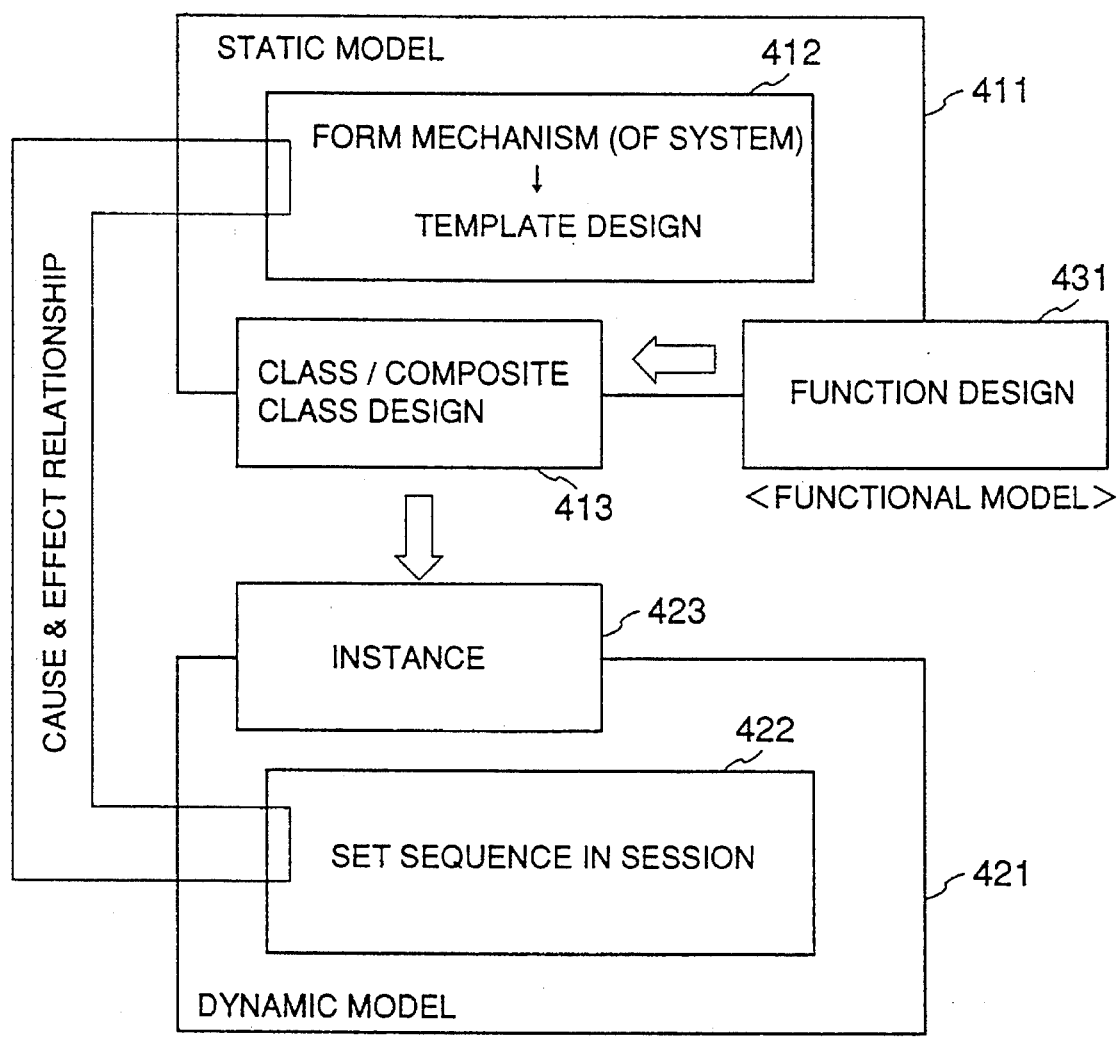
FIG. 9 is another diagram for explaining the dynamic world and the static world.

FIGS. 8 and 9 describe the static world and the dynamic world.

A real world 400 is modeled, as indicated in FIG. 8, from an internal definition or connotation 402 that provides detailed description of the real world and an external definition 401 that provides a summary or identification of the internal definition 402. Thus, one may exchange information about the real world 400 with another person or another terminal or system in terms of the external definition 401 only, provided that the content of the internal definition 402 is available to the another person or terminal. In other words, it is not necessary to provide detailed information of the real world 400 to the other side. Only the name or designation of the real world 400 is sufficient.

FIG. 8 shows the static world and the dynamic world.

In view of the foregoing argument, it will be noted that the internal definition 402 of FIG. 8 represents the concealed area in which the information is concealed with respect to the outside. Thus, the internal definition 402 corresponds to a concealed world 430. On the other hand, the real world 400 can be modeled in terms of the static world 410 that provides the structure of the real world 400 as well as the causality within the structure, and the dynamic world 420 that represents the motion of the real world. The dynamic world 420 may further indicate whether or not the parallel processing is allowed to the plurality of sessions. These static world and the dynamic world 10 are related to the aforementioned concealed world by the external definition 401 shown in FIG. 8.

It should be noted that the internal definition 402 belongs to the concealed world and contains the data that defines the content of the external definition. The real world is simulated by such an external definition that implies a meaning. Thus, the external definition forms a static model for the static world and a dynamic model for the dynamic world.

FIG. 9 shows the relationship between the static model, dynamic model and the functional model, wherein FIG. 9 shows a static model 411 that corresponds to the static world 410 of FIG. 8. Similarly, FIG. 9 shows a dynamic model 421 that corresponds to the dynamic world 420. The concealed world 430 of FIG. 8 corresponds to a functional model 431 of FIG. 9.

As a result of analysis of the system and by designing the template which describes the foregoing "is-a" or "part-of" relationship, one obtains a static model. Further, a functional design is obtained, and in correspondence to this, the class 302 shown in FIG. 7 is obtained. Such a class 302 include the composite class in which a number of classes are assembled.

The dynamic model is formed by creating an instance by allocating instance data to the foregoing class 302 and designing the time sequential relationship between the instances thus created. Further, the restriction of causality is imposed between the static model and the dynamic model.

The existing methods 313 or classes 302, as well as newly created classes, are kept as a functional model 431 for further use to construct a system according to a new processing demand. In such a process, the methods and classes forming the model 431 are combined dynamically. Hereinafter, such a dynamic object processing will be described.

Figure 10:
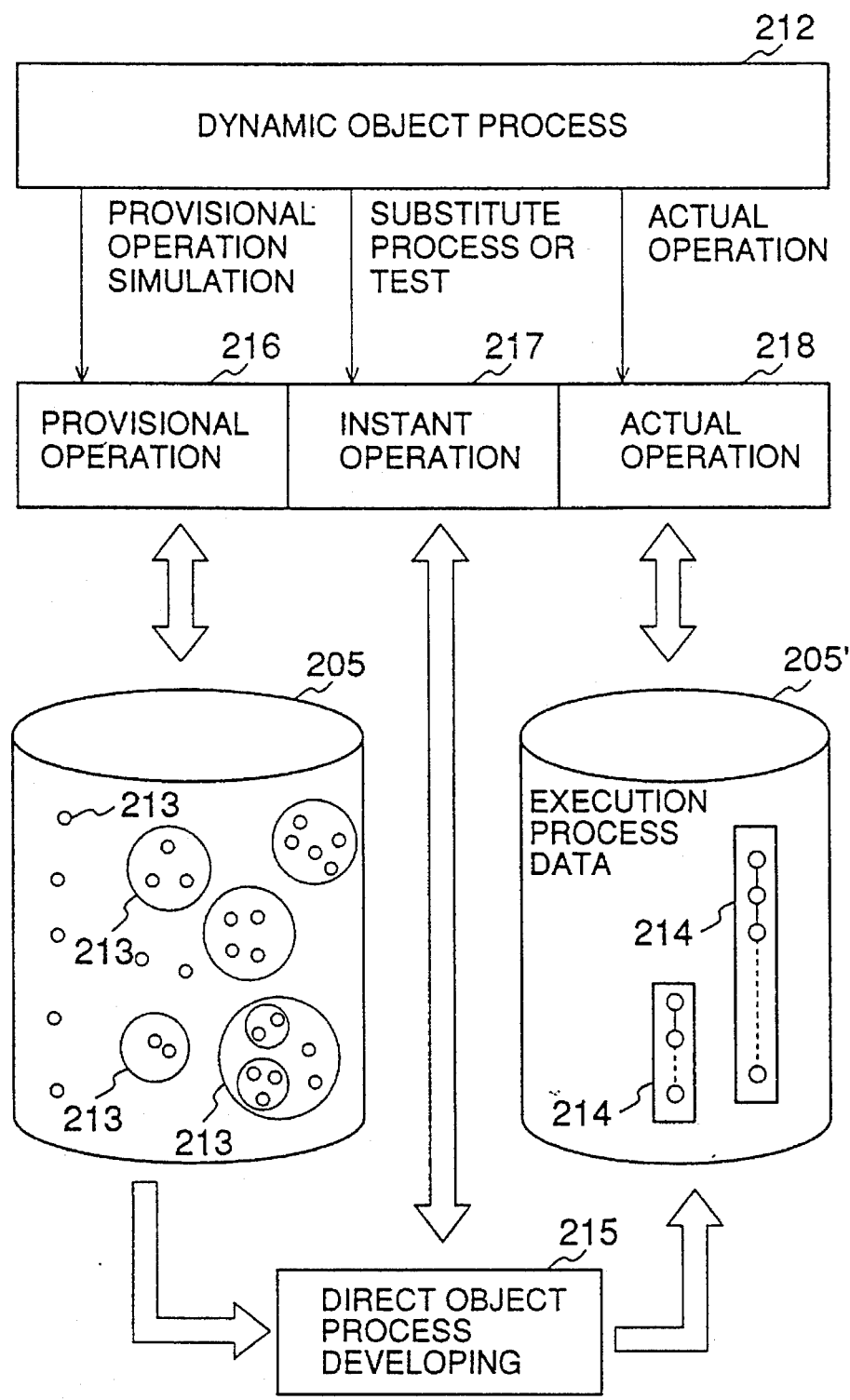
FIG. 10 is a diagram showing a part of operation of a dynamic object processing unit.

FIG. 10 is a diagram for explaining a portion of the operation of a dynamic object processing unit.

The various methods and classes described above are held in a component attribute file 205 as an object component 206 as will be described later with reference to FIG. 17. A dynamic object processing unit 212 shown in FIG. 10 carries out a process using this object component 206. Of course, it is possible to appropriately combine the object components 206 or composite object components, which is a combination of the object components 206.

The dynamic object processing unit 212 shown in FIG. 10 has a provisional operation mode 216 for carrying a simulation or the like, an instant operation mode 217 for carrying out a test or the like, and an actual operation mode 218 for carrying out a data processing or a communication process with another terminal.

Figure 17:
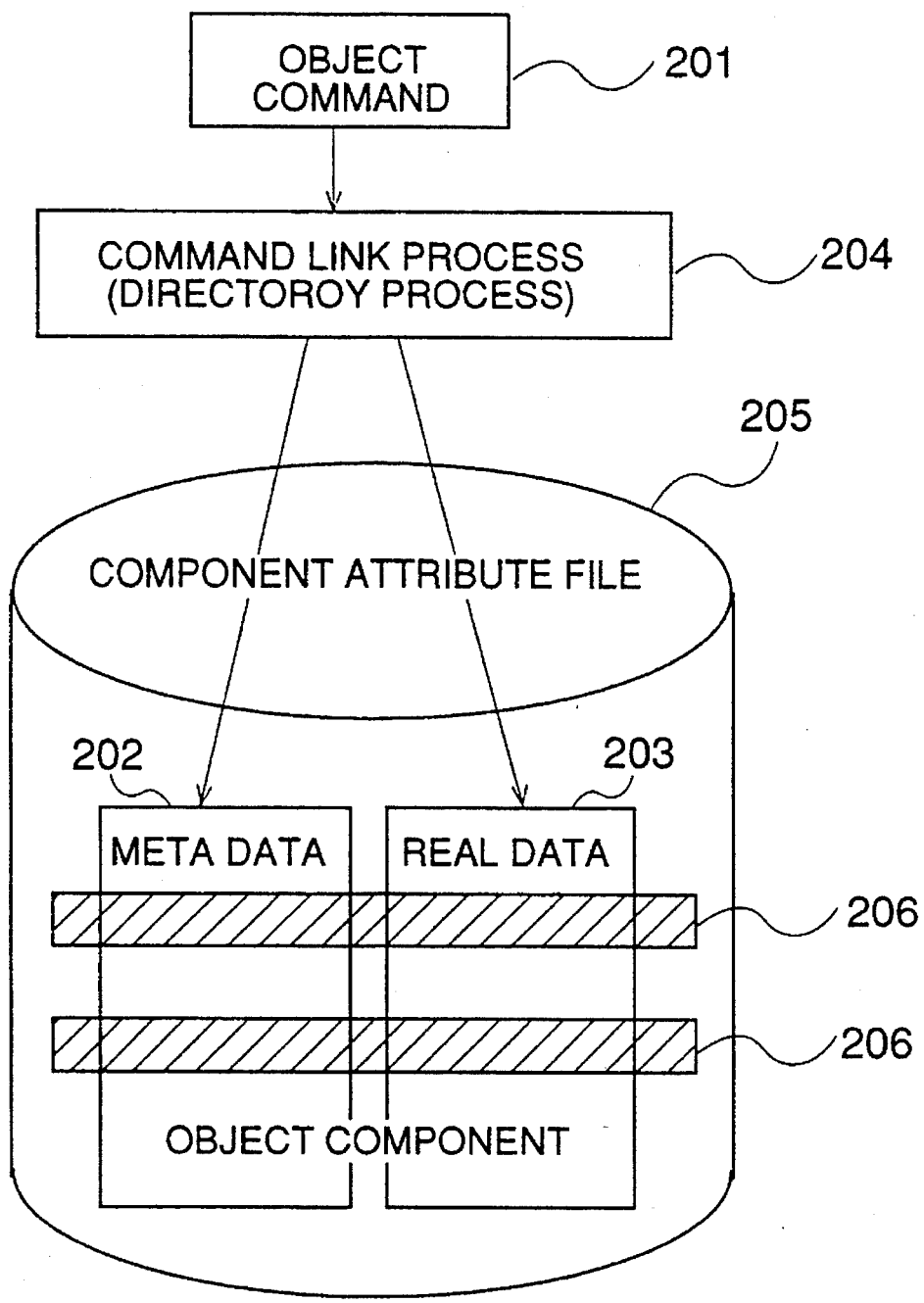
FIG. 17 is a diagram showing a mode of processing an object.

The component attribute file 205 is the same as that shown in FIG. 17. A file 205' holds executionable process data 214 which is obtained by compiling all or a portion of the content of the component attribute file 205 so as to enable high-speed execution. In the case of an object program for process execution, the executionable process data 214 in general are processing units which are made up of several tens to several hundred steps and serially connected in the processing sequence.

The objects 213 are shown within the component attribute file 205. Generally, the object 213 may take the form of the primitive object as it is, the state of the capsule object, the state of the event object or the state of the system object. As described above in conjunction with FIG. 17, it may be regarded that the objects 213 are stored in the form of object components 206 and can be specified by the object commands.

A direct object expansion unit 215 carries out a process of obtaining the executionable process data 214 by expanding the individual objects 213 or, expanding a plurality of objects 213 as a whole.

Figure 1A:
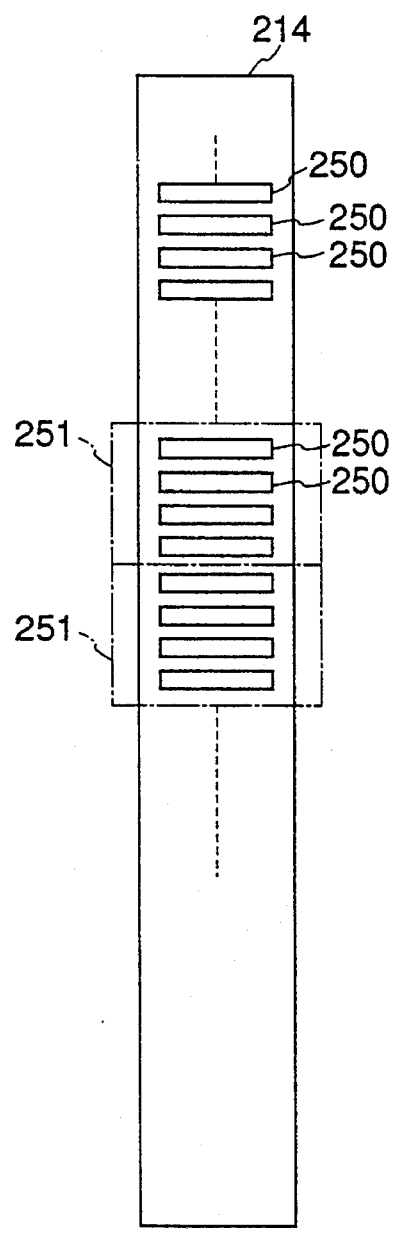
FIGS. 1A–1C are diagrams for explaining the merit of the capsuling of objects.
Figure 1B:
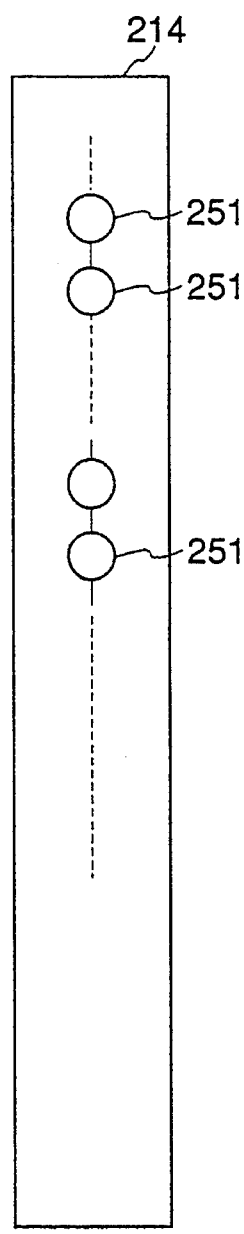
Figure 1C:
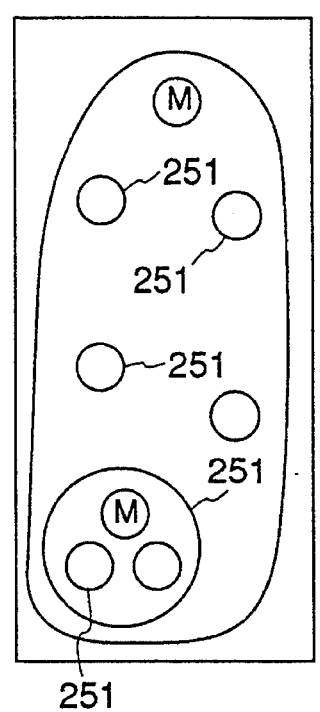

As described above with reference to FIG. 1, the objects are generally combined into objective processing units in the form of the composite object, and becomes a unit for exhibiting a behavior for executing a process having a certain object. Such composite objects are stored in the component attribute file 205 in the form of object components 206 which are specified by the object commands 201.

When generating a new processing function, a new object is generated or the existing objects are connected depending on the objective of the processing, and the object which exhibits the new processing function is prepared as one of the object components 206, in order to enable the new processing function.

A simulation is carried out with respect to the generated object so as to determine whether or not a correct function is actually obtained, or a provisional operation is carried out with respect to the generated objects for which the simulation is ended. Such a process corresponds to the provisional operation mode 216 shown in FIG. 10. The dynamic object processing unit 212 uses the content of the component attribute file 205 to simulate the corresponding processing operation.

Figure 11:
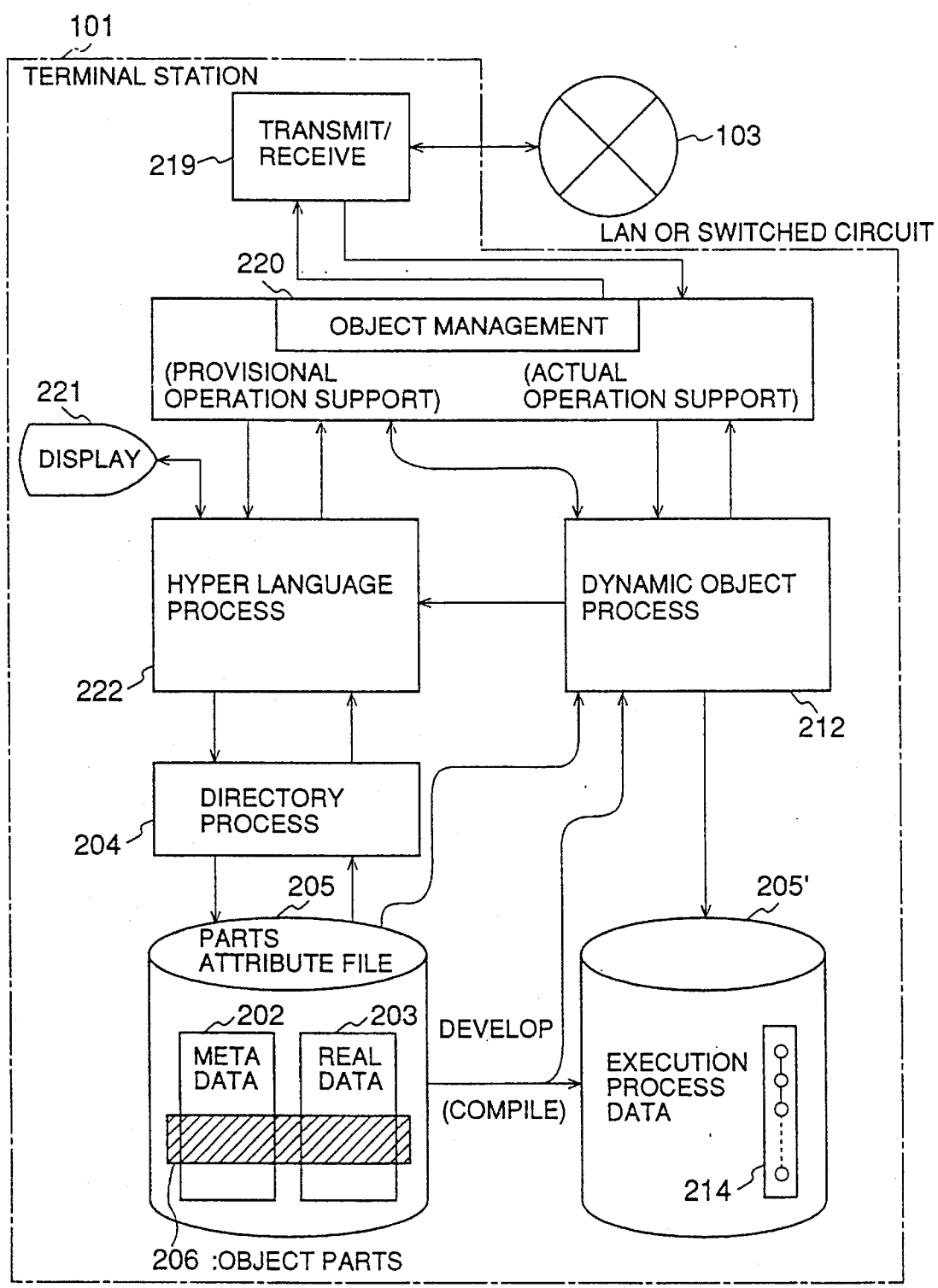
FIG. 11 is a diagram showing the construction of a terminal.

The object 213 or the object group which operates normally in the provisional operation mode 216 is developed into the executionable process data (EXE data) 214, that is, compiled into one executionable process data 214, because the object 213 or the object group requires, in the form as it is, a large number of communications with the object management unit 220 shown in FIG. 11 and the processing speed is slowed down. This developing process is carried out in the direct object expansion unit 215 and is stored in the component attribute file 205'.

The dynamic object processing unit 212 uses the content of the component attribute file 205 and temporarily carries out a substitute process with respect to a predetermined process. On the other hand, if becomes necessary to carry out a test process, the dynamic object processing unit 212 activates the direct object expansion unit 215 to generate the executionable process data 214 and carries out this process. In FIG. 10, such a process mode is indicated as the instant operation mode 217.

Figure 14:
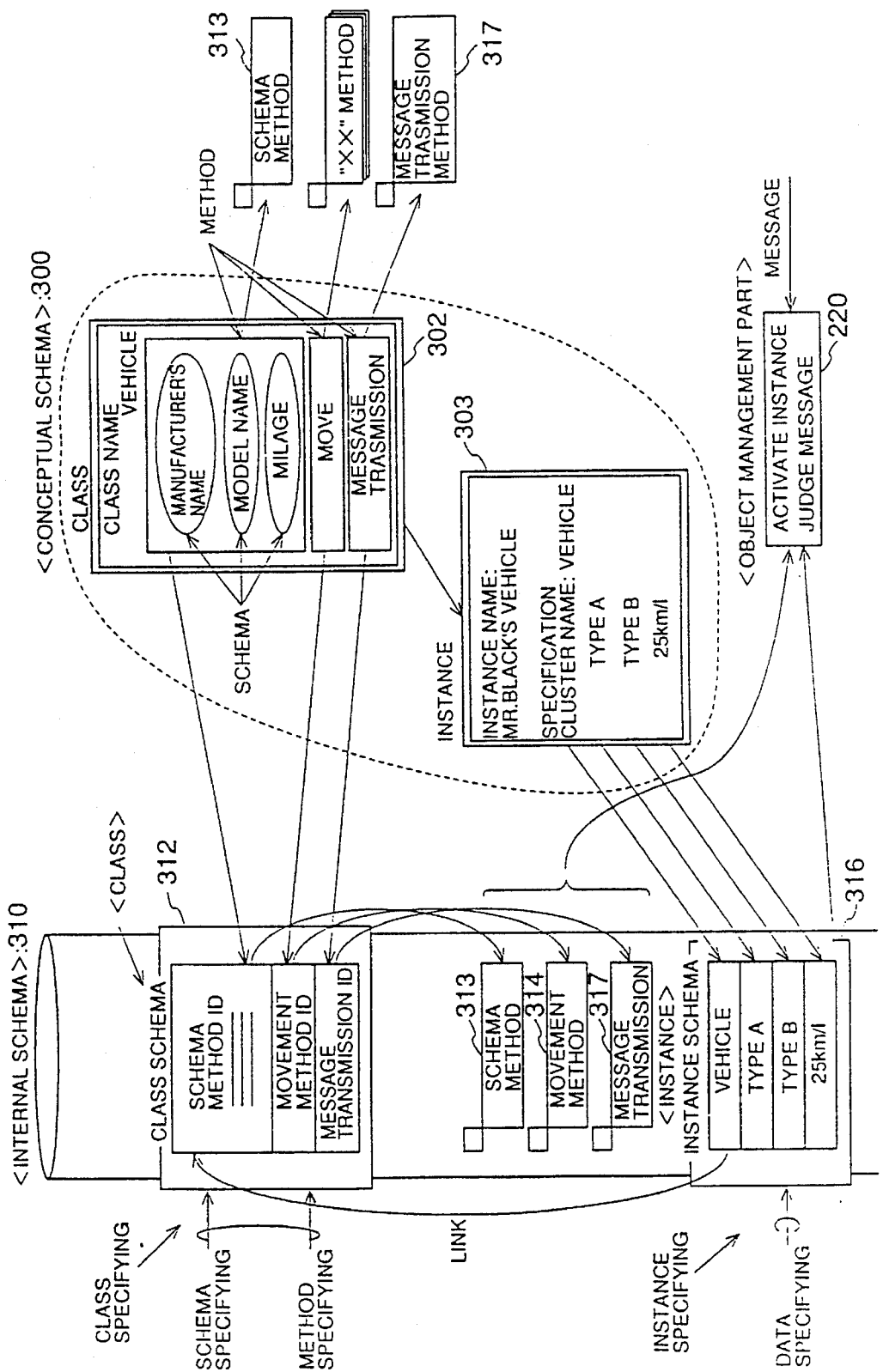
FIG. 14 is a diagram for explaining creation of an instance from a class.

The actual operation mode 218 shown in FIG. 14 is a mode for actually carrying out the process using the executionable process data 214 shown.

The semantic (meaning or significance) data related to the nature of the object is described in the metadata within the component attribute file 205. In addition, it may be regarded that the coupling relationship of a certain object with respect to the object in the upper layer (object indicated by the "is-a" relationship), the coupling relationship of the certain object with respect to the object group in the lower layer and included in the certain object (group of objects indicated by the "part-of" relationship) and the like, are also described in the metadata within the component attribute file 205. The layer indicates the layer of a hierarchy relationship.

FIG. 11 shows the construction of a terminal. In FIG. 11, a terminal 101 executes the process using the executionable process data 214, and communicates with another terminal via a line 103. The line 103 is a line of a local area network (LAN) or other communication network.

A communication/reception unit 219, the object management unit 220, a display 221, a hyper language processing unit 222 and the like exist within the terminal 101.

The directory processing unit 204 shown in FIG. 11 forms a command link processing unit. When a new object is created, the directory processing unit 204 sets a command (object command) corresponding to the name of the object thus created, and allocates the address to the real data 203 and the metadata 202 by forming a command link table. In this process, the type of the object is determined together with the size. By using the command link table, it becomes possible to input and output of the combination of the metadata 202 and the real data 203.

In FIG. 11, a "provisional operation support" is a support function corresponding to the operation that is carried out until the provisional operation mode 216 shown in FIG. 10 is carried out.

The hyper language processing unit 222 shown in FIG. 15 has a "component display/selection" function, and retrieves the usable object components from the display 221 and outputs the same. If no appropriate object component exists, the hyper language processing unit 222 uses a "component specify" function to specify a component as a new object component. The hyper language processing unit 222 can also generate a class object component by a "attribute set" function, and generate an instance object component by a "schema" function.

The "component display" function using the display 221 includes (i) content display of names and comments of metadata of the object components, (ii) display of schema and attribute indicating the content of the object components, and (iii) display of class attributes and instance constants.

A "component combine" function of the hyper language processing unit 222 combines the object components to obtain a larger composite object component. For this "component combine" function, there are provided a function of adding, modifying and deleting the attribute related to the formation of the classes, and a function of adding, modifying and deleting the schema related to the formation of the instance constants.

A "user screen create" function of the hyper language processing unit 222 creates the instance by inputting the screen data in the buffer of the "screen create and display" class when making the screen forming and display. For this reason, the "user screen form" function corresponds to forming the screen class into the form of the instance.

Figure 4A:
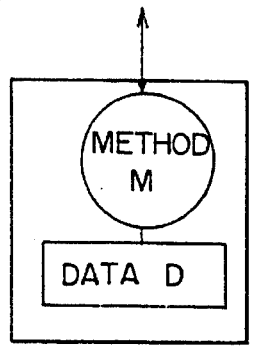
FIGS. 4A–4C are diagrams showing the examples of capsule.
Figure 4B:
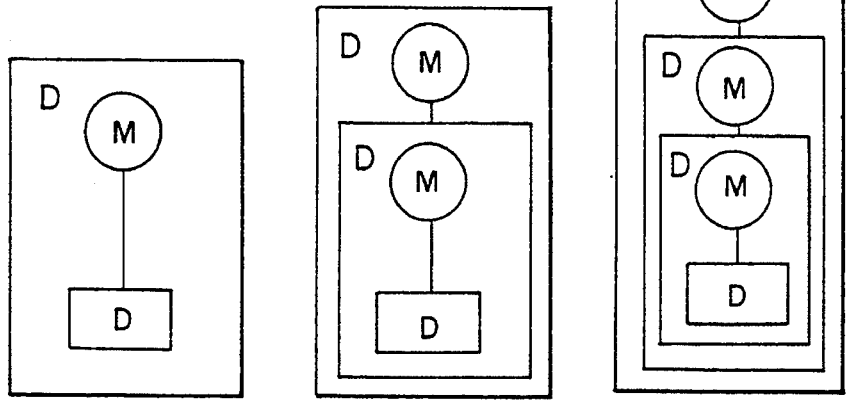
Figure 4C:
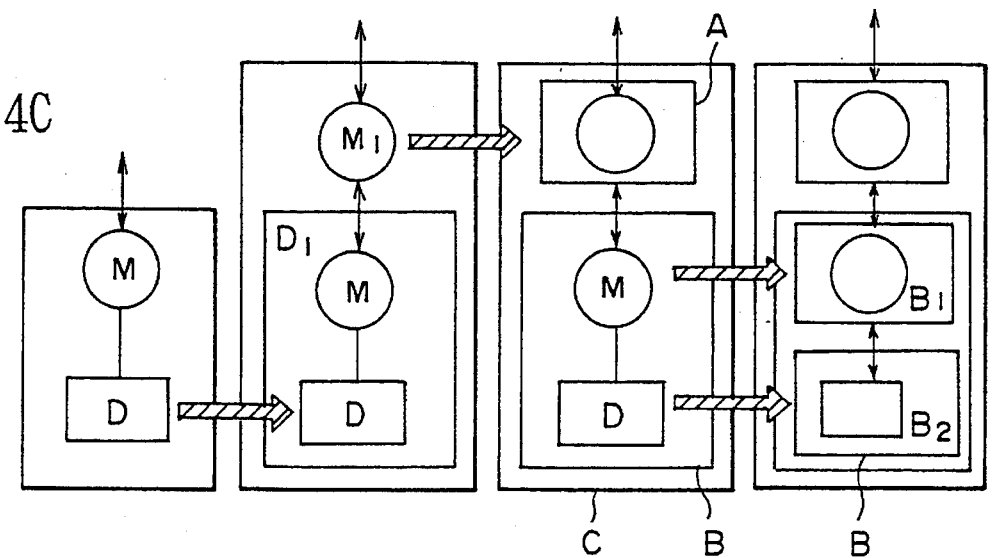
Figure 5:
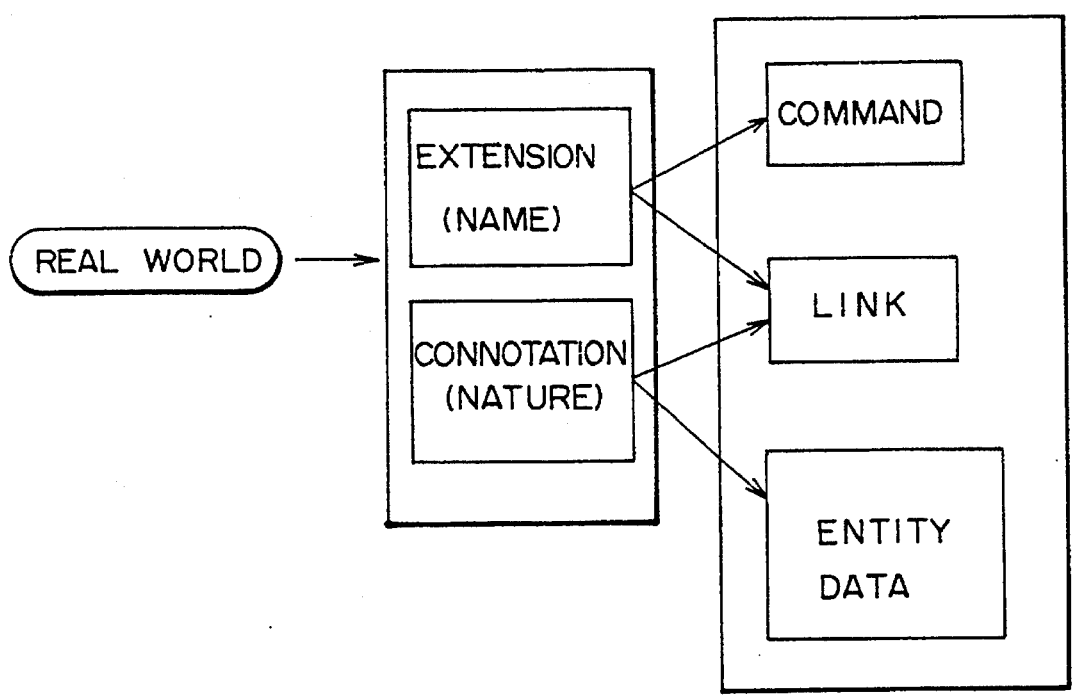
FIG. 5 is a diagram for explaining the modeling of an object.
Figure 6:
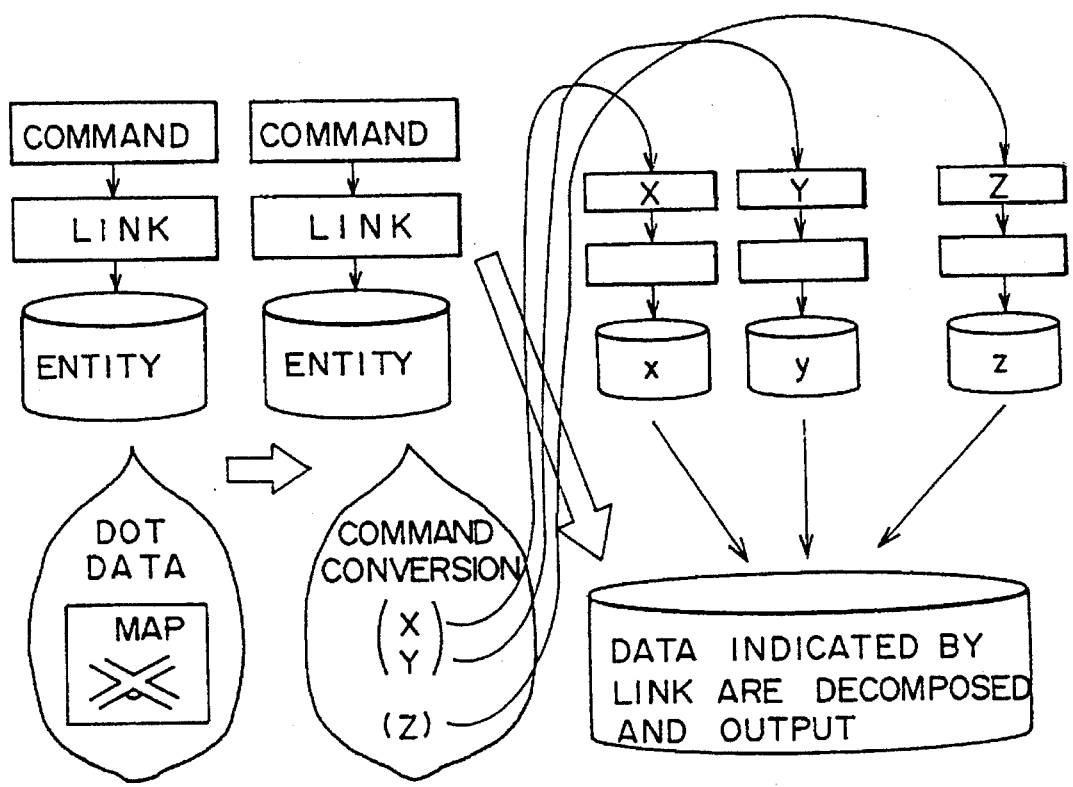
FIG. 6 is a diagram for explaining the activity of the modeled object.

A "provisional operation" function of the hyper language processing unit 222 links the message to the method indicated by the class when the instance receives the message. Hence, the capsule shown in FIG. 4C is temporarily realized in a primary memory, and the behavior of the capsule is executed.

Furthermore, a "component modification" function of the hyper language processing unit 222 is a function of modifying the object components by modifying, adding and deleting the attribute and schema. In addition, a "component register" function is a function of registering the object components in the component attribute file 205 by making the object components correspond to the object commands which are the names of the object components.

The "develop (compile)" shown in FIG. 11 indicates the direct object expansion unit 215 shown in FIG. 10. The expansion process makes an expansion to the largest possible executionable process data 214 depending on the side of the primary memory of the data processing system.

The object management unit 220 controls the hyper language processing unit 222 shown in FIG. 11 to hold the object components 206 in the component attribute file 205, and controls the dynamic object processing unit 212 to carry out the provisional operation mode 216, the instant operation mode 217 and the actual operation mode 218. In addition, the instance is activated in the provisional operation mode 216 in correspondence with the message reception via the line 103, and a capsule is provisionally formed in the primary memory to operate the data processing system and to make a message transmission related to the result of the processing.

When carrying out the process within the terminal station 101, if the desired object component does not exist within the terminal station 101 or the attribute or schema does not exist, a data transfer is received from another terminal station via the line 103 to incorporate the data within the terminal station 101 and carry out a learning process.

Figure 12:
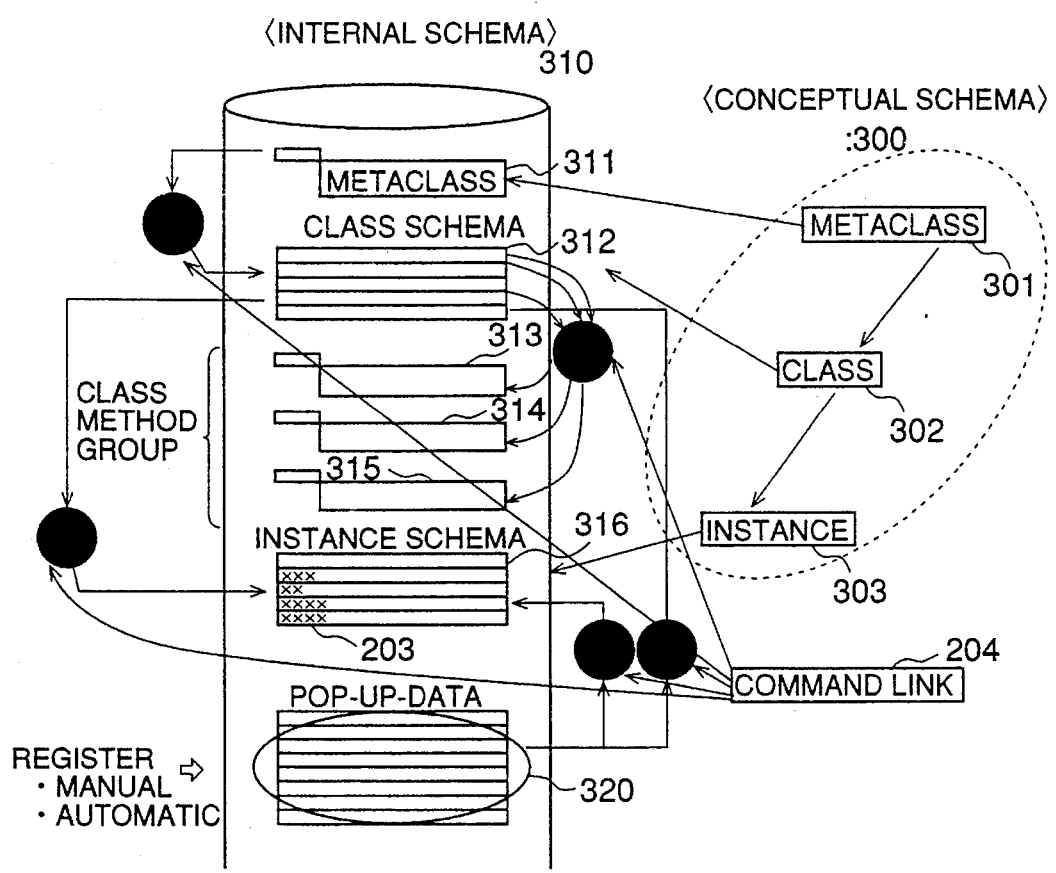
FIG. 12 is a diagram showing an example of creating a class and an instance in an internal schema.

FIG. 12 shows an example of creation of the class or instance in the internal schema, wherein it will be noted that the internal schema 310 includes the real data or entity data 203 and the command link processing unit 204.

FIG. 12 shows a conceptual schema 300 that describes the hierarchical relationship of the information pertinent to the present invention, wherein the conceptual schema 300 includes a metaclass 301 that creates a class. The metaclass 301 is provided for creating a class such that the class can include methods with various modifications.

The conceptual schema 300 further includes a class 302 and an instance 303. For example, the class 302 may include therein various methods related to automobile as a class, with versatile modification. The instance 303, on the other hand, may provide particular data that is used in the methods in the class 302, to create a processing program for a particular automobile.

FIG. 12 further includes the internal schema 310 such that the internal schema 310 is provided in the data processing system in correspondence to the conceptual schema 300. The internal schema 310 thereby includes a metaclass method 311 for creating desired individual classes, and a class schema 312 provided in correspondence to the class thus formed, for describing a method iD for each of the methods that is incorporated into the class, wherein the methods are incorporated in the manner to allow modification. The class schema 312 further describes a sequence schema that indicates the order that the various methods are used.

Further, the internal schema 310 of FIG. 12 includes methods 313, 314, 315, . . ., wherein each of the methods 313, 314 and 315 are linked with the method iD on the class schema 312 to form a class method group which is used in the class.

The internal schema 310 further includes an instance schema 316, wherein the instance schema 316 describes the name of the related class such as the class 312. Further, the instance data (such as the entity data 203) required by the method, which method is used in the class, is described in the instance schema 316 with a link to each of the method iDs.

Further, there is provided pop-up data 320, wherein data is extracted from the pop-up data 320 and is written into the instance schema 316 as the instance data.

When a class 302 relating to automobile and the instance 303 relating to the class 302 are to be created, the operator imagines various methods that are needed to create the class (it is assumed that the methods that the operator has imagined exist already). The methods thus imagined forms the metaclass 310 illustrated in FIG. 12.

The operator then inputs to the metaclass method 311 of his intention to create a class related to the automobile. Further, the operator inputs the name of the various methods thus imagined into the metaclass method 311.

In correspondence to this, the metaclass method 311 describes a statement on the class schema 312 such that the class is related to automobile, and describes the method iDs corresponding to the foregoing various methods. When doing so, the metaclass method 311 describes, into the class schema 312 automatically, the sequence schema that specifies the order of using the methods in the class and the iDs about the message transmission methods that are needed when the class communicates with other classes.

In response to the creation of the class schema 312, each of the method iDs are pointed to the methods 313, 314, . . . ., and a class is created as a result. In the foregoing processes, one may freely delete, exchange or modify the methods in the class thus created. Further, the metaclass method 311 may be activated from the side of the class to be created.

Further, the class schema is activated based upon the name of the class described in the instance schema 316, wherein the name of the class indicates those classes related to the class under consideration. In response to the activation, the instance data used in the various methods in the class under consideration are inputted and described further on the instance schema 316. In this operation, the operator is prompted to input individual instance data and the data is inputted by the operator. Further, the instance data that has not been registered before are automatically registered on the pop-up data 320 for further reuse.

The data on the instance schema 316 is linked to the method iD on the class schema 312. It is needless to say that the instance data on the instance schema 316 may be deleted, exchanged or added according to the needs. Further, the modification of the method used by the class results in a corresponding modification of the instance data.

As a result of the foregoing construction, it is possible to create a desired class or modify the method used in the class. Further, it is possible to modify the instance data. Thus, it is possible to combine various method data according to the needs.

In the present invention, various methods are created in accordance to the objective of the data processing, and a plurality of methods thus created are combined to form a class. Further, a plurality of such classes are combined to form a composite class. The classes or composite classes thus formed are placed in the concealed world shown in FIG. 8.

When creating a class, the method iD is described in the class schema 312 that specifies the class name and the methods used in the class as described with reference to FIG. 12, wherein the methods are incorporated in the manner capable of modification. Further, the method iD and each of the methods 313, 314, . . . are linked with each other. Each of the methods, on the other hand, sets the sequence according to which the process is executed.

The instance schema 316 is formed in correspondence to a specific processing. Thus, the name of the classes that use the instance is described in the instance schema 316, together with the data of the individual instances.

In correspondence to the aforementioned formation of class and instance schema, a static world is formed in the form of classes and methods chained by the state table 414, with the variables and constants 416 related to each of the methods. If necessary, the class may be related to other classes according to the "is-a" or "part-of" relationship. Further, a restriction group that provides the causality is imposed.

In the dynamic world, the sessions are formed for specifying the order of processing. When carrying out a parallel processing, on the other hand, the timing of the parallel processing has to be specified.

Figure 13:
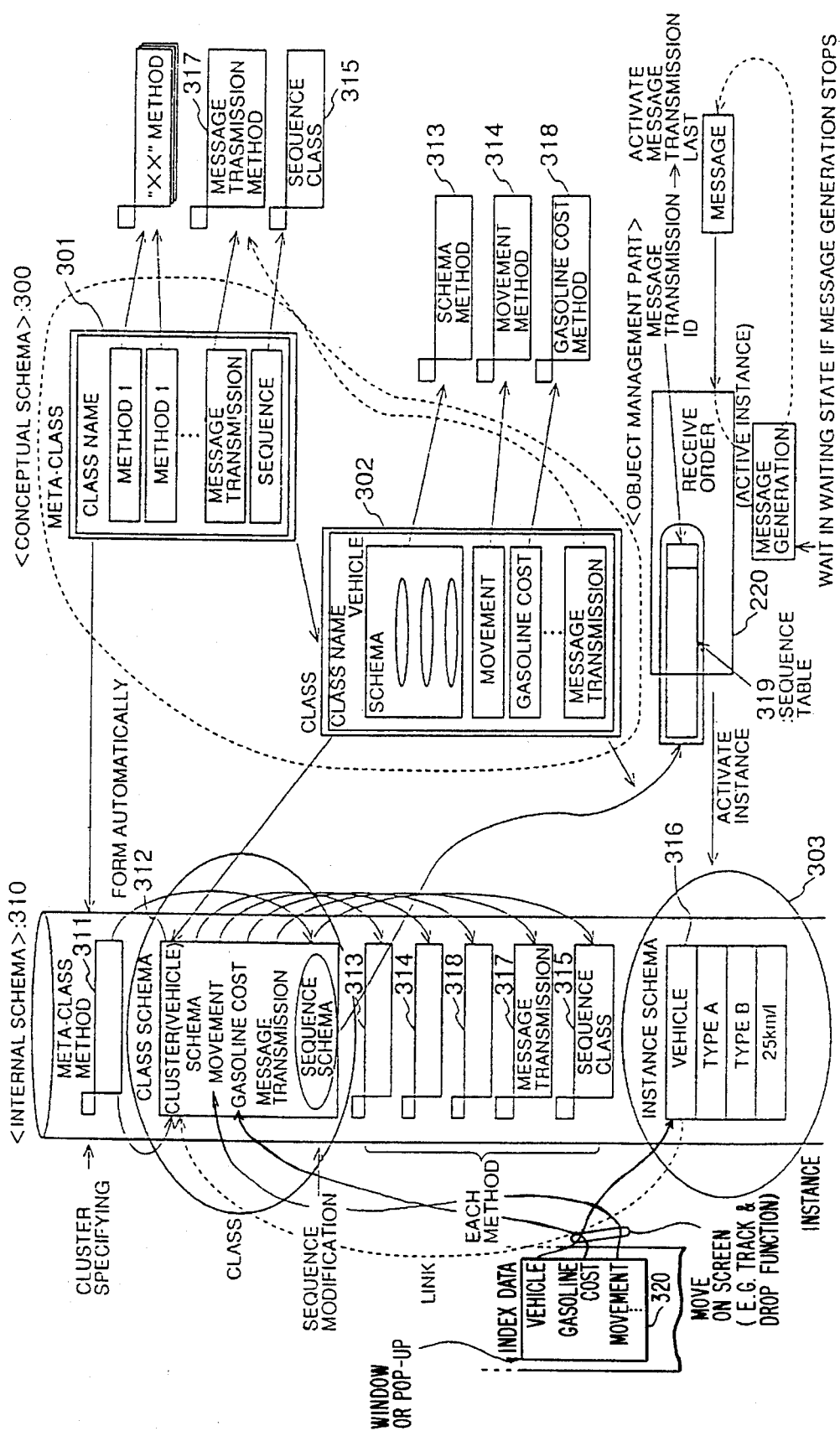
FIG. 13 is a diagram for explaining creation of a class from a metaclass.

FIG. 13 shows the state of generating a class from a metaclass. In FIG. 13, the elements 300, 310, 312, 313, 314, 315 and 316 correspond to those shown in FIG. 12. Further, FIG. 13 shows a message transmission method 317, gasoline charge calculation method 318, and a sequence table 319 that is provided in the object management unit 220.

As already described with reference to FIG. 12, the metaclass method 311 is used to set the name of the class to be created. Further, the methods to be used in the class under consideration is specified. At the same time, the message transmission method 317 for communication with other classes and the like, are set automatically, and the order of use of the methods in the class is described.

In response to this, the iD for the method incorporated into the class schema 312, the iD for the message transmission method, and the sequence schema, are described and linked with corresponding methods.

A specific processing program is then created by specifying an instance by the class thus created. In the illustrated example, the instance schema 316 is provided in correspondence to "automobile," wherein the instance schema 316 incorporates therein a specific instance corresponding to the automobile.

When a message indicating the use of a particular instance schema is given in the object management unit 220, the object management unit 220 activates the corresponding instance by incorporating the instance schema, wherein the class schema 312 shown in FIG. 13 is linked based upon the name of the class described in the instance schema. Further, the sequence schema in the class schema 312 is incorporated to the sequence table 319. After this, the object management unit 220 checks for the content of the sequence table 319 and uses the method according to the predetermined order. The object management unit 220 thereby carries out the processing of the instances based upon the content of the instance schema 316.

FIG. 14 describes the state of creating an instance from a class, wherein it should be noted that the reference numerals in FIG. 14 corresponds to the reference numerals in FIG. 13.

As already described with reference to FIG. 12, the class schema 312 is created and the methods 313, 314, . . . are linked when the method to be incorporated into the class 302 is specified.

The class thus created, such as the one related to "automobile," is generally formed of a blank data storage area ready for storing instance data rewritably and a method group for carrying out various processings about the automobile. By setting particular instance data in the blank data storage area of the class thus created, an instance is created as a particular processing program which uses the instance data. The illustrated instance 303 represents such a program.

When creating an instance, the instance data used in each of the methods is set on the instance schema 316. Thus, the content of the instance schema 312 is linked to the method iD on the class schema 312. With this, the processing of the methods in the corresponding class is executed by using the content of the instance schema 312, and it becomes possible to execute a specific processing program or instance. The execution of the program is actually carried out by the object management unit 220 that activates the instance schema 316 or the methods 313, 314, . . .

In the present invention, the class is created in the desired form by using the metaclass method 311, by incorporating into the class under consideration the name of the class to be created as well as the methods in the rewritable manner. Thus, by combining the methods appropriately, a desired class is created. Such a class may be regarded as a program in which the instance data is still in the form of variables.

The program ready for executing a specific processing is obtained by specifying particular instance data for the variables in the program, in the state that the program contains instance data in the form of variables. Thus, the instance is a processing program in which constants are set in the variables. By setting the instance data in the aforementioned instance schema 316 in the rewritable form, a desired instance is obtained.

Figure 15A:
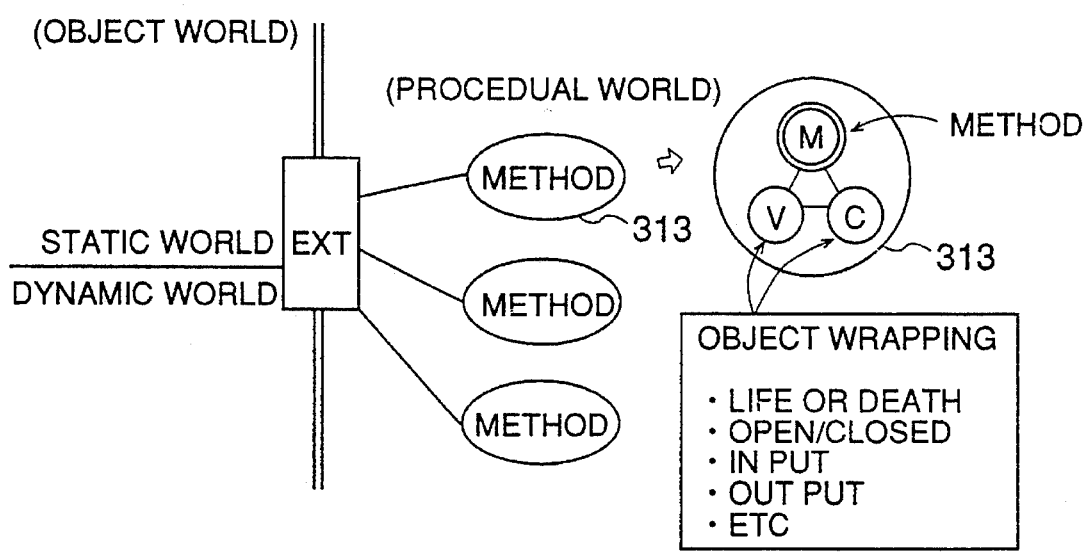
FIGS. 15A and 15B are diagrams for explaining the concept of wrapping of methods.

FIG. 15(A) explains the wrapping of a method. As described in relation to FIG. 12, the procedural world corresponding to the internal definition is related to the world of object by way of the external definition. Further, as described in relation to FIGS. 4A–4C, the method itself forms an object. Further, such an object exists in the procedural world.

When a single method is treated in the state that the method exists by itself, there is a tendency that it becomes unclear as to when the method is created or deleted (life or death), whether or not the method is to be placed in the terminal-stay-and-resident state or not (opened or closed), from where the input data should be received (Input), or to where the output data is to be directed (Output).

Thus, a verb (V) and a complement (C) indicative of operation of the method is described together with the method (M) itself to form an object. The verb V and complement C are called a wrapping of the method.

Figure 15B:
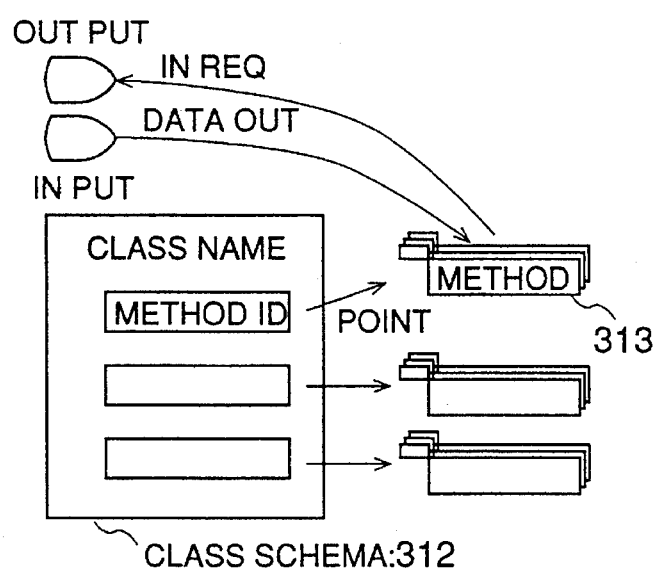

FIG. 15(A) indicates that the method is located in the procedural world as an object. FIG. 15(B), on the other hand, describes the foregoing wrapping of the method for a method that is incorporated in a class. FIG. 15(B) indicates that the method is given a capability of carrying out data input and data output independently.

The wrapping of the object provides a life-cycle function to the method such that the method works as an object by itself. Such a life-cycle function provides autonomy to the object. Thus, the wrapping of object provides the capability, to the object that has been selected by the operator by way of the external definition, of acquiring the condition of operation of the object by itself. Simply saying, the wrapping of object provides means for acquiring data to the method itself, such that the object can indicate to the operator of acquisition of data that the method requires.

The wrapping of the object includes, in addition to the "life and death," "opened or closed, "Input," and "Output" shown in FIG. 15A, (i) "message transmission" for notifying an end of operation of the object in the case that the object has operated, (ii) "sequence control" for providing the order of processing to the method groups, within the demand function that includes the object under consideration; and the like.

As mentioned above, existing and/or newly created methods are combined by the operation of the class schema and the instance schema, and a system is constructed as desired according to the processing demand. In doing so, it is necessary to arrange such that any person who wishes to use the methods and classes forming a functional model in the concealed world 430, can know about the function of these methods and classes at a later time.

Conventionally, it is known to store individual user data in a user-data database and manage such user data according to a database management system (DBMS).

Further, it is known to provide a metadata database that describes the property (meta-data) of the individual user data subjected to the management by the DBMS, and manage the metadata by means of a data dictionary and directory system (DD/DS).

In any of such systems, the user data subjected to the management of the DBMS or the metadata subjected to the DD/DS are identified by a sequential number that represents the order of data. For example, the user data managed by the DBMS is given an object iD which generally represents the foregoing sequential order.

Further, it has been practiced to use the meaning of the metadata or the user data as the foregoing iD attached to the metadata or user data, rather than using mere order or any similar symbol that has no particular meaning.

Figure 16:
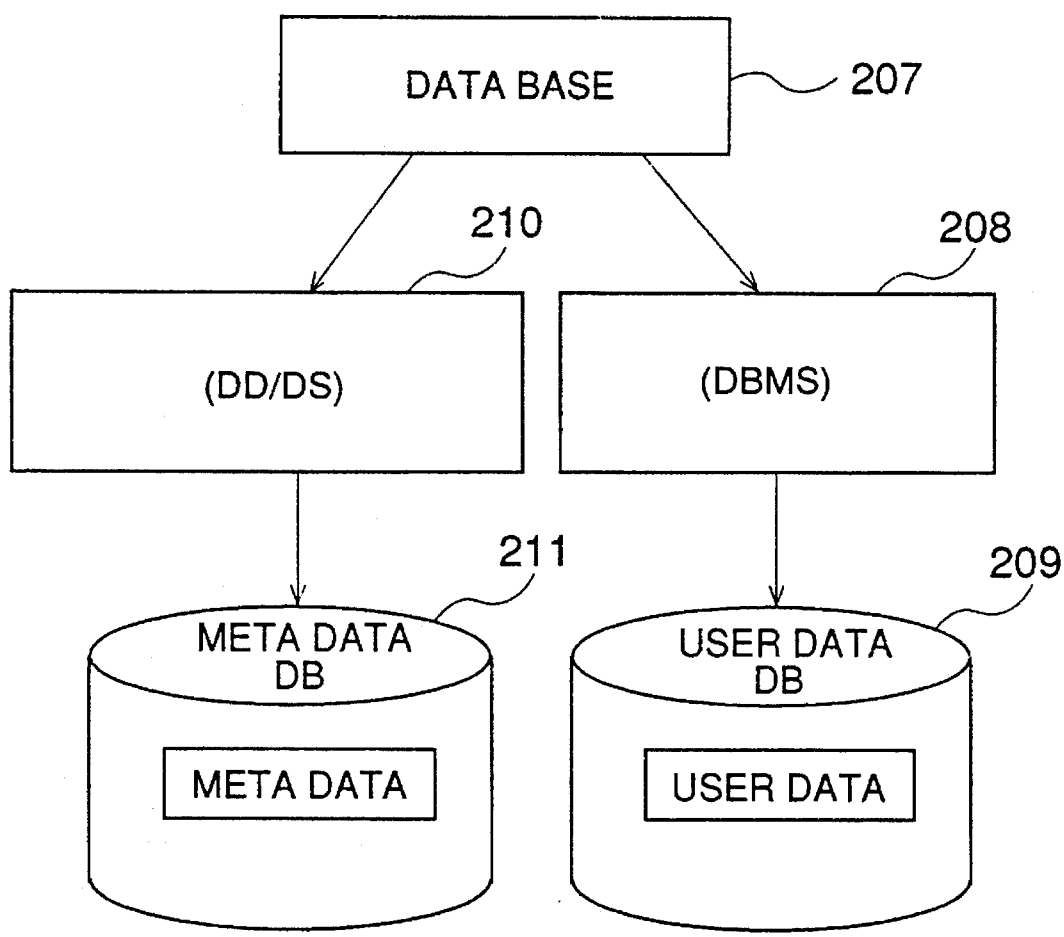
FIG. 16 is a diagram showing the construction of a conventional database.

FIG. 16 shows an example of the construction of a conventional database 207, wherein the database 207 includes a database management system 208, a user-data database 209, a data dictionary and directory system 210, and a metadata database 211.

As shown in FIG. 16, the conventional system includes the user-data database 209 for storing the user data, and the database management system (DBMS) 208 performs a unitary management thereof about the creation, deletion, modification or input/output of the user data.

When the number of the user data increases and the volume of the individual user data increases, it becomes necessary to provide metadata to provide an explanation about the role of the individual user data, and the like. Thus, there is provided a metadata database 211 for storing the metadata as well as a data dictionary and directory system (DD/DS) for the unitary management of the metadata database 211.

In the present invention, such metadata and the user data shown in FIG. 16 are grouped to form the object component 206.

FIG. 17 shows the treatment of an object.

The object component 206 in the component attribute file 205 of FIG. 17 may be regarded as an assembly of user data in the user data database of FIG. 16 and metadata in the metadata database 211. In the conventional construction of FIG. 16, of course, the database management system 208 and the data dictionary and directory system 210 operate independently from each other. Further, the content of the user-data database 209 and the content of the metadata database of FIG. 16 are accessed separately. In the system of FIG. 17, on the other hand, the real data 203 and the metadata 202 are connected with each other such that one can treat the data 203 and 202 as a single object component 206 that is specified by an object command.

It should be noted that there is a proposal to connect the individual user data or entity data on the user-data database, which is managed by the foregoing DBMS, and the metadata on the metadata database, which is managed by the aforementioned DD/DS, to form an object component.

The subject of the object component includes the smallest, primitive objects to the composite components such as the capsuled objects, event objects and the system objects. In other words, these composite objects tend to have an extremely complex nature associated with the complex composite process, such that there occurs a situation wherein no one knows the nature of the object except for the person who has created the object.

In order to deal with the difficulty arising from such a situation, it is desirable to provide a description, in the metadata, about the entity data in the form of the name or comments, or in the form of semantic data model, schematic flowchart, detailed flowchart, source program, and the like, such that a third person can understand the meaning thereof.

When doing so, however, the object components tend to have a large amount of information. Thus, it is desired to provide a designation to the object component such that the content of the object component is shown in a brief representation.

In the present invention, a designation is given to the object components about the content thereof such that one can access the object component by way of the designation.

Figure 18:
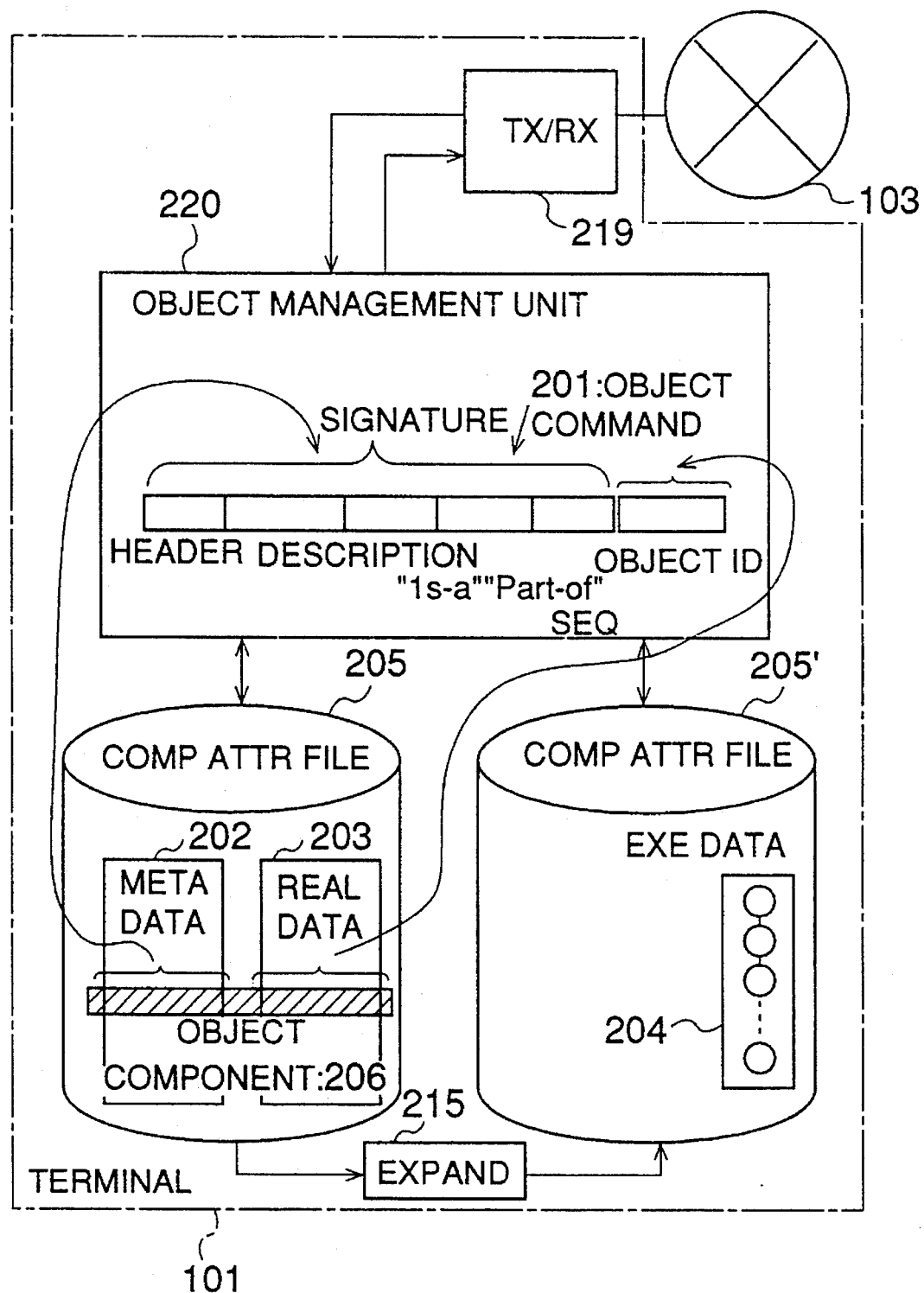
FIG. 18 is a diagram showing the construction for carrying out object management.

FIG. 18 shows the construction for carrying out the object management, wherein the data processing system of FIG. 18 forms a terminal 101. Further, a LAN or network 103 is connected to the terminal 101 for communication with other terminals.

The system of FIG. 18 further includes the metadata 202, the real data or entity data 203, the component attribute file 205, the object component 206, the transmission/reception unit 219, and the object management unit 220. Further, the system of FIG. 18 includes an object or combination of the objects as the executionable process data 214, wherein the executionable data 214 is expanded in the form suitable for execution of the actual operation processing. Further, there is provided the component attribute file 205' wherein the file 205' is identical with the component attribute file 205 and includes the executionable process data 214.

The system of FIG. 18 further includes the object command 201 wherein the object command 201 specifies the foregoing object component.

It should be noted that the object command 201 is formed of a signature (or sallogate) and an object iD, wherein the signature is formed of the following elements.

(i) header area: Describes the location and length of the description to be explained below or the location and length of the description about the "is-a" hierarchy level, the "part-of" hierarchy level, and the sequence, in terms of bytes.

(ii) description area: Describes a summary of description of the object and contains the metadata in the compressed form. For example, the description area may include information such as "who made the object," "version number," and the like.

(iii) "is-a" hierarchy area: This area is used to represent the "is-a" hierarchical relationship. In the sentence "a dog is an animal," for example, "dog" is located in the lower hierarchy with respect to the hierarchy of "animal." Thus, the "is-a" hierarchy area indicates the situation that the lower hierarchy "dog" exits with respect to the upper hierarchy "animal."

(iv) "part-of" hierarchy area: This area is used to represent the "part-of" hierarchical relationship. For example, the "part-of" hierarchy area indicates that Arizona or California forms a hierarchy that forms a part of the United States.

(v) sequence area: A composite object is formed of a number of smaller objects. The sequence area is used to indicate the order of execution about these smaller objects including branching, in a compressed form.

(vi) object iD are: An object iD identical with the iD attached to the data in the conventional user-data database is described.

The object management unit 220 performs various functions such as creating a new object component in the component attribute file 205, modifying or deleting existing object components, integrating a plurality of object components to form a single object, and dividing a single object component into a plurality of object components.

Additionally, the object management unit 220 communicates with a plurality of objects and sets the order of processing to the individual objects according to the processing demand.

In carrying out such various processing, the object management unit 220 specifies individual object in terms of the foregoing object command.

Further, the object management unit 220 carries out the compilation of individual objects according to the needs, to create the executionable process data 214, and the executionable process data 214 thus created is used in the data processing in the terminal 101 or in the communication which is made between the terminal 101 and another terminal via the LAN or other communication network 103. As the executionable process data 214 is already compiled, the frequency of file accessing is reduced and the process speed is improved.

Figure 19A:
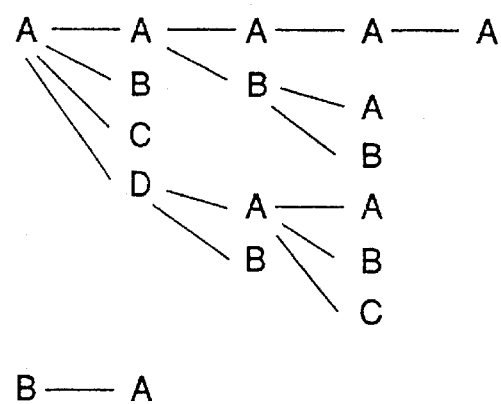
FIGS. 19A and 19B are diagrams for explaining the "is-a" hierarchy level.
Figure 19B:
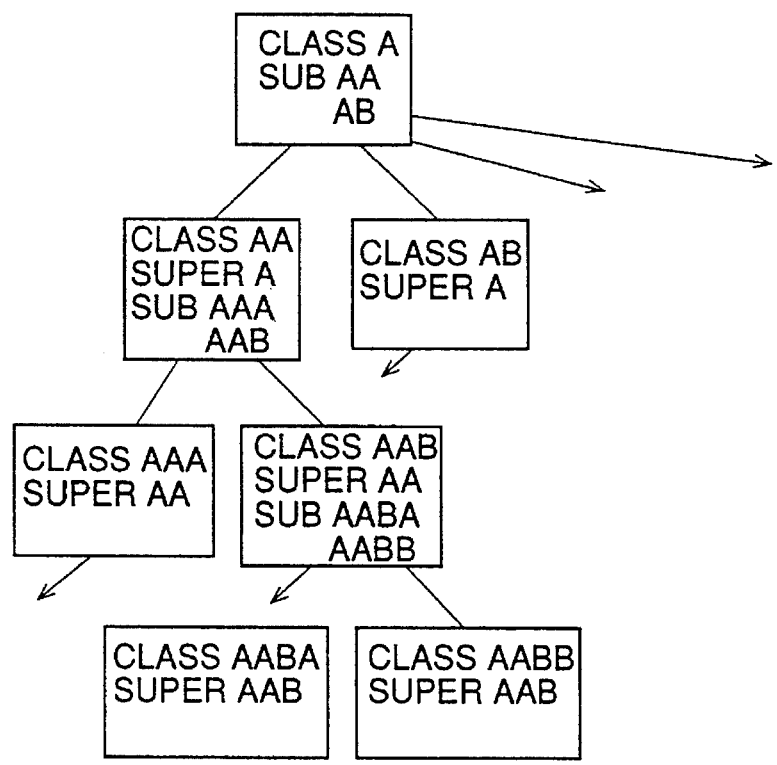

FIGS. 19A and 19B explains the "is-a" hierarchy.

Referring to FIG. 19A, it will be seen a hierarchical structure wherein (i) the symbols A and B exist in the highest hierarchical class, (ii) the symbols A, B, C and D exist in the second highest hierarchical class that belongs to the highest hierarchical class for the symbol A, (iii) the symbols A and B exist in the third highest hierarchical class that belongs to the second highest hierarchical class for the symbol A, (iV) the symbol A exists in the fourth highest hierarchical class that belongs to the third highest hierarchical class for the symbol A, (v) the symbol A exists in the fifth highest hierarchical class that belongs to the fourth highest hierarchical class for the symbol A, (vi) the symbols A and B exist in the fourth highest hierarchical class that belongs to the third highest hierarchical class for the symbol B, (vii) the symbols A and B exist in the third highest hierarchical class that belongs to the second highest hierarchical class for the symbol D, and (viii) the symbols A, B, C and D exist in the fourth highest hierarchical class that belongs to the third highest hierarchical class for the symbol A, which in turn belongs to the second highest hierarchical class for the symbol D.

FIG. 19B provides the description of the hierarchical class shown in FIG. 19A. It will be seen that FIG. 19B describes the superclasses and the subclasses for each of the class and thus the position of the class in the hierarchy.

Figure 20:
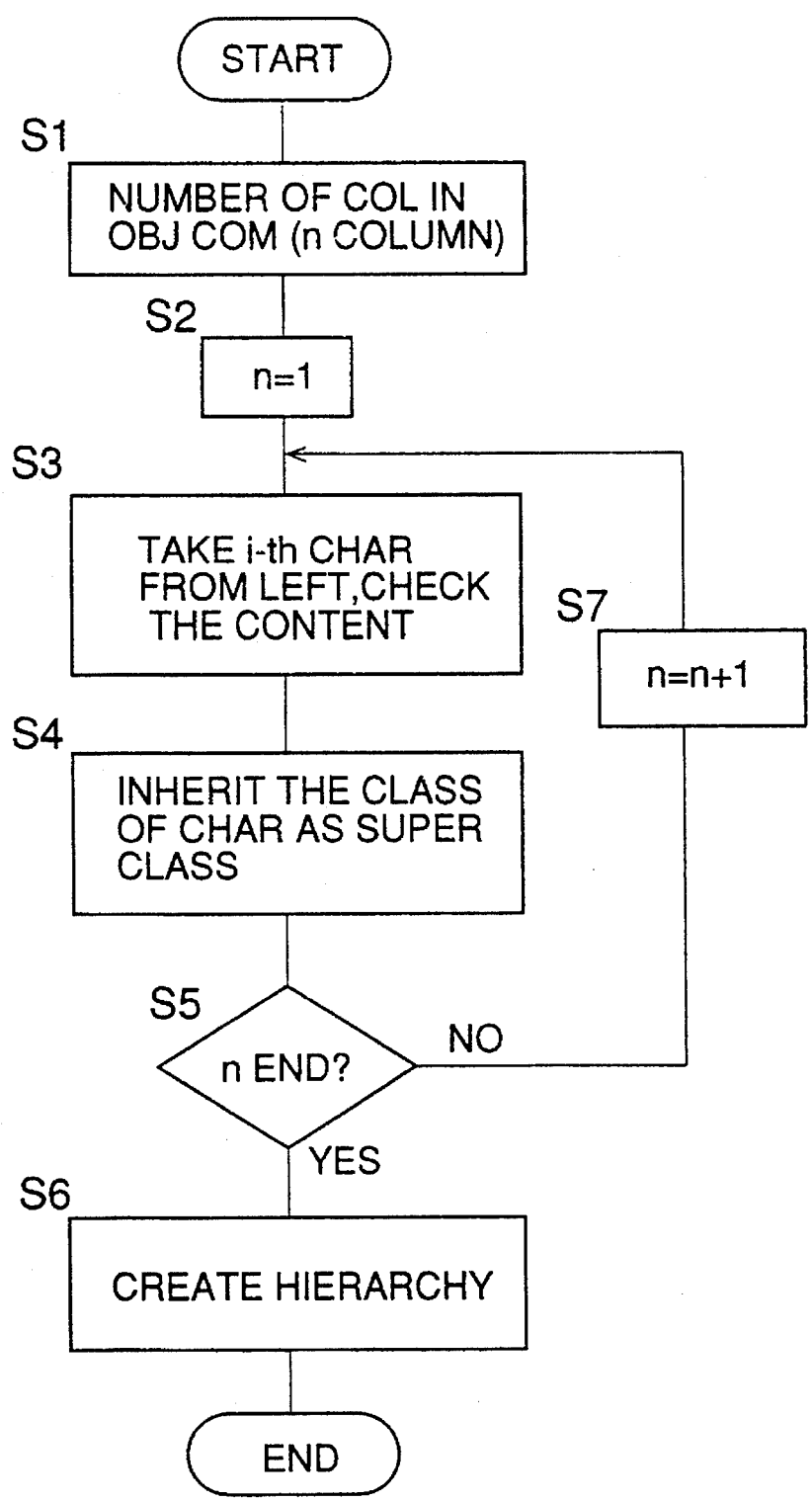
FIG. 20 is a diagram showing the reading process in the "is-a" hierarchy level.

FIG. 20 shows a reading process in the "is-a" hierarchy level.

Referring to FIG. 20, the process starts when n columns of the object command corresponding to the "is-a" procedure is given, and proceeds as follows.

(S1) The number of the columns, n, is detected.
(S2) Initialize the parameter n such that n =1.
(S3) Read the content of the character consecutively, starting from the leftmost column and collect the content thus obtained.
(S4) Inherit the class of the character for conducting processing of the next column. Assuming that the current class is AA, the reading of the next, third hierarchical class is achieved by causing the inheritance, starting from the one having the superclass AA.
(S5) Check whether or not the column n is the last column.
(S6) If the result of the step S6 is NO, the processing of the next column is carried out.

Figures 21A, 21B:
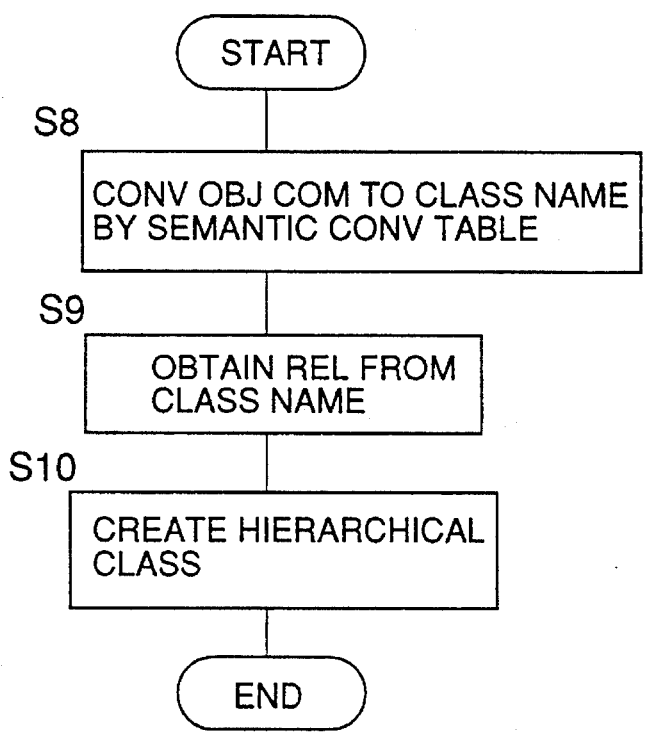
FIGS. 21A and 21B are diagrams for explaining the "part-of" hierarchy level.

FIGS. 21A and 21B explains the "part-of" hierarchy, wherein FIG. 21A shows a case wherein possible classes such as A, AA, . . . ACDD are listed. In FIG. 21A, allocation is made for the "part-of" hierarchical code of the object command such as "0000," "0001," . . . "01FF," wherein the hierarchical code has a unique value in correspondence to each class.

By doing so, a class name such as ACDD is searched in correspondence to the "part-of" hierarchical code such as "01FF." The table used for such a search process is called a semantic conversion table and designated by the reference numeral 360. In the foregoing "part-of" hierarchy, a number of children classes exist in correspondence to a single parent class. Thus, it is not possible to represent the relationship between the parent class and the children classes by a simple class name. Thus, in the event that the class ACDD is searched as indicated in FIG. 21A, a second correspondence table not shown is searched under the class name ACDD. As a result of such a search carried out for the second correspondence table based upon the class name ACDD, the parent class is extracted as "the United States" as well as the children classes such as "Arizona, " "California, "Oregon,".

FIG. 21B shows the flowchart related to the process of FIG. 21A. The steps of FIG. 21B is as follows.
(S8) Check the "part-of" hierarchical code in the object command and conduct a search in the semantic conversion table 360 to obtain a corresponding class name.
(S9) Conduct a search of the second correspondence table mentioned above based upon the obtained class name to obtain the relationship between the parent class and the children classes.
(S10) Construct a hierarchical class from the parent class and the children classes thus obtained.

Figure 22A:
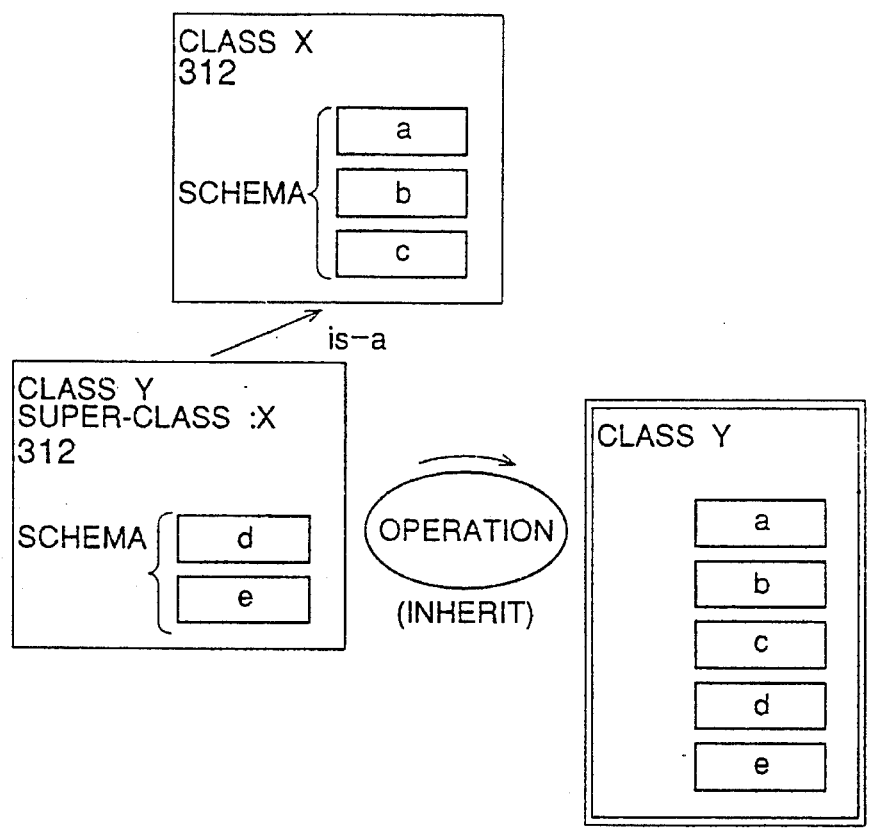
FIGS. 22A and 22B are diagrams for explaining the relationship between a plurality of classes.
Figure 22B:
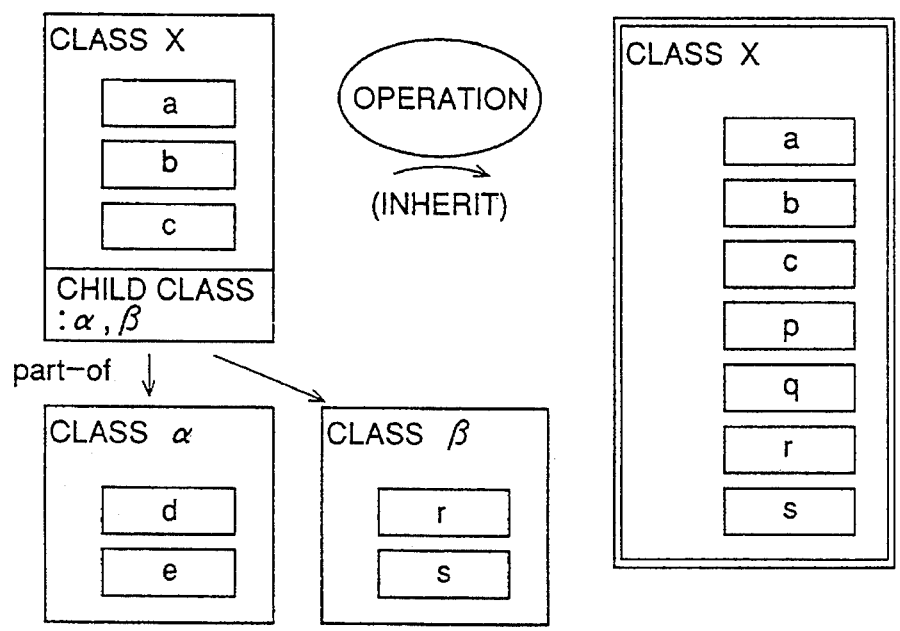

FIGS. 22A and 22B are diagrams for explaining the relationships among a plurality of classes.

FIG. 22A shows a case where a class Y has the "is-a" relationship to a class X. For example, the class X is a program related to "vehicle", and the class Y is a program related to "automobile".

In the case shown in FIG. 22A, methods a, b and c are introduced in relation to the class X, and methods d and e are introduced in relation to the class Y. In such a case, when an instruction specifies execution of the class Y, the methods a, b and c are inherited from the class X when executing the class Y, thereby executing a process based on the methods a, b, c, d and e.

FIG. 22B shows a case where classes α and β have the "part-of" relationship with respect to the class X. For example, the class X is a program related to "vehicle", and the classes α and β respectively are programs related to one of "chassis", "engine", "wheel" and the like.

In the case shown in FIG. 22B, methods a, b and c are introduced in relation to the class X, methods p and q are introduced in relation to the class α, and methods r and s are introduced in relation to the class β. In such a case, when an instruction specifies execution of the class X, a process is executed based on the methods a, b, c, p, q, r and s when executing the class X.

It should be noted that the component attribute file 205, the expansion unit 215 and the component attribute file 205' of FIG. 18 are related to those shown in FIG. 10.

It is possible to identify each of the object components 206 by way of the object command 210. Thus, it is possible to call the object components such as methods and classes held in the concealed world as indicated in FIG. 7 or FIG. 13, to the field of the static model. As the object command 201 includes the information about the corresponding object component in the compressed form, any person can easily know the function and the like, of the object component. Thus, the use of the object component is substantially facilitated.

Figure 23:
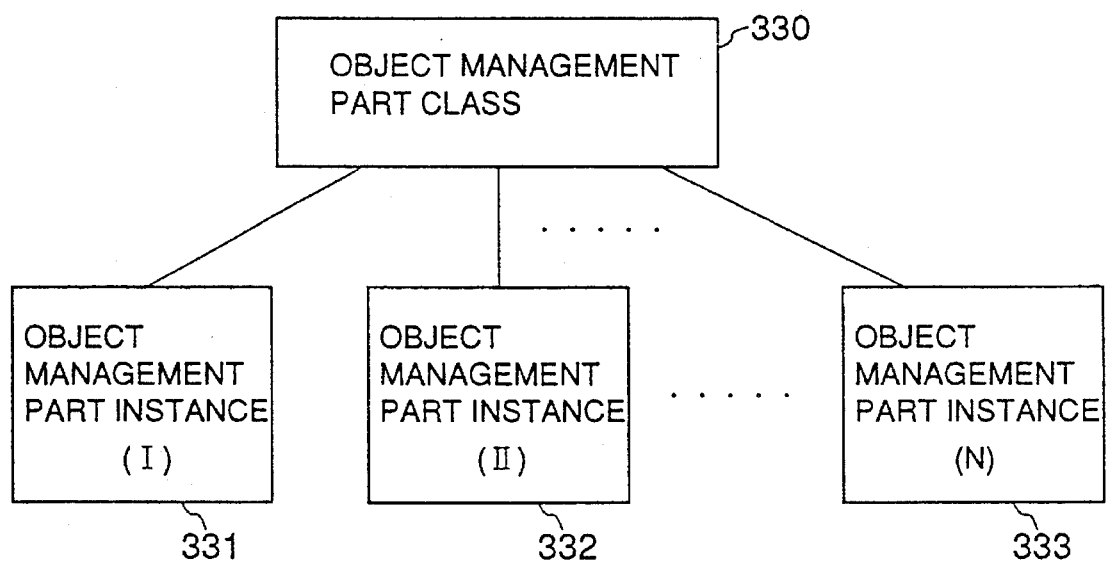
FIG. 23 is a diagram for explaining the construction in the object management unit.
Figure 24:
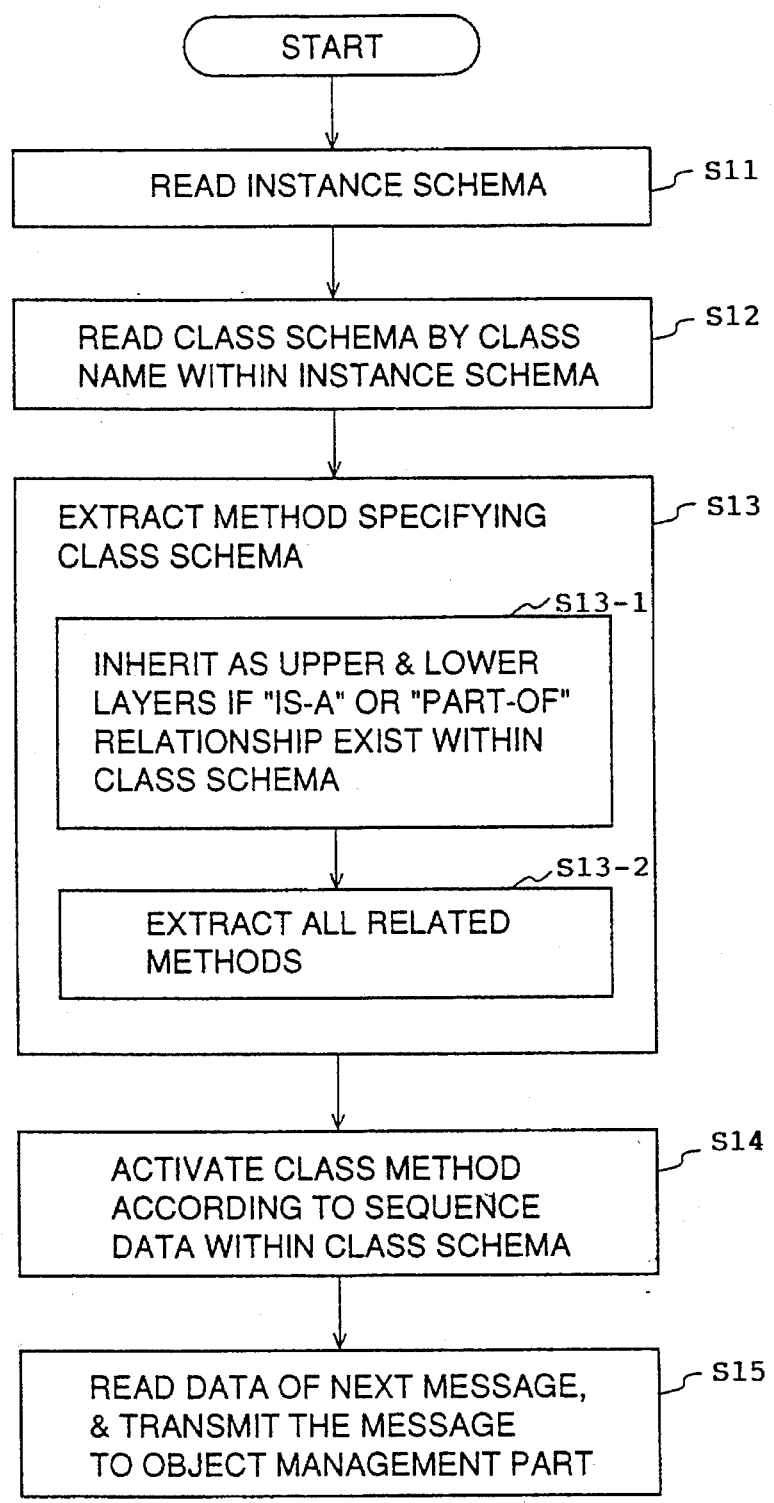
FIG. 24 is a diagram showing the flowchart of a processing in an object management unit.

FIG. 23 is a diagram for explaining the construction of the object management unit 220. The object management unit 220 shown in FIG. 23 corresponds to that shown in FIGS. 11, 13, 14 and 18, and executes a process that uses various information existing within the component attribute file 205.

As described above in conjunction with FIGS. 13 and 14, the object management unit 220 executes a process in response to the messages, and thus, it must be possible to execute a plurality of message processes in parallel. For this reason, an object- management-unit class 330 is prepared, and it is made possible to generate a plurality of object-management-unit instances 331, 332, . . . , 333 in correspondence to the reception of the messages. One object-management-unit instance is assigned in correspondence to the reception of each message, and a plurality of messages are processed in parallel by processing a plurality of object-management-unit instances in parallel. Of course, if the messages are concentrated within a short time period, a wait queue is formed in correspondence with each of the object management instances such as the object management instance 331.

Figure 26:
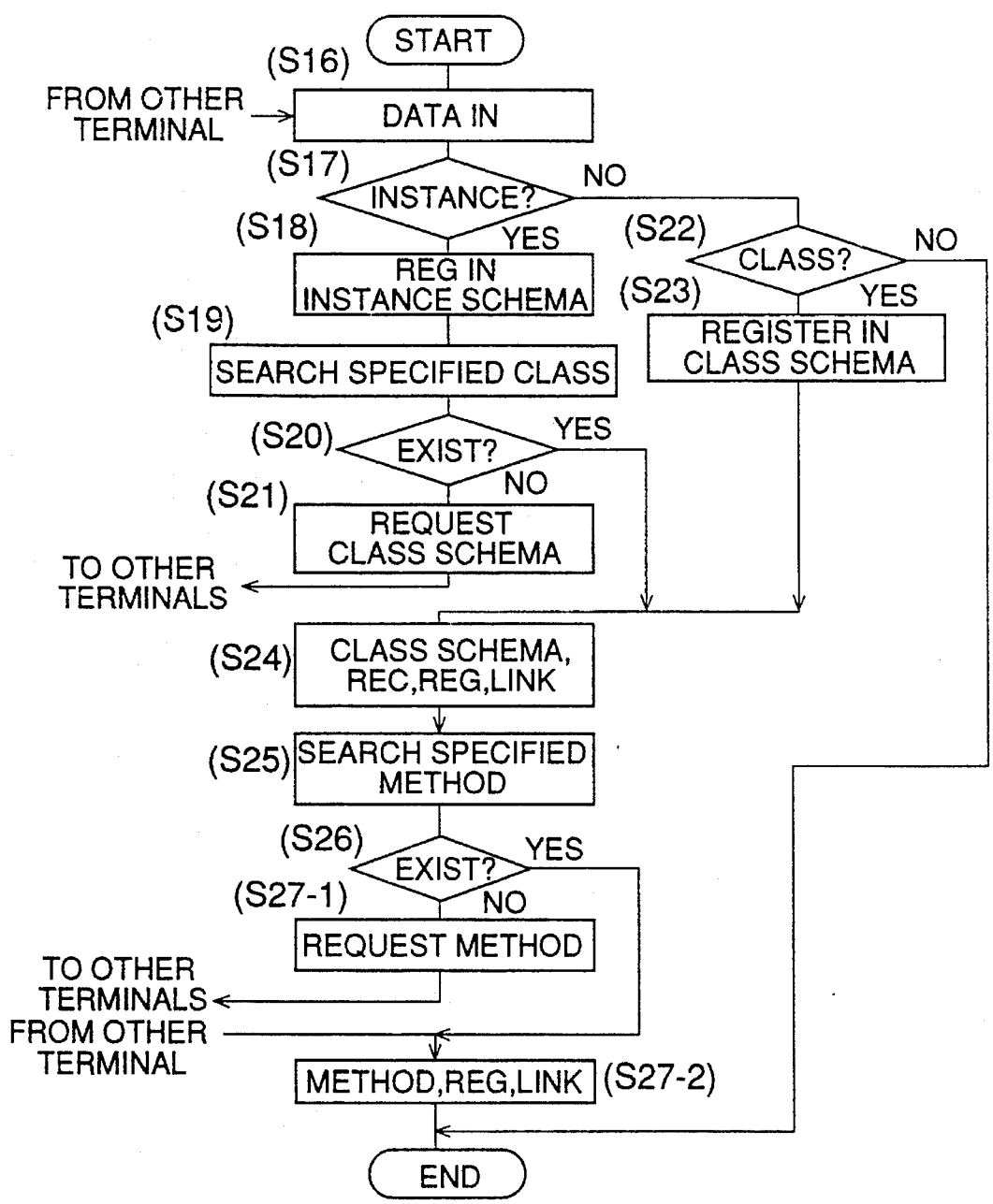
FIG. 26 is a diagram showing the flowchart of a processing in the object management unit.

FIG. 26 is a flow chart for explaining the operation of the object management unit 220. Hereinafter, the steps of FIG. 26 will be described.

In FIG. 26, a step S11 reads the instance schema 316 in correspondence with the instance which is required when executing the message in correspondence with the message. A step S12 reads a class schema 312 by the class name described within the instance schema 316. In addition, a step S13 extracts the method specified by the class schema 312 based on the content of the class schema 312, As a result, the required method is extracted. If upper or lower classes which are in the "is-a" or "part-of" relationship exist within the class schema 312, such classes are obtained.

This means that the methods of the related classes are inherited as described above in conjunction with FIGS. 22A and 22B. In other words, a step S13-1 obtains the class having the "is-a" or "part-of" relationship, and a step S13-2 extracts all of the related methods.

A step S14 successively activates the methods introduced into the class according to the sequence data described within the class schema 312. A step S15 executes a process for the next message when the above described process corresponding to one message ends.

As described with reference to FIGS. 12, 13 and 14, the present invention constructs a new system according to a new objective by regarding the methods and classes as an object component. In such a system, however, it is not always true that each of the terminals 101 connected by way of the network 103 has all the necessary object components in the component attribute file 205 of that terminal.

In such a case, it becomes necessary to transfer the classes or instances. In the present invention, such a transfer is achieved by regarding the class schema or method corresponding to the class or the instance schema corresponding to the instance as data for transmission. As a result, the class schema, the method, an the instance schema become available in any of the terminals and the terminal can carry out the processing.

Figure 25A:
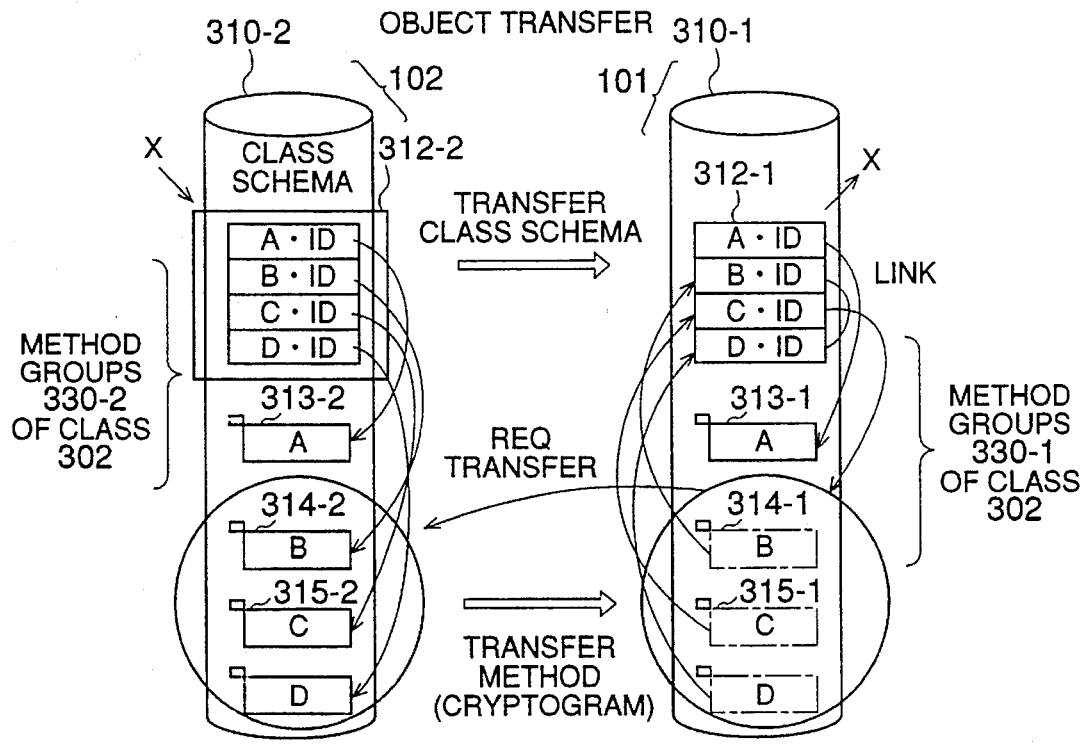
FIGS. 25A and 25B are diagrams for transferring an object.
Figure 25B:
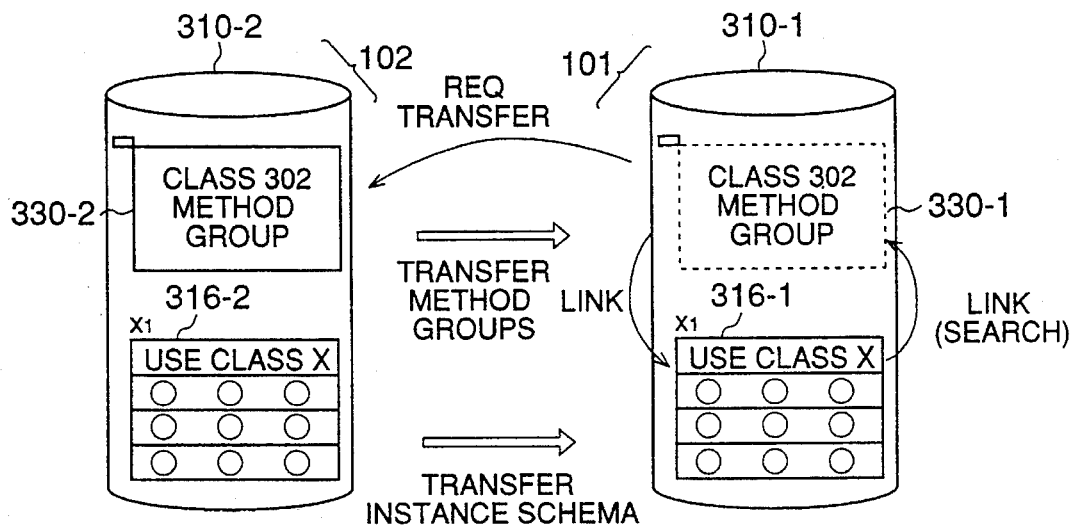

FIGS. 25A and 25B show the transfer of the objects, wherein the system of FIGS. 25A and 25B includes an own terminal represented by the referent 101 and the other terminal represented by the reference 102. Each of the terminals 101 and 102 has a data processing system and operates as an object-oriented data processing system.

FIGS. 25A and 25B further show internal schema 310-1 and 310-2 and the class schema 312-1 and 312-2 that are used for creating a class by incorporating a desired method iD corresponding to a desired class. Further, there are provided methods 313-1, 313-2, 314-1, 314-2, 315-1, 315-2, ... as well as instance schema 316-1 and 316-2, wherein the instance schema 316-1 and 316-2 are used for creating an instance corresponding to the vacant program by setting the desired individual data (instance data) in correspondence to the class that is created by the foregoing class schema 312. Further, there are provided method groups 330-1 and 330-2 that represent the class itself or the method groups incorporated into the class. Hereinafter, the method groups 330-1 and 330-2 will be referred to as a method group of the class.

When a user requests an execution of a desired processing, the classes and the instances are created as described below. The desired operation of the user is thereby achieved by executing the instances thus created.

Thus, the operator describes, on the class schema 312, the method iD of the methods or method group such as "A," "B," "C," "D,"... of FIG. 25A that may be needed in dealing with the request of the user. Thus, the individual methods and the method iDs are linked with each other. Each of the methods may be regarded as a program unit that is sufficient for performing a predetermined operation. In the present case, it is assumed that the methods exist already. Of course, one may create a new method according to the need.

Further, the operator describes the method iD on the foregoing class schema 312 to create a class. Further, the instance that actually carries out the execution is created.

When creating the instance, the name of the class that the instance uses is described on the instance schema 316. Further, the instance data used by the method incorporated into the class is set on the instance schema 316.

In FIG. 25A, the class name is represented by a symbol X and the instance schema 316 corresponding to the instance that uses the class X is designated by $x_1$. Further, the symbol "ooo" in the instance schema 316 shown in FIG. 25B represents the instance data.

When carrying out a processing against a subject according to the processing demand as in the present case, a class and an instance are provided, wherein the class corresponds to a formula in the mathematics and contains generalized names as variables, while the instance includes instance data for the class. Thus, the class provides a value for each of the foregoing variables. Thus, the desired processing is executed based upon the instance.

The transfer to the classes and the instances between different object-oriented processing systems is conducted as follows.

FIG. 25A shows the mode for transferring a class according to a need. Assuming that the class schema 312-2 does not exist in the terminal 101 in which the processing is to be carried out, the terminal 101 receives a transfer of the absent class schema from the other terminal 102.

In the illustrated case, the terminal 102 transfers the class schema 312-2 therein to the terminal 101, wherein the class schema 312-2 thus transferred is set in the terminal 101 as the class schema 312-1.

In this state, the object management unit (shown in FIGS. 11, 13, 14, 18, 23 and 24) checks, based upon the method iDs described in the class schema 312-1 such as A.ID, B.ID, C.ID, ..., whether or not there exist corresponding methods 313-1, 314-1, 315-1, and the like, in the terminal 101. With this process, a link is set.

In the event that the terminal 101 includes the method 313-1 alone while the methods 314-1, 315-1, ... are absent in the terminal 101, the terminal issues a transfer request to the other terminal such as the terminal 102 that has the missing methods. In response to the request, the terminal 102 transfers the methods 314-2, 315-2, ... to the terminal 101. Upon reception of the methods, the object management unit in the terminal 101 sets a link between each of the method iDs in the class schema 312-1 and the corresponding methods 314-1, 315-1, .... With this, the class specified by the class schema 312-1 is incorporated into the terminal 101. In other words, a learning of the corresponding class is achieved.

FIG. 25B shows the mode of transferring an instance according to the needs. In the event that the instance schema 316-1 is absent in the terminal that is going to carry out a processing that uses the instance schema 316-1, the terminal 101 accepts a transfer of the instance schema from the other terminal such as the terminal 102.

In the illustrated state, the terminal 102 has transferred the instance schema 312-2 therein to the terminal 101, and the instance schema 312-2 has formed the instance schema 312-1 in the terminal 101.

In this state, the object management unit in the terminal 101 operates, based upon the class name X described in the schema 316-1, to set a link with respect to the method group 330-1 for the corresponding class. It is needless to say that the terminal 101 requests transmission of the class schema or method to the other terminal 102 in the event the method group 330-1 for the corresponding class does not exist in the terminal 101. The mode of operation corresponding to this request is identical to the one described above with reference to FIG. 25A.

When the class schema 312-1 and the methods 313-1, 314-1, 315-1, and the like, are all become available, the link is set in the terminal 101 between each method iD in the class schema 312-1 and the corresponding instance data in the instance schema 316-1. Thus, the terminal 101 performs the desired operation by executing the instance.

In the foregoing construction, the terminal 101 is possible to execute requested processing by receiving any necessary program from the other terminal 102 via the network.

It should be noted that the class schema 312, method 313, the instance schema 316, and the like, are treated simply as data when carrying out the foregoing transfer. Thus, the object management unit in the terminal that has received the transfer carries out the aforementioned processing such that the program is executionable in the terminal.

It should be noted that the transfer of the class schema 312, method 313, and the like, is carried out in the form of cryptogram in view point of maintaining security.

FIG. 26 shows the flowchart of operation of the object management unit. The operation of FIG. 26 proceeds as follows.

(S16) The terminal 101 receives data.

(S17) An examination is made whether or not the data corresponds to the instance schema.

(S18) When the result in the step S17 is NO, a jump is made to the step S22, When the result is YES, on the other hand, the step S18 carries out registration of the data corresponding to the instance, as the instance schema 316-1.

(S19) The object management unit in the terminal 101 searches for the class X described in the instance schema 316.

(S20) When the class exists, a jump is made to the step S24. In not, a jump is made to the step S21.

(S21) The terminal 101 requests the class schema 312 to the terminal 102.

Thus, the terminal 101 receives the class schema 312-1 according to the process described above. In the case that the data transmitted from the terminal 102 corresponds to the class schema, or does not correspond to any of the class schema and the instance schema, the type of the data is examined in the step S22, after the steps S16 and S17.

(S23) In the event the data is not a class schema, the operation is terminated. When the data is a class schema, on the other hand, the class schema is registered.

(S24) After the class schema 312-1 is set, the link is set to each of the methods.

(S25) The specified methods are searched.

(S26) A jump is made to the step S27-2 when all the specified methods exist.

(S27-1) When one or more methods are missing, the missing methods are transferred from another terminal.

(S27-2) The methods are registered, and a link is set with respect to the method iD in the class schema.

As described above, the present invention grasps the system tailored for a new demand in the form of classes and instances. As a result, the system can be freely designed with respect to the objective of the processing. Further, the system thus designed can be easily used later for other processing. When doing such a reuse of the system, it is necessary to take into account the causality explained with reference to FIG. 7.

Figure 27:
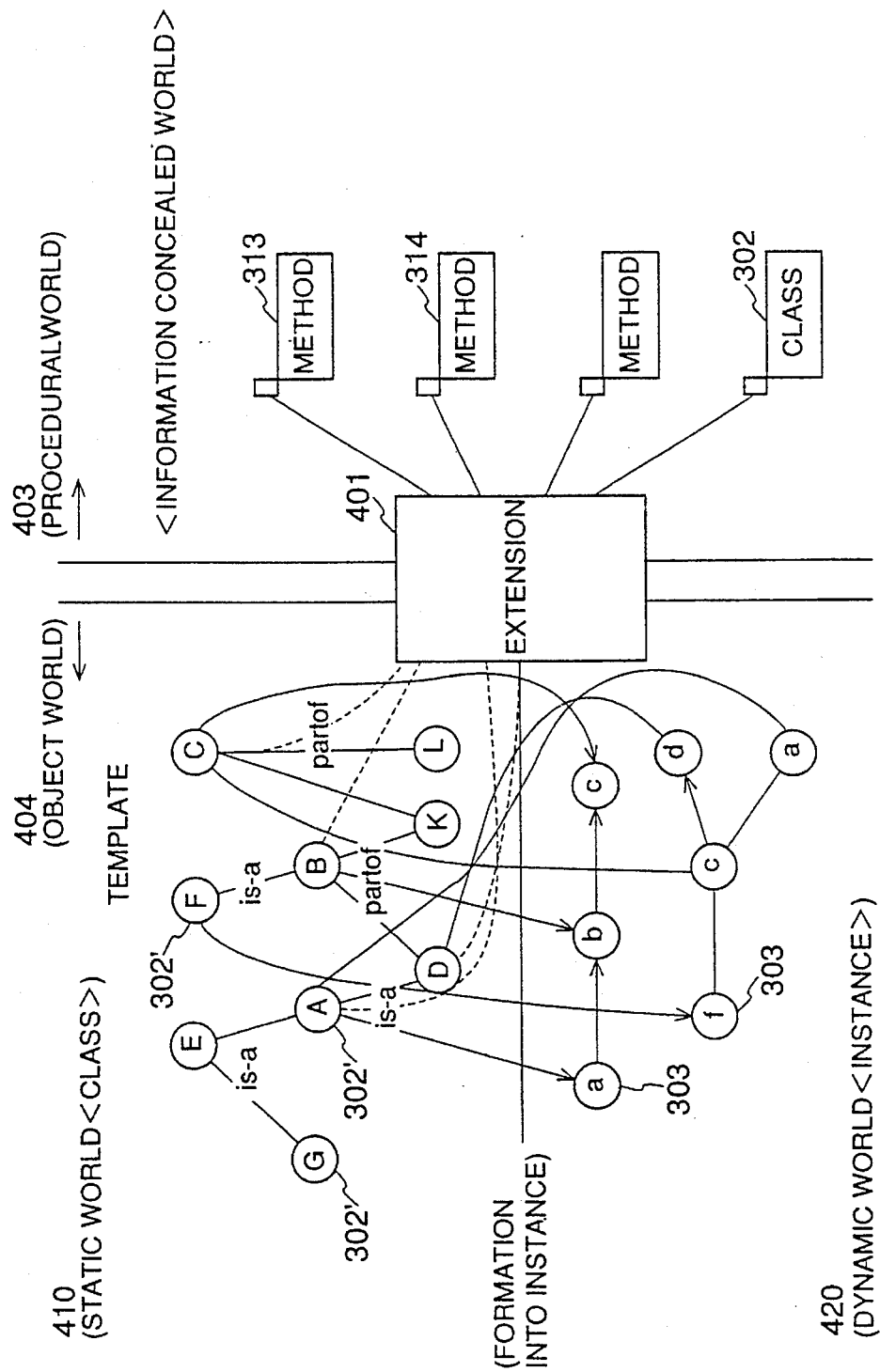
FIG. 27 is a diagram for explaining the execution of the processing.

FIG. 27 explains the execution of the processing, and shows an extension 401 which corresponds to the extension shown in FIG. 8, a procedural world 403 which corresponds to the internal definition or connotation shown in FIG. 8, and an object world 404 which represents the model of the real world.

When forming the model of the real world (for example, the requested objective process), the present invention uses a static world 410 and a dynamic world 420. The static world 410 specifies the relationship among the classes and/or methods which are required to form the model. On the other hand, the dynamic world 420 specifies the time sequential relationship of the processes of the instances which are obtained when forming the model.

The classes and/or methods specified in the static world 410, and composite classes which are respectively obtained by adding or integrating the classes, are represented hereinafter by classes 302'.

The numeral 302 represent the class located in the procedural world 403, and the reference numeral 303 represent the instance, the reference numerals 313, 314, . . . represent the method.

The methods 313, 314, . . . are existing processing units for respectively executing the individual processes. In order to execute a more complex process, a plurality of methods are introduced from the group of methods to form the class 302. Further, if necessary, a plurality of classes are introduced from the group of classes and a plurality of methods are introduced from the group of methods to form a composite class in order to execute a more complex process. Such classes 302 and the composite classes respectively correspond to one object unit.

It will be assumed for the sake of convenience that such methods and classes already exist.

For example, suppose that a user requests processing of an objective process for a certain kind of process. In the present invention, the classes and methods required to process the demanded process are introduced in order to process the demanded process, and the mutual relationships among the classes and methods are determined. The static world 410 describes information related to the mutual relationships.

In the case shown in FIG. 27, A, B, C, D, E, F, G, K and L are introduced as the classes 302' for the purpose of processing the objective process. (i) The classes G and A respectively have the "is-a" relationship with respect to the class E, (ii) the class D has the "is-a" relationship with respect to the class A, (iii) the class B has the "is-a" relationship with respect to the class F, (iv) the classes D and K respectively have the "part-of" relationship with respect to the class C, and (v) the classes K and L respectively have the "part-of" relationship with respect to the class C. Actually, the class 302' described in the static world 410 is given by use of an identification (ID) or identifier which is sufficient to point the class 302, the method 313 or the like existing in the procedural world 403.

The classes 302' have corresponding relationships to the classes and methods existing in the procedural world 403. In other words, the classes 302' are programs for executing the individual processes and are similar to formulas in mathematics, where it may be regarded that the values within the programs are given by general variables. The instances 303 are obtained by setting the instance data with respect to the general variables of the classes 302' and forming specific programs in which the individual instance data are assembled.

In the dynamic world 420, the processing time sequence of instances a, b, c, . . . corresponding to the classes 302' introduced in the static world 410 are specified, and the process requested by the user is executed.

As described above, if the user requests processing of a certain objective process, for example, the classes A, B, C, D, E, F, K and L are specified in the static world 410 as the classes 302' which are required for the processing of the objective process. In addition, the relationships such as "is-a" and "part-of" relationships are clarified among the classes 302'. Actually, a state table is prepared and the relationships are described in the state table. If restrictions exist among the classes 302' in respect of the causality, information related to such restrictions are also described in the state table.

When processing the objective process requested from the user, the introduced classes 302' are not used as they are. In other words, the instances 303 in which the individual instance data are set, are used with respect to the general variables within each of the classes 302'. In addition, the processing is made according to the time sequential relationship of each of the instances which are processed.

In the case shown in FIG. 27, the instance a corresponding to the class A, the instance b corresponding to the class B, the instance c corresponding to the class C, the instance d corresponding to the class D, and the instance f corresponding to the class F are generated. In addition, there are shown (i) a session in which the instances a, b and c advance in this sequence, and (ii) a session in which the instances f, c, d and a advance in this sequence.

When generating the instance a, the instance a is of course generated using the class A which corresponds to the formula. In this case, since the class A has the "is-a" relationship with respect to the class E, it is regarded that the contents indicated in the class E are inherited to the class A, and the instance a is generated using both the classes E and A.

On the other hand, since the classes D and K respectively have the "part-of" relationship with respect to the class B, the instance b is generated using the classes B, D and K.

When executing each session, the state table described above existing in the static world 410 is inspected and the start of execution of the instance a, for example is written into the state table when starting the execution of the instance a. When the processing of the instance a ends, this end is written into the state table. Hence, the restrictions corresponding to the causality existing in and described in the static world 410 are written into the state table without omission. Of course, new restrictions may be generated, but the new restrictions can be given in correspondence with each of the sessions. However, the causality generated when the classes 302' are introduced and related in the static world 410 are described in the static world 410, and is inherited to the processing of the session in the dynamic world 420.

Figure 28:
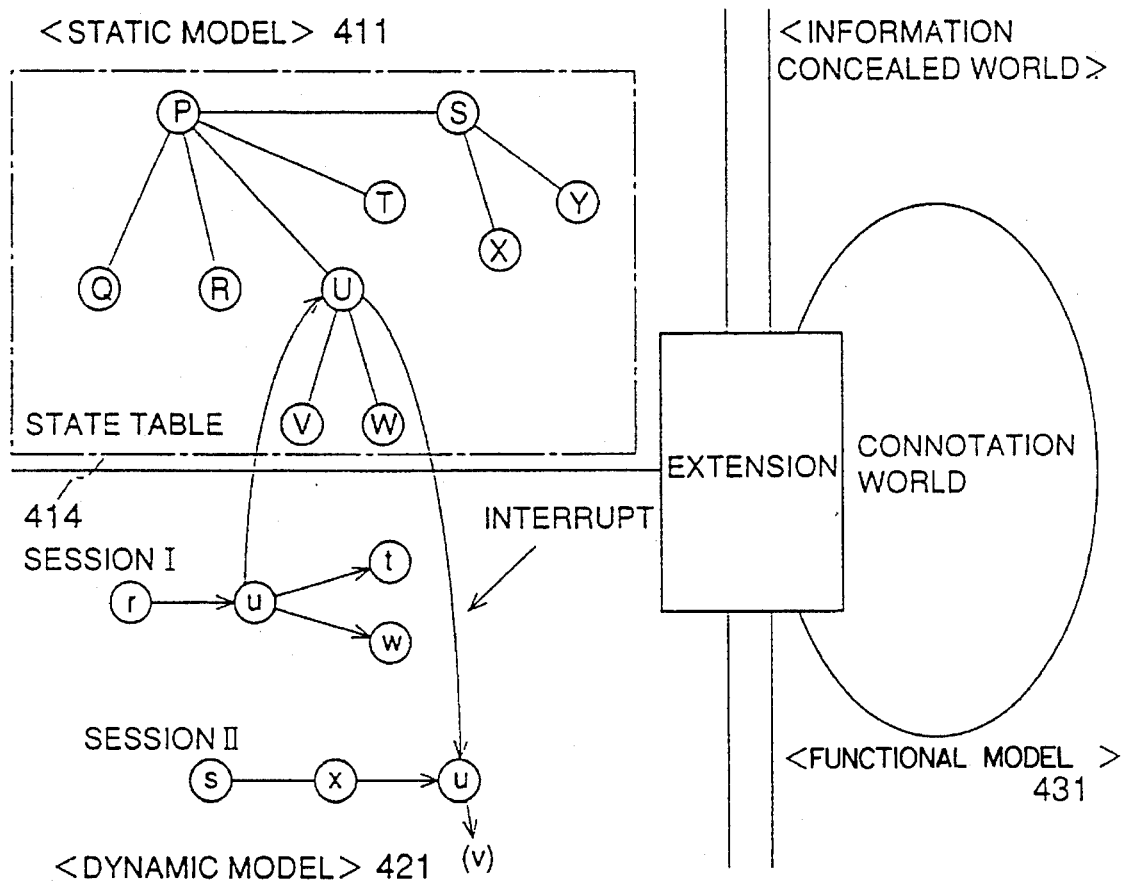
FIG. 28 is a diagram for explaining the mode of incorporating causality when executing a session.

FIG. 28 is a diagram for explaining the introduction of causality when executing a session. In FIG. 28, an element 414 indicates the same state table as that shown in FIG. 7.

In the case shown in FIG. 28, it is indicated that classes P through Y are incorporated as the information within the state table 414 for a certain process. The classes Q, R, S, T and U exist under the class P, the classes X and Y exist under the class S, and the classes V and W exist under the class U. In addition, instances r, u, t, w, s and x are generated and the session is assembled.

A session I and a session II are executed under the dynamic model 421. However, during the time when the individual instances such as the instance u carries out its own process, it is unnecessary to take into consideration the causality with other instances. For example, the content of the state table 414 is checked at the time when the instance u starts its own process, and the process is executed after checking whether or not no violation is made with respect to the restrictions of the causality. It is sufficient to report the causality to the state table 414 at the time when the process of the instance u is ended.

In a case where, as a result of executing the instance u in the session I, it becomes necessary to execute another instance v instead of executing the instance u in the session II, a branch is made to the instance v by making an interrupt to the instance u of the session II based on the execution end report of the instance u of the session I. Alternatively, the dynamic model 421 is notified of the above when starting the instance u of the session II.

Figure 29:
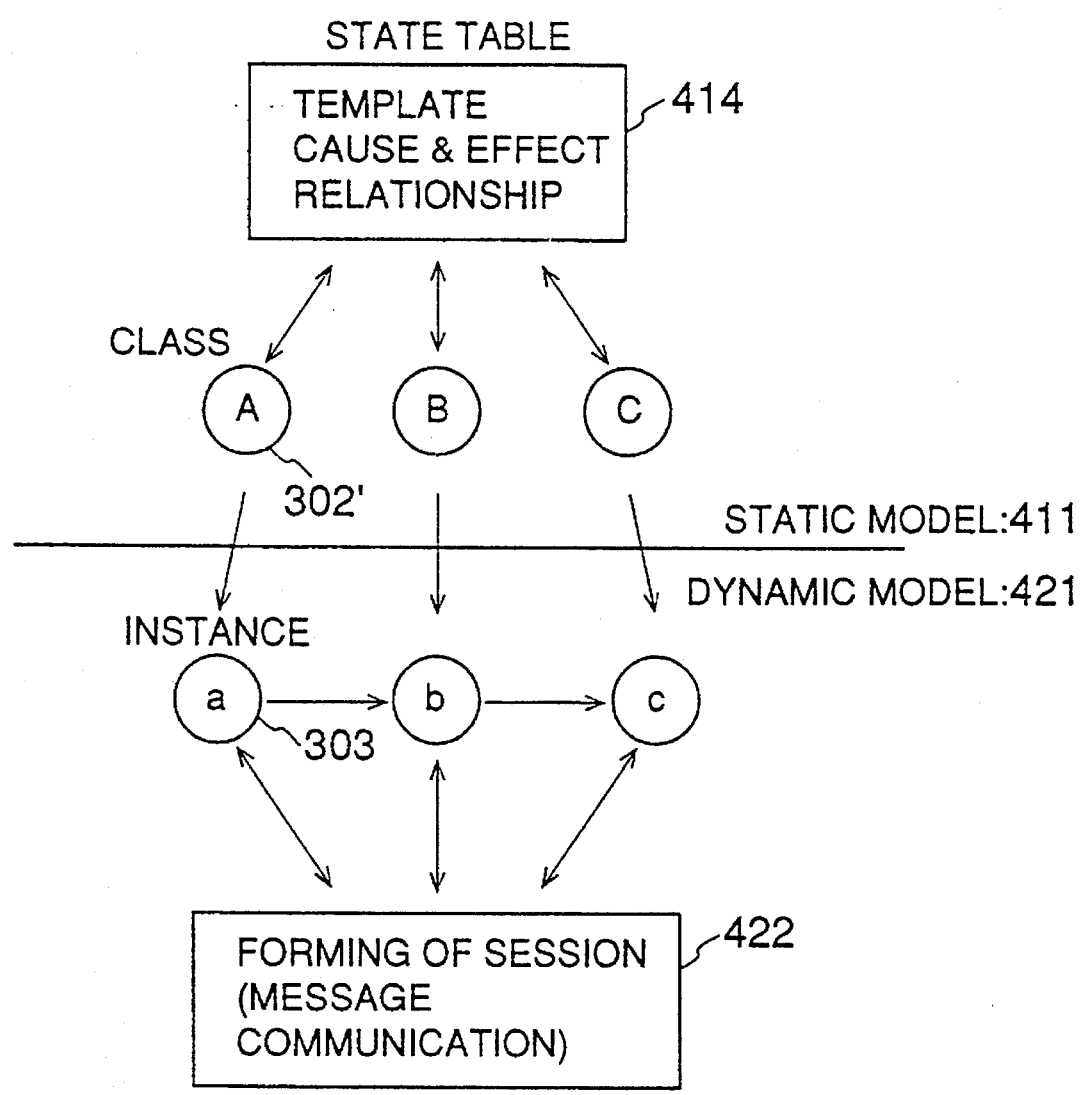
FIG. 29 is a diagram for explaining the relationship between the existence of a class and the execution by an instance.

FIG. 29 is a diagram for explaining the relationship between the existence of the class and the process execution by the instance.

As described above, the template and the causality are described in the state table 414 for the group of classes 302'. In the case shown in FIG. 29, the instances a, b and c are generated in correspondence with the classes A, B and C which are introduced as the classes 302', the instance b is activated by the message communication in correspondence with the end of the process of the instance a, and the instance c is activated by the message communication in correspondence with the end of the process of the instance b. When forming the session which is a combination of these instances, the instruction is given by the operator as shown on the lower portion of FIG. 7 as "(session forming)" and "(parallel operation timing)" and the results are described within the dynamic model and used when executing the session.

Figure 30:
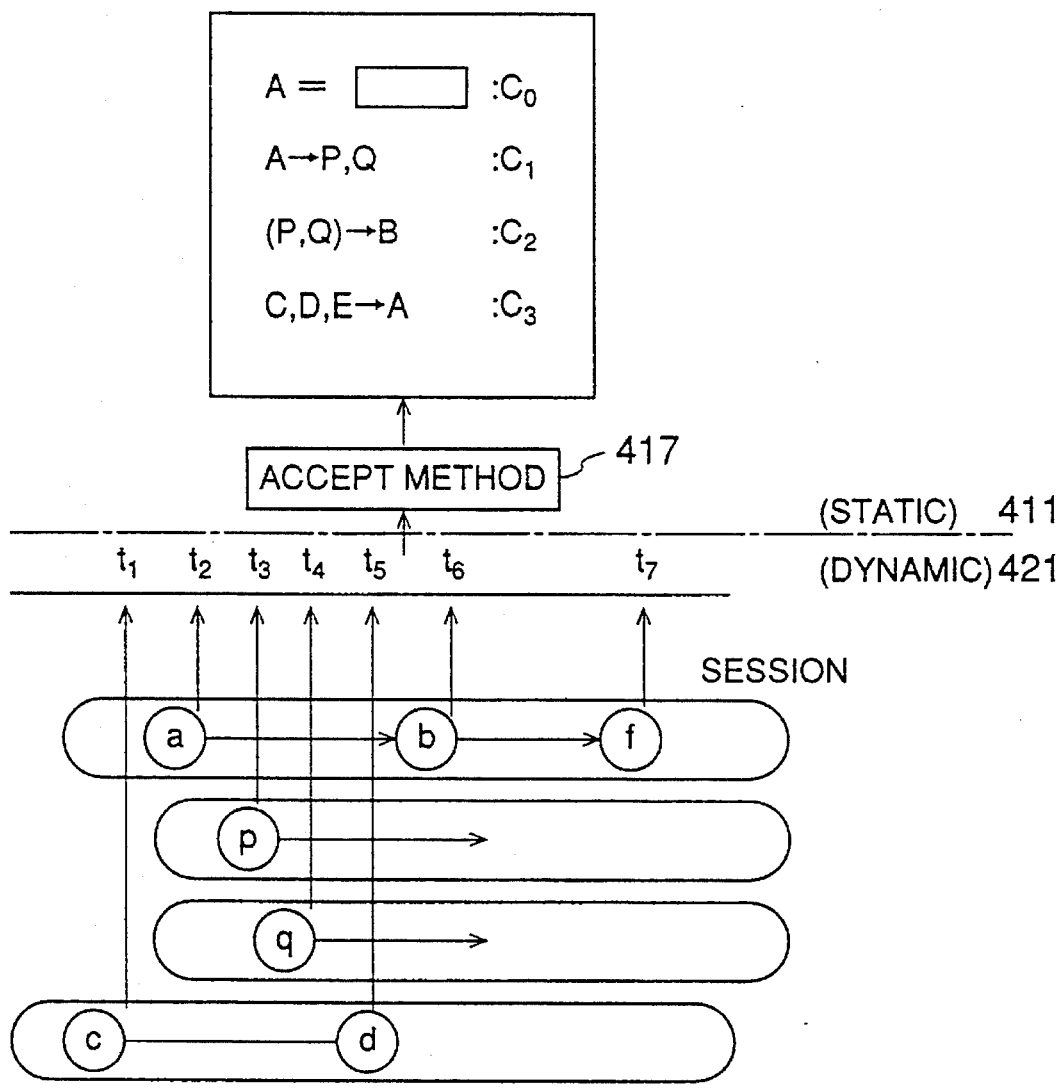
FIG. 30 is a diagram for explaining the mode of checking of the causality when executing a session.

FIG. 30 is a diagram for explaining the checking of causality when executing the session. FIG. 30 shows a static model 411, a causality restriction group 415, and an accept method 417. In addition, classes A, B, P, Q, C, D and E indicated by the capital letters respectively correspond to the classes 302', and instances a, b, f, p, q, c and d indicated by the small letters respectively correspond to the instances which are obtained using the corresponding classes.

In the case shown in FIG. 30, it is assumed that the following restrictions exist within the causality restriction group 415.

(a) The class A receives a restriction within the own class A. A restricting condition $C_O$ is described as A=(blank).
(b) The class P or class Q may start on the condition that the process of the class A ended. A restricting condition $C_1$ is described as A→P, Q.
(c) The class B may be started on the condition that the processes of both the classes P and Q ended. A restricting condition $C_2$ is described as (P, Q)→B.
(d) The class A may start on the condition that the class C, class D or class E ended. A restricting condition $C_3$ is described as C, D, E→A.

When the above described restricting conditions $C_0$, $C_1$, $C_2$ and $C_3$ are given, the restricting conditions $C_0$ through $C_3$ are checked via the accept method 417 at the time of starting the instance a, when executing the session in the dynamic model 421. In this case, the conditions $C_0$ and $C_3$ are satisfied and the processes are started. At a time $t_2$ when the process of the instance a ends, the state table is notified of this end via the accept method 417.

Next, when the processes of the instances p and q are started, a check is made to determine whether or not the restricting condition $C_1$ is satisfied. In addition, when starting the instance b, a check is made to determined whether or not the restricting condition $C_2$ is satisfied.

Figure 31A:
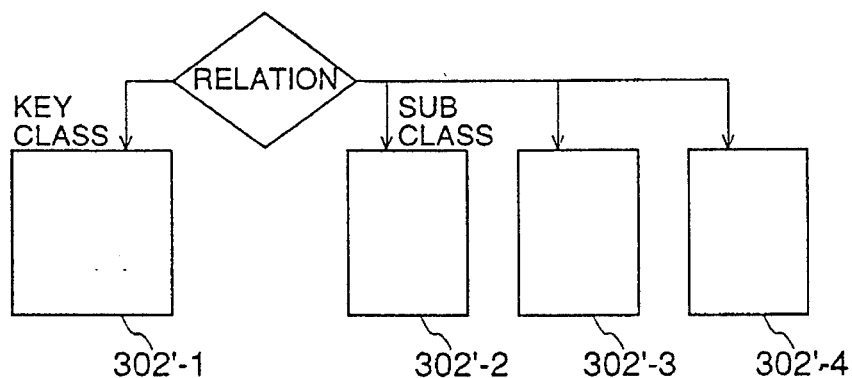
Figure 32B:
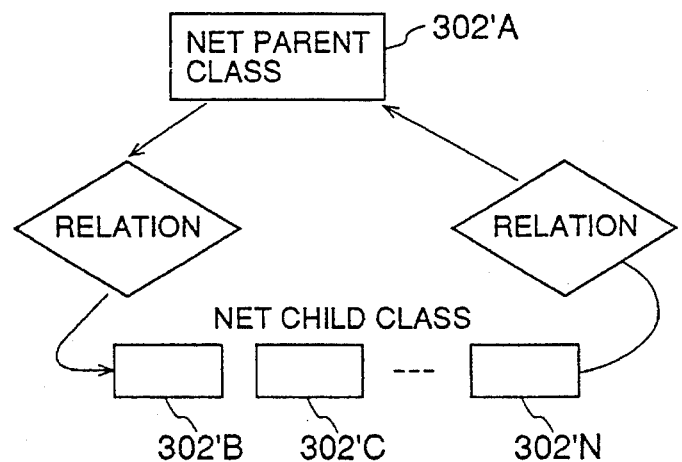
FIG. 32 is a diagram showing the communication between terminals used in the present invention.
Figure 31C:
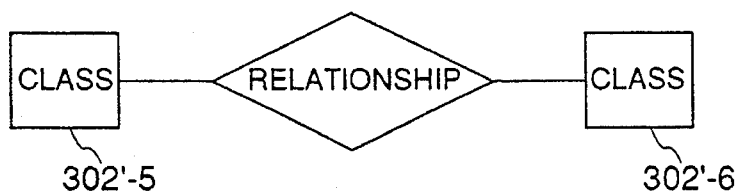

FIGS. 31A, 31B and 31C are diagrams for explaining the lateral relationships among the classes. FIG. 31A shows a case where a relational link exists, FIG. 31B shows a case where a network link exists, and FIG. 31C shows a case where a twin link exists. In FIGS. 31A, 31B and 31C, the classes are denoted by reference numerals 302'-1, 302'-2, . . . , 302'A, 302'B, . . .

On the other hand, there exist a case wherein the mutual relationship may be of the same layer between two classes or among two or more classes. In other words, instead of the relationship between the upper and lower layers, the classes in the same level may have a lateral relationship. Among the classes having such a lateral relationship, it is desirable in some cases to use the information described in only one class for another class if necessary. FIGS. 31A through 31C show typical examples of such lateral relationships.

In FIG. 31A, the classes 302'-2, 302'-3 and 302'-4 respectively have the same predetermined relation to the key class 302'-1. The "relation" shown in FIG. 31A is the relation information described in one memory region.

In FIG. 31B, when another class is searched under a certain relation from the net parent class 302'A, the net child class 302'B, the net child class 302'C, . . . , and the net child class 302'N are sequentially found. In addition, the net parent class 302'A is found when a search is made under a certain relation from the net child class 302'N.

In FIG. 31C, the information relating to the relationship of the two classes 302'-5 and 302'-6 exists only between these two classes 302'-5 and 302'-6.

In each of the cases shown in FIGS. 31A, 31B and 31C, the information related to "relation" or "relationship" generally exists in the memory region which is accessible in common by each of the classes, and each of the classes share the information if necessary.

Similarly to the "is-a" and "part-of" relationships described above, the lateral relationships shown in FIGS. 31A through 31C is one form of mutual relationship between the classes, and is held in the field of the static model. Further, as shown in FIG. 11 or in FIGS. 25A and 25B, the terminals including the terminal 101 are connected with each other by a network 103 such as LAN for achieving necessary communication of information. In the communication, the information is exchanged in the form of object, and the terminals performs the processing.

There are several known systems that execute a processing in a terminal by receiving necessary information from another terminal or center station. Further, there are systems that ask another terminal to execute a process by sending thereto the information necessary for processing.

(i) Local Processing System

In the local processing system, the data processing system in a terminal such as the one located in the terminal 101 uses a program therein to process the data subjected to processing. Further, the data processing system receives transfer of necessary data from another terminal for processing, via the network 103.

(ii) Client Server System

In the client server system, the data processing system in the terminal 101 requests the acquisition of data to be processed to the server. With this, the server checks the location of the requested data by consulting to a table therein. For example, the server identifies that the requested data exists in the terminal 102 based upon the table and receives transmission of the desired data from the terminal 102. Thereafter, the server transfers the data thus received to the terminal 101. The data processing system in the terminal 101 then carries out the processing based upon the data thus transmitted.

(iii) Provisional Center System

In the provisional center system, each terminal such as the terminal 102 manage the record of the terminal by itself. Further, a registration is made in a provisional center of the fact that the record is held in the terminal 102. Thus, in the case a terminal such as the terminal 101 wishes to use the record that does not exist in the terminal 101, the terminal checks the provisional center of the existence of such a record. Based upon the result of checking, the terminal 102 communicates with the terminal 101 and acquires the necessary record by way of transfer from the terminal 101.

(iv) Plural Provisional Center System

In this system, a plurality of groups are connected to a common network and each of the groups include a provisional center. Thus, the processing similar to the provisional center system is carried out inside the group. When a terminal such as a terminal 101 belonging to a group wished to have transfer of record from another terminal 102 belonging to another group, the provisional center in the group communicates with the provisional center of the other group via a network 115 (not shown) that connects the provisional centers in the plurality of groups.

Thus, the terminal 101 first sends an inquiry to the provisional center such as a center 114-1 (not shown) that belongs to the same group. When it turned out, as a result of the inquiry to the center 114-1, that the desired data does not exist in the group to which the terminal 101 belongs, the provisional center 114-1 sends an inquiry to other provisional centers in other groups via the inter-center network 115. When a center 114-2 (not shown) of a group sends a response that the requested data exists in the terminal 102 that belong to the group of the center 114-2, this information is notified to the terminal 101. In response to this, the terminal 101 receives transfer of necessary data from the terminal 102.

(v) Broadcast System

In the broadcast system, a terminal 101 sends a broadcast message to all the terminals in the system via a global bus type LAN when it becomes necessary to have a record. The terminal such as the terminal 102 that has the requested record, responds to the broadcast message, and the terminal 101 receives the record from the terminal 102.

In any of the foregoing cases, it takes a considerable time to achieve the transmission of program or data (referred to hereinafter simply as "data") between the terminals. Thus, a long time is needed for this process as compared with the process to access files within the terminal, and there occurs a difficulty in maintaining data integrity in the event that the data is updated by a remote terminal other than the terminal in which the data has originally been located. In other words, it becomes difficult to maintain the data integrity after the updating of the data. For example, data management in the server or provisional center for maintaining the data integrity, is extremely difficult. The solution to carry out data management in the terminal that originally possesses the data also provides a problem associated with the long transmission time. In such a case, the terminal that requests data obtains the requested data from the terminal that manages the requested data each time a request of data occurs, while such a process is obviously unrealistic. On the other hand, the foregoing approach to carry out data management in each of the terminals such that the terminal manages the data that belongs thereto, provides the solution to the problem of maintaining proper data integrity.

Thus, in the present invention, the transmission rate of data between the terminals is increased such that each of the terminals accesses the data in other terminals with an access time substantially comparable to the access time for accessing data within the terminal.

Figure 32:
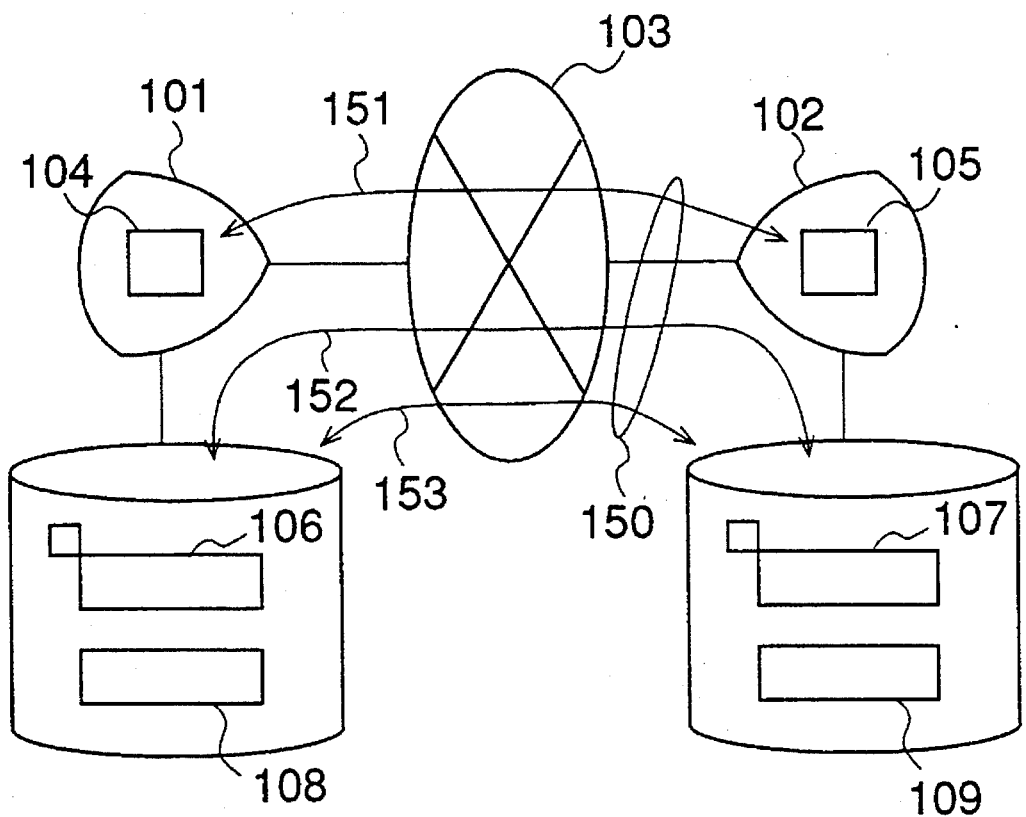

FIG. 32 shows the construction of the system of the present invention for communicating between terminals, wherein FIG. 32 includes the terminals 101 and 102 connected with each other by a network 103 which may include the PBX. Further, there are shown data processing systems 104 and 105, programs 106 and 107, data 108 and 109 that are subjected to data processing, and a three-layered communication channel 150 used in the present invention, wherein the communication channel 150 includes a main line 151, a control line 152 and a sub-line 153.

The main line 151 is used for communication of ordinary messages between the terminals, while the control line 152 is used to send inquiry, in the broadcast form, of the location of the data. Further, the sub-line 153 is a line for high speed data transmission between the terminals.

Although not limited, a broadband ISDN may be used for the foregoing three-layer communication channel 150. When using the broadband ISDN referred to hereinafter as B-ISDN, the party at the end of the connection is not fixed but changed freely. Further, the transmission speed may be set freely, indicating the possibility of high speed transmission. Further, it becomes possible to carry out communication in the form of broadcasting by using the control line.

When carrying out communication of ordinary messages between the terminals, the main line 151 is used. Thus, the communication is achieved at a low transmission speed and hence with a low connection cost. In this state, each of the terminals (own terminal) such as the terminal 101 or 102 carries out a processing of the program such as the program 106 or 107 that is managed by the own terminal, by running the data processing system 104 or 105, based upon the data 101 or 109 that is also managed in the own terminal.

In such a system, the terminal 102 for carrying out a desired processing performs following various operations when the desired program does not exist in the program 107 that is managed by the terminal 102 or when the desired data does not exist in the data 109 that is managed by the terminal 102.

More specifically, the terminal 102 sends an inquiry via the control line 152 in the broadcast form, for identifying the terminal that manages the missing program or data. Generally, there are plurality of terminals 101 and 102.

The terminal such as the terminal 101 that manages the program and/or data responds to the inquiry and notifies of the fact that it is the terminal 101 that manages the missing data, to the terminal 102 via the main line 151. In response thereto, the terminal 102 communicates with the terminal 101 via the main line 151 and informs of the intention of receiving the transmission of the program and/or data. Further, the terminal 102 receives the program and/or data via the sub-line 151 with a high transmission speed. Based upon the program and/or data thus received, the terminal 102 performs the foregoing desired operation.

The processing such as creation, updating, deletion, and the like, is carried out in the terminal that holds the program or data subjected to the processing. It should be noted that such a management and data processing have become possible by the use of the high-speed, three layer communication channel 150. Thus, each of the terminals can receive the transmission each time such a necessity of transmission occurs.

Figure 33:
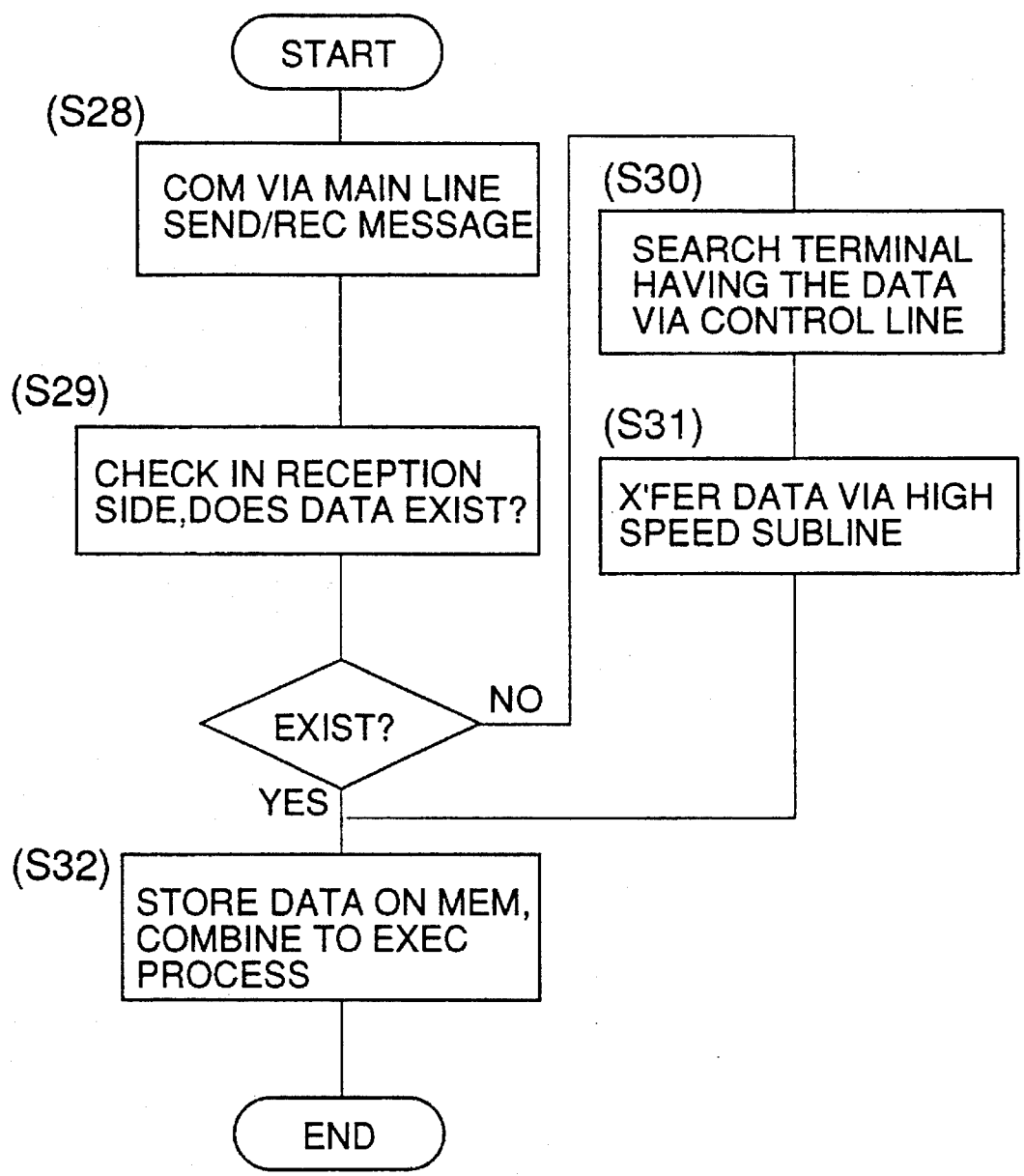
FIG. 33 is a diagram showing the flowchart of the three layer communication processing used in the present invention.

FIG. 33 shows the flowchart of the three-layer communication used in the present invention. Hereinafter, the steps in FIG. 33 will be described.

(S28) In this step, a normal communication is carried out via the main line, including exchange of messages.

(S29) When there occurs a need of processing in the reception side upon reception of a message, the terminal checks whether or not the data (including program) necessary for processing exits in the own, reception-side terminal.

The processing hereinafter is divided into two branches depending on the result of the checking. Thus, if such data does not exist, the process proceeds to the step S30. If the data exits, on the other hand, the process proceed to the step S32.

(S30) In this step, an inquiry is broadcasted via the control line 152 about the terminal that possesses or manages the missing data.

(S31) When the terminal that has the missing data is located, the step 31 is conducted such that the terminal receives the missing data by way of high speed transmission via the sub-line 153.

(S32) When all the necessary data have become available, the missing data is arranged with other data such that the "processing corresponding to the foregoing message can be carried out. Further, the processing is carried out.

FIGS. 34A and 34B show the message format and the format for each of the lines.

The massage format is generally divided into the fundamental format and the format for processing, wherein the fundamental processing includes the transmission side iD and the reception side iD. On the other hand, the format for processing includes various iDs such as the iD for indicating the content of processing, the iD for the data, the iD for the optional, real data, as well as the optical real data itself. Further, each of the symbols A, B, $C_i$ and $D_i$ represents the area for the foregoing information.

Further, the format for the main line 151, the format for the control line 152, and the format for the sub-line 153, are provided similarly to the format of FIG. 34A as indicated in FIG. 34B. Furthermore, the reception side iD shown in the format for the control line 152 by the broken line indicates that the reception side iD may be omitted in the case of broadcasting.

It should be noted that the data iD generally includes the terminal number of the terminal that manages the data at the head part thereof. Thus, the terminal that receives the data iD of the missing data can detect whether or not requested data is held by the own terminal, by the terminal number attached to the data iD. On the other hand, each terminal does not usually manage the terminal number of other terminals.

Figure 35:
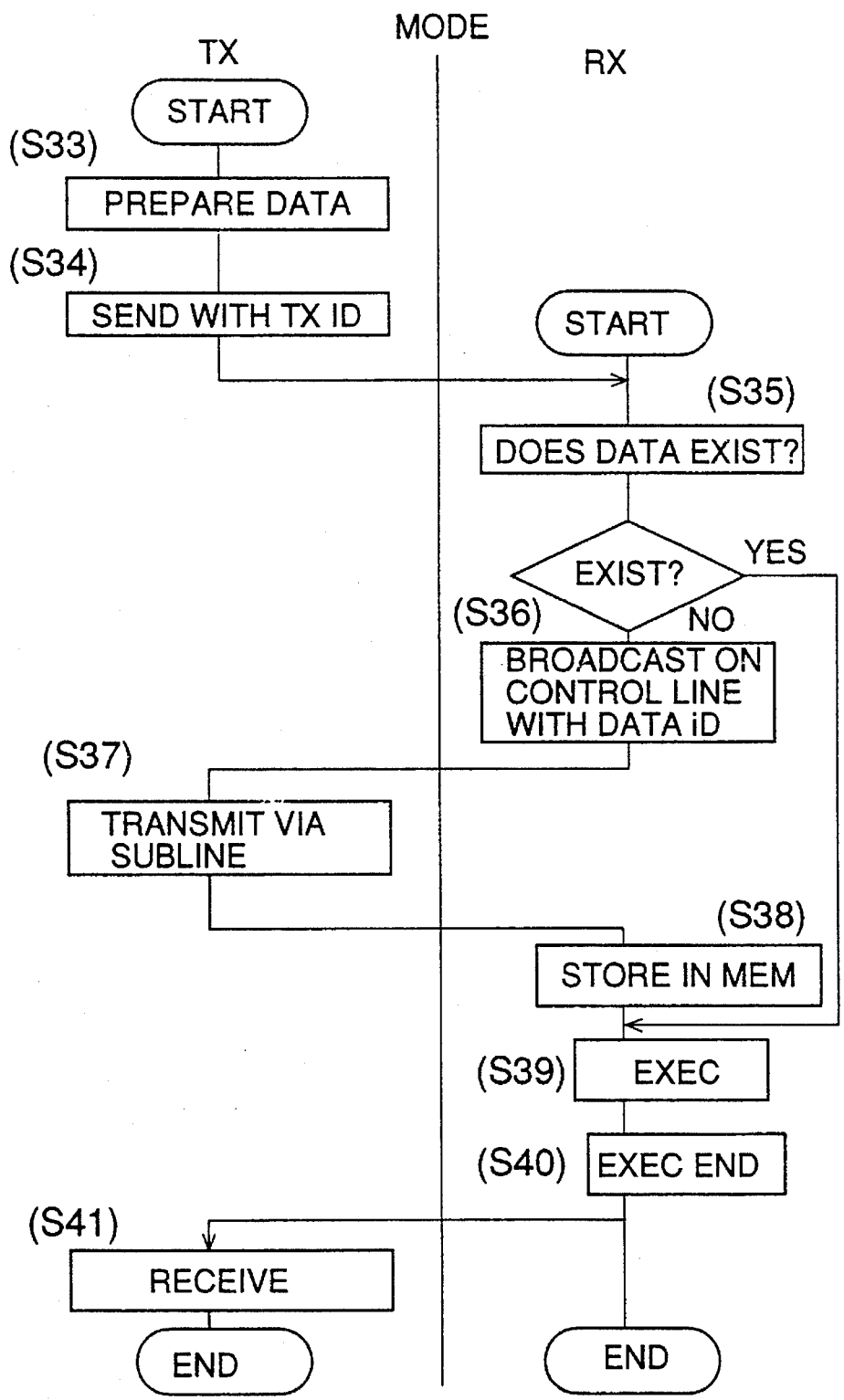
FIG. 35 is a diagram showing a processing mode of the present invention.

FIG. 35 shows the mode of processing in the present invention, wherein the process includes the following steps.

(S33) Prepare data to be transmitted in the transmission side.

(S34) Transmit the data with the transmission side iD and the reception side iD attached.

(S35) Check, in the reception side terminal, whether or not the necessary data exists in the reception side terminal. If exits, a jump is made to the step S39. If not, a jump is made to the step S36.

(S36) In the step S36, a broadcast is made via the control line, with the iD of the desired data attached to the broadcast message.

(S37) In the step S37, the terminal that manages the desired data transmits the data at a high speed via the sub-line.

(S38) In the step S38, the transmitted data is stored in a memory.

(S39) In the step S39, the processing is carried out in the reception side terminal.

(S40) In the step S40, a notification of end of processing is made upon completion of the processing.

(S41) In the step S41, the transmission side terminal receives the notification of the end of the processing.

In each of the terminals, it should be noted that there is provided a link table about the data managed therein for searching the first address of the data or the situation that the data is stored, based upon the "data iD" of the data. Thus, the access of the data is made easily when the data iD is provided.

Figure 36:
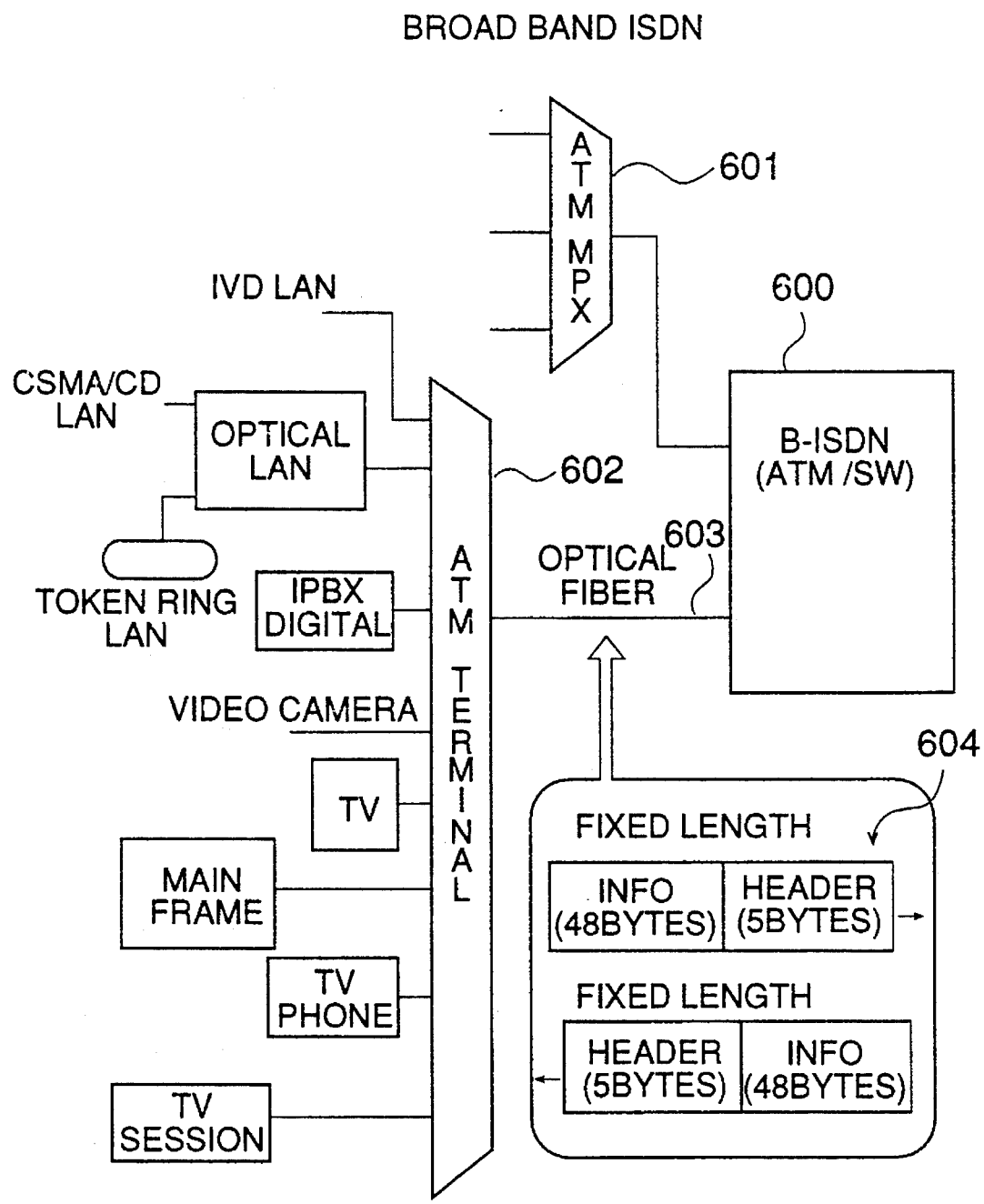
FIG. 36 is a diagram showing the concept of the broadband ISDN.

FIG. 36 shows the concept of the broadband ISDN. The broadband ISDN is constructed based upon the optical fiber for enabling a high speed communication in the speed of several hundred megabauds to several gigabauds. In FIG. 36, the system includes a B-ISDN 600 that serves as an asynchronous transfer mode (ATM) network, an ATM multiplexer 601, an ATM terminal 602, and an optical fiber cable 603, wherein the optical fiber cable 603 carries thereon a fixed length cell 604.

FIG. 36 shows the outline of the service studied in the CCITT. In the ATM, an arbitrary transmission speed is possible contrary to the conventional network in which the transmission speed is fixed. Further, the ATM has an advantage of large capacity transmission with reduced rate of error due to the use of optical fiber, contrary to the conventional packet mode transmission in which there is a heavy load for protocol processing associated with the need of software processing. In the ATM, it should be noted that the protocol processing may be carried out by hardware and the load for the protocol processing is substantially reduced.

In the ATM, various information such as digital audio data or digital video data are inserted into a fixed-length block called "cell" that is-similar to the packet. Thus, the asynchronous transfer is achieved my multiplexing the information consecutively, using the block as a unit. As the data of the line type and the data of the packet type are multiplexed without distinction and transmitted in the form of the cell, it becomes possible to apply a multi-dimensional traffic processing with different transmission speeds. Thereby, a highly efficient use of the transmission path becomes possible.

In the B-ISDN, channels such as (i) B channel having a channel speed of 64 kb/s (this B channel may further contain low speed channels with the speed of 8, 16 and 32 kb/s), (ii) D channel having a channel speed of 16 kb/s and 64 kb/s, and (iii) H channel with the speed of 384 kb/s, 1536 kb/s, 1920 kb/s, 30–44 Mb/s, and 90–138 Mb/s, are provided.

When applying the B-ISDN to the present invention, the foregoing B-channel is used for the main line 151, the D-channel is used for the control line 152, and the H-channel is used for the sub-line 153.

Figure 37:
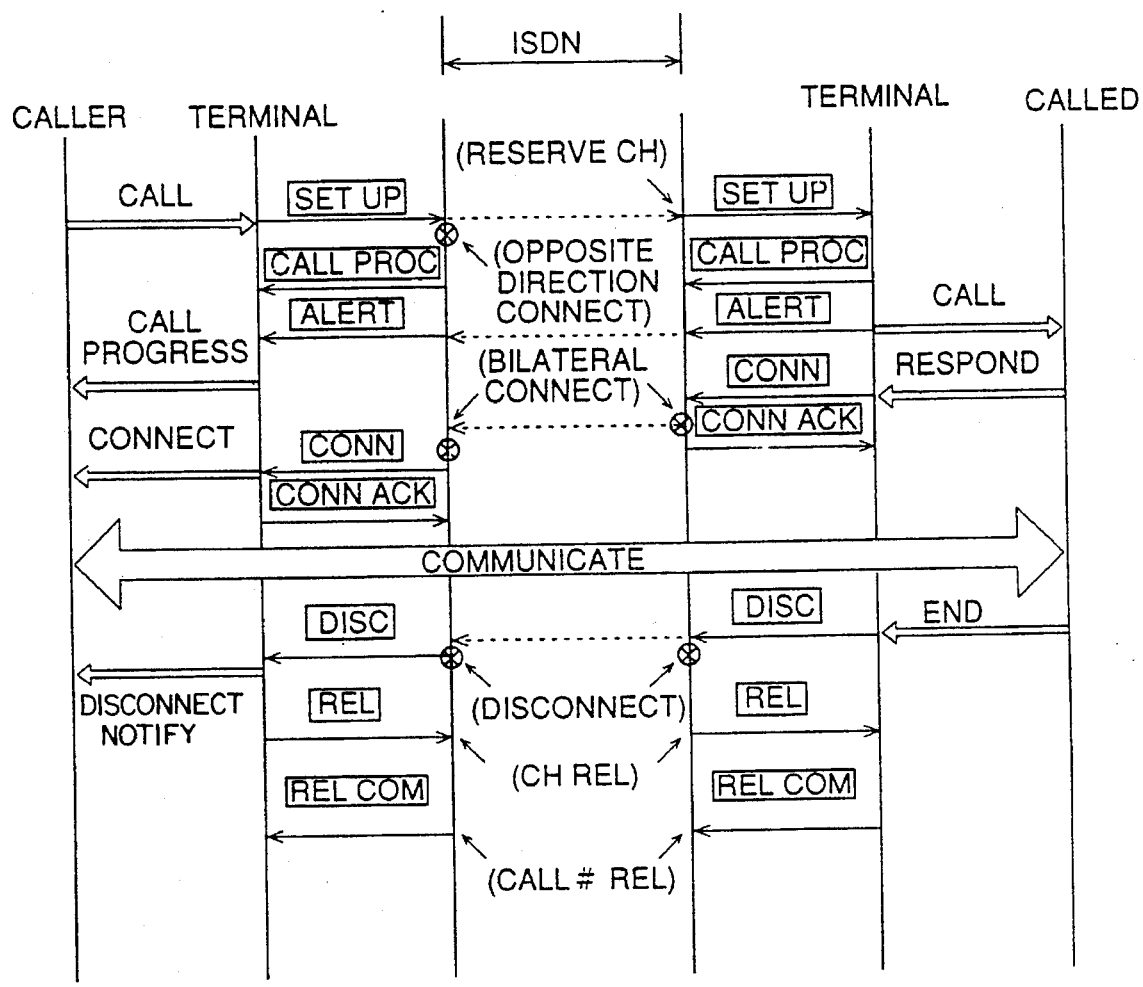
FIG. 37 is a diagram showing an example of phone connection in the ISDN.

FIG. 37 shows the control procedure for connecting a phone in the ISDN, wherein the definition of the symbols therein is as follows.

SETUP request for setting up a call
CALL PROC notification of in-the-processing-state for setting up a connection
ALERT notification of in-the-calling-state for calling a called party
CONN notification of response from the called party
CONN ACK acknowledgement to CONN
DISC request for releasing the call
REL notification of completion of the channel disconnection and request for releasing the call number
REL COM notification of completion of channel releasing and completion of releasing the call number Referring to FIG. 37, a call is set up in response to the request of call from the calling party, and a connection is established upon the response from the called party. After communication, the connection is disconnected and the channel released. Further, the call number is released.

In the present invention, it becomes possible to transmit data at high speed between the terminals, by way of the foregoing three layered communication processing system, whenever and each time there occurs a need in a terminal to request missing data. In such a system, there may be a case wherein the terminal that issues the request already have information about the terminal that manages the requested data. In such a case, the broadcasting of inquiry via the control line 152 is not necessary and may be omitted.

As set forth above, the present invention provides a distributed data processing system wherein a number of terminals each having a program and/or database are connected with each other by a LAN or other communication network, such that a terminal therein carries out a processing based upon transfer of program and/or data from another terminal whenever such a need occurs.

In such a distributed type data processing system, there occurs a case wherein a modification is necessary in a terminal, such as introducing a new function or transmitting the state of the terminal or other information to other terminals upon occurrence of a predetermined processing condition in the terminal.

When such a need occurs in a conventional system, it has been practiced (i) to send an operator to the terminal that requires the modification and transfer the existing system into a floppy disk or store the information to be transmitted into a floppy disk, or (ii) to send an operator to the terminal that requires the modification and interrupt the normal operation of the terminal for carrying out necessary investigation or desired modification.

In any of these conventional procedures, it is necessary to send an operator to the terminal for conducting investigation or modification. Thus, such a conventional procedure generally consumes a large amount of human resources.

In order to eliminate this problem, the present invention achieves the desired modification of the terminal by sending a modification object into the processing mode of the terminal, either by way of the LAN or other network or without such a network, such that the modification object carries out the desired modification.

Figure 38:
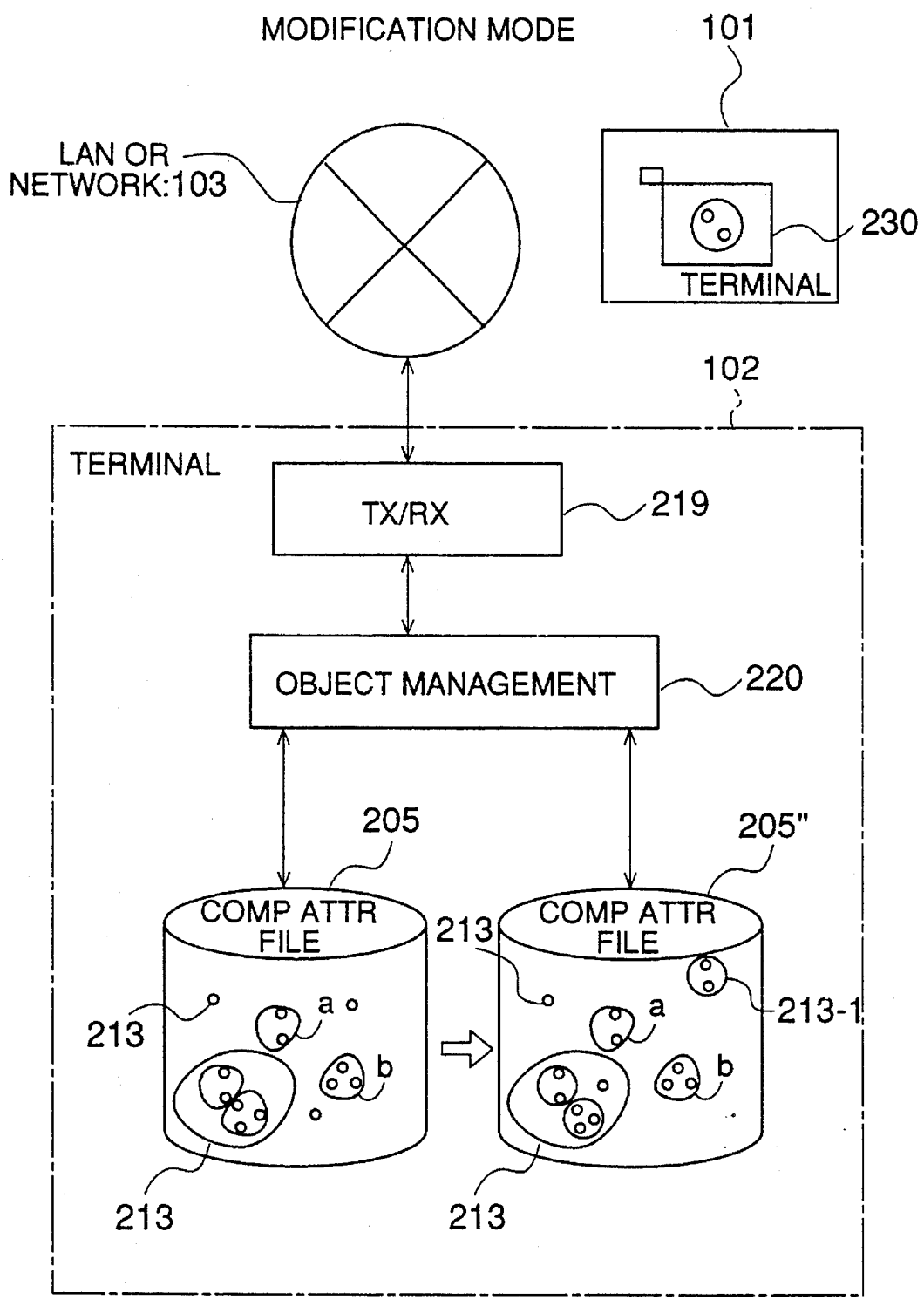
FIG. 38 is a diagram showing a modification processing used in the present invention.

FIG. 38 shows the modification mode of the present invention, wherein the system of FIG. 38 includes the terminals 101 and 102 connected with each other by the LAN or other network 103, wherein the terminal 102 includes the component attribute file 205 and another component attribute file 205' wherein the component attribute file 205" is identical to the component attribute file 205 except that the component attribute file 205" contains a modification object. The component attribute files 205 and 205" contain the objects 213. Further, the system includes the transmission/reception unit 219 and the object management unit 220. Furthermore, it should be noted that the terminal 101 holds therein a modification object 230, and a corresponding modification object 230-1 is introduced into the component attribute file 205" in the terminal 102.

The terminal 102 is desired to perform the existing functions, and thus, the terminal 102 includes a number of processing units in the component attribute file 205. In order to perform the existing functions, the object management unit 220 establishes a relationship or order between the processing units in accordance with the existing function.

The modification object shown in FIG. 38 is used for carrying out, in the terminal 102, the modification of the existing function of the terminal 102, and is introduced to the component attribute file 205" of the terminal 102 via the LAN or other network 103.

As an example, a case will be explained wherein the terminal 102 is modified such that the state of the terminal 102 is transmitted to the terminal 101 upon the occurrence of a predetermined condition in the processing in the terminal 102.

First, the terminal transmits the modification object 230 to the terminal 102 and the modification object 230 is stored in the component attribute file 205" in the terminal 102. In other words, the modification object 230-1 is introduced.

There are various modifications about the use of the modification object 230-1 to modify the operation of the terminal 102, an example is as follows.

It is assumed that the object management unit 220 of the terminal 102 executes the processing according to the combination mode as follows. First, the object management 220 activates the object a in the component attribute file 205. Upon completion of the processing for the object a, the object a notifies the object management unit 220 of the completion of the processing, and the object management unit 220 activates the next object b in response to the foregoing notification of completion of the process.

Under the existence of such a combination mode, the modification object 230-1 modifies the combination as follows. In the component attribute file 205'', the object management unit 220 activates the object a similarly as before, wherein the object a is modified such that the object a notifies of the completion of the processing to the modified object 230-1, not to the object management 220, upon completion of the processing of the object. With this, the modified object 230-1 is activated, wherein the modified object 230-1 notifies to the object management unit 220 of completion of the processing therein, upon when the processing of the object 230-1 is completed. The object management unit 220, in turn, regards the notification as if it has been issued by the existing object a, and activates the object b in response thereto. By providing a function of transmitting the state of the terminal 102 to the terminal 101 to the modified object 230-1, it becomes possible to transmit the state of the terminal 102 to the terminal 101 during the processing of the modified object 230-1.

It should be noted that foregoing modification of the mode of combination is carried out upon confirmation of proper operation based upon a simulation conducted by the object management unit 220. Thus, such a simulation is achieved by the provisional operation mode shown in FIG. 10. In the event that it is wished to maintain such a modified mode of combination or to carry out the processing corresponding to the modified mode of combination at a high speed, a compilation is carried out based upon the modified mode of combination to form modified executionable process data, wherein the process steps are expanded in the sequential order of processing in the modified executionable process data in the form that there is included a branching process or in the form that a branching is allowed. The processing is thereby carried out by executing the modified executionable process data.

When transmitting the modified executionable process data itself to other terminals, one may of course transmit the modified executionable process data itself. However, in view point of keeping track of the location of modification and to reduce the amount of transmission, it is more preferable to conduct the process as follows. As the original executionable process data before the incorporation of the modification object, is existing in the terminal 102, it is more preferable to extract differential data between the modified executionable process data and the original executionable process data and transmit the differential data alone. With this, it is also possible to restore the original executionable process data upon completion of the investigation. When the same original executionable process data exists in other terminals, it is of course sufficient to transmit the differential data alone to these terminals.

Figure 39:
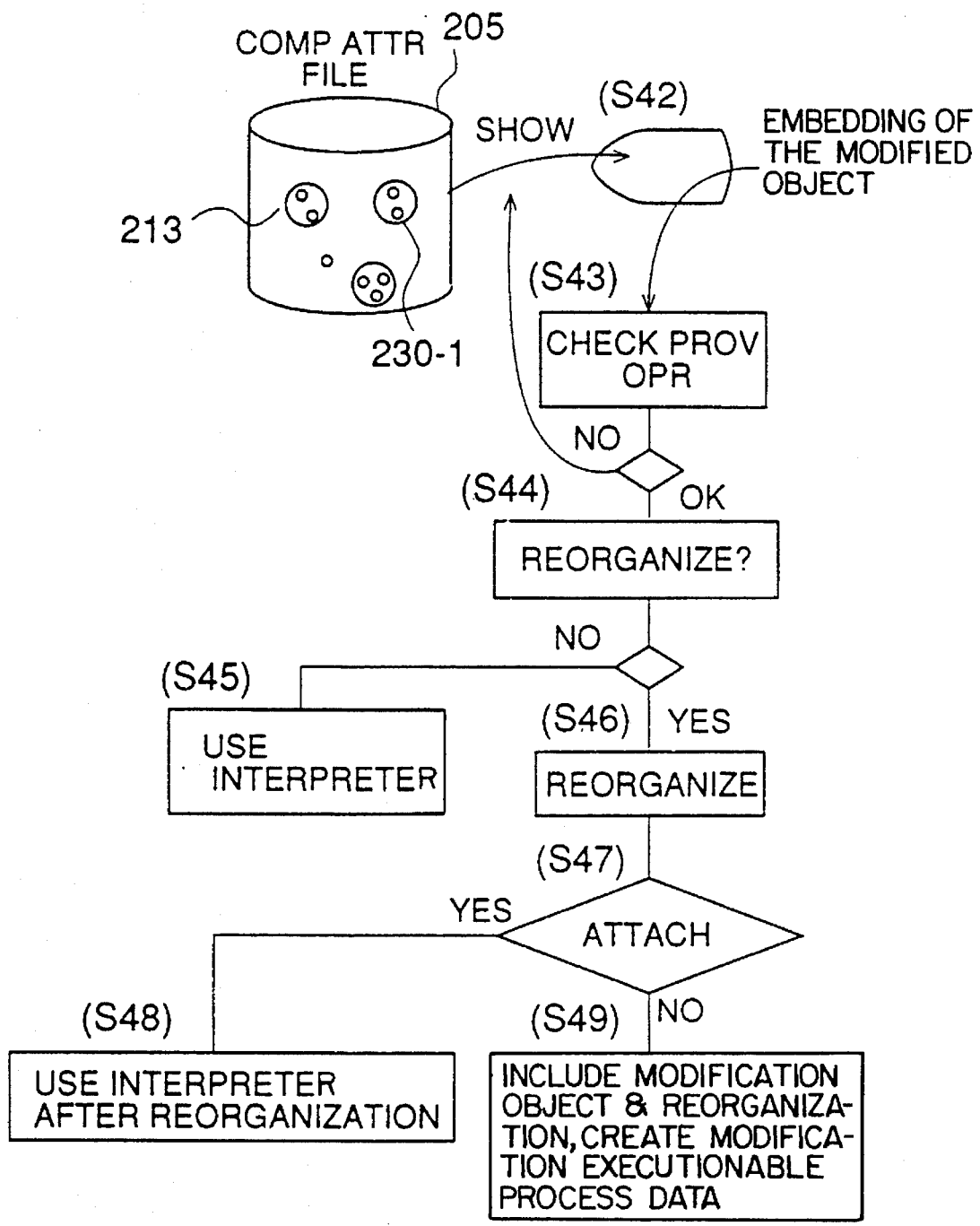
FIG. 39 is a diagram showing a processing mode for incorporating a modification object.

FIG. 39 describes the incorporation of the modified object, wherein FIG. 39 shows the component attribute file 205, the object 213, and the modified object 230-1.

When the modified object 230-1 is stored in the component attribute file 205 as described with reference to FIG. 31, a selection of mode of incorporation is achieved as follows.

(S42) Show the object to be modified and the modification object on a display, and obtain the "mode of combination resulting from the incorporation of the modification object" wherein the modification object 230-1 is incorporated.

(S43) Conduct a provisional operation with respect to the foregoing "mode of combination resulting from the incorporation of the modification object" and check for the normal operation as to whether or not the processing based upon the "original mode of combination" is damaged.

When the result of the checking is negative, the embedding of the modified object 230-1 has to be reconsidered.

(S44) When the result of the checking is affirmative, it is examined whether or not it is necessary to carry out a compilation for the "mode of combination resulting from the incorporation of the modification object" to rate the modified executionable process data. In other words, it is checked if it is necessary to carry out reorganization or not.

(S45) In the event that such a reorganization is not necessary, the processing is achieved by way of the interpreter process to be described with reference to FIG. 41.

(S46) In the event that a reorganization is necessary, the reorganization is conducted.

(S47) In the event that the foregoing modified executionable process data becomes enormous upon such a reorganization, or in the event the processing that contains the modified object is used only temporally and it is necessary to restore the original executionable process data, the "external attachment" process is conducted. In the step S47, an examination is made whether or not such an external attachment process is necessary.

There are two possible alternatives for the external attachment, wherein none these two alternatives includes the reorganization.

(S48) When using the external attachment, the processing is conducted according to the interpreter process after reorganization as will be described in FIG. 44.

(S49) When no external attachment is made, the processing is conducted by way of the modified executionable process data that is reorganized, with the modification object incorporated therein as will be described in FIG. 43.

Figure 40:
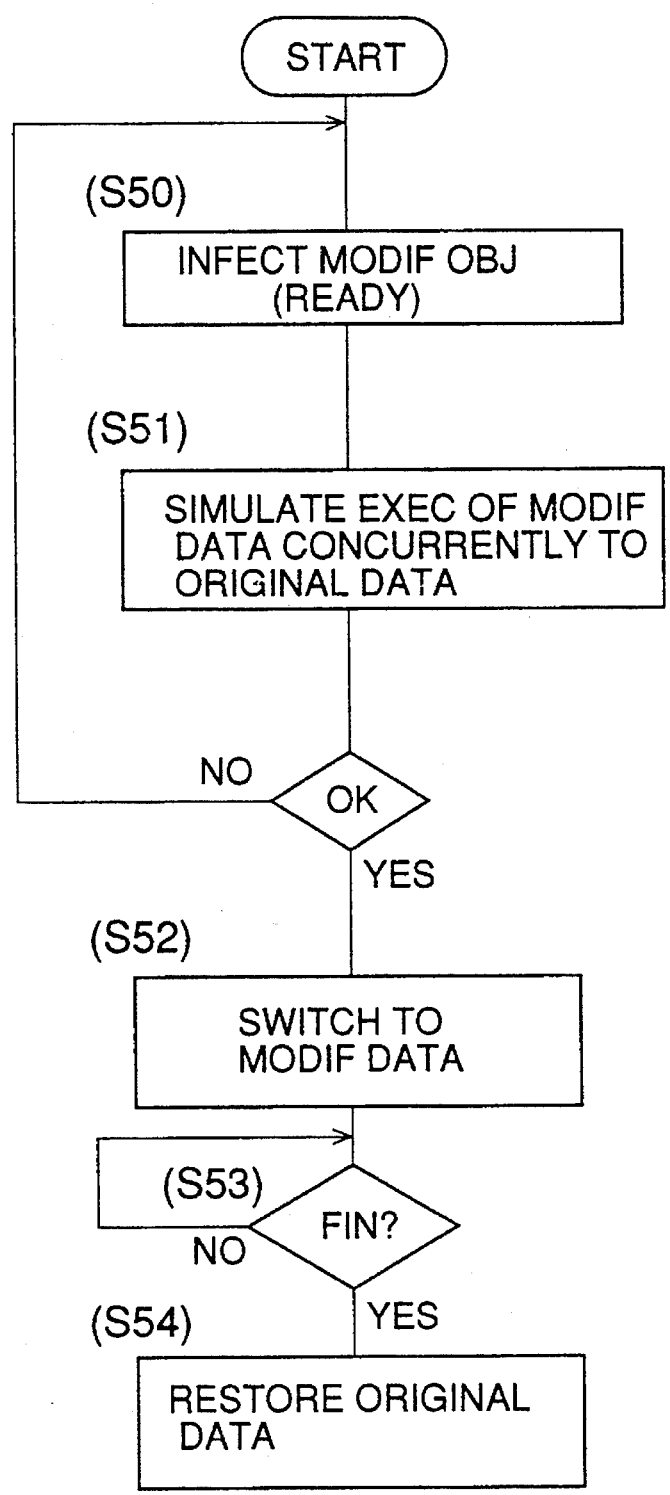
FIG. 40 is a diagram showing a flowchart of a pressing for causing an injection of the modification object under an online operational mode.

FIG. 40 shows the flowchart of the process infected with the modification object under the online processing mode, wherein the flowchart includes following steps.

(S50) The process corresponds to the step S42 of FIG. 39 and obtains the aforementioned "mode of combination resulting from the incorporation of the modification object." In other words, the modification object is used as a virus.

(S51) In this step, a simulation is carried out by the object management unit 220, such that the modified executionable process data obtained from the foregoing "mode of combination resulting from the incorporation of the modification object," and the original executionable process data are processes in parallel.

When the result of the parallel processing causes a problem, the process returns to the step S50. When no problem occurs, the process proceeds to the step S52.

(S52) While remaining in the online processing mode, a switching is made to the processing that uses the modified executionable process data. Thus, the processing is achieved under the state that the modification object is incorporated.

(S53) In this step, an examination is made whether or not the processing in the state that the modification object is incorporated has been completed.

(S54) In this step, the processing that uses the original executionable process data is restored, provided that the result of the examination of the step S53 indicates the completion of the process.

Figure 41:
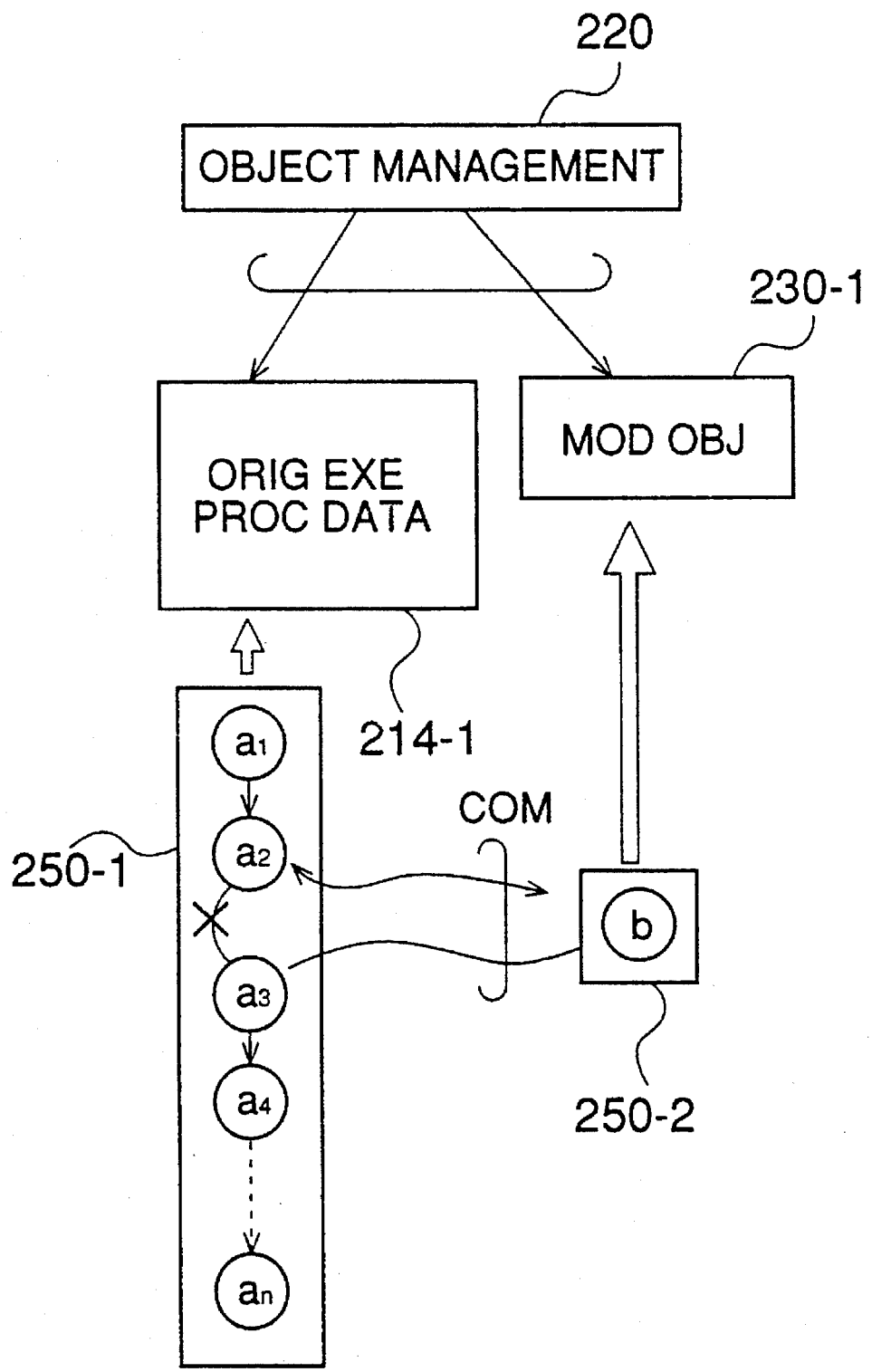
FIG. 41 is a diagram showing an interpreter system that does not require reorganization.

FIG. 41 indicates the interpreter process that is used in the case where there is no necessity of reorganization, wherein FIG. 41 shows, in addition to the object management unit 220 and the modification object 230-1, original executionable process data 214-1, a processing unit group 250-1 corresponding to the data 214-1, a processing unit group 250-2 corresponding to the modification object 230-1, and other processing units $a_1, a_2, \ldots a_n$ and b, wherein these processing units $a_1, a_2, \ldots a_n$ and b include at least several tens of instruction steps.

In the illustrated example, the original executionable processing data 214-1 is divided into a first group formed of the processing units $a_1$ and $a_2$, and a second group formed of the processing units $a_3$–$a_n$. Further, the object management unit 220 operates as follows.

(Operation 1) The object management unit 220 activates the original executionable process data 214-1.

(Operation 2) In response to the above process, the processing unit $a_1$ is executed followed by the processing unit $a_2$. It should be noted that the original process indicates the execution of the processing unit $a_3$ rather than the processing unit $a_2$, while the modification object 230-1 has modified the object management unit 220 such that the processing unit $a_2$ reports the execution thereof in the process of the executionable process data 214, and the execution of the processing unit $a_3$ does not occur.

(Operation 3) Then the object management unit 220 activates the execution of the processing unit 250-2 corresponding to the modification object 230-1. In other words, a communication is made to call the processing unit b from the processing unit $a_2$.

(Operation 4) In this operation, the processing unit b is executed. In other words, a processing is made wherein the processing mode according to the original executionable process data is modified by the modification object 230-1.

(Operation 5) When the execution of the processing unit b is completed, a notification thereof is made to the object management unit 220. The object management unit 220, in turn, activates the execution of the illustrated processing unit $a_3$. In other words, there occurs a communication to call the processing unit $a_3$ at the end of the processing unit b.

(Operation 6) Upon the completion of the processing unit an, the object management unit 220 receives the notification thereof.

Figure 42A:
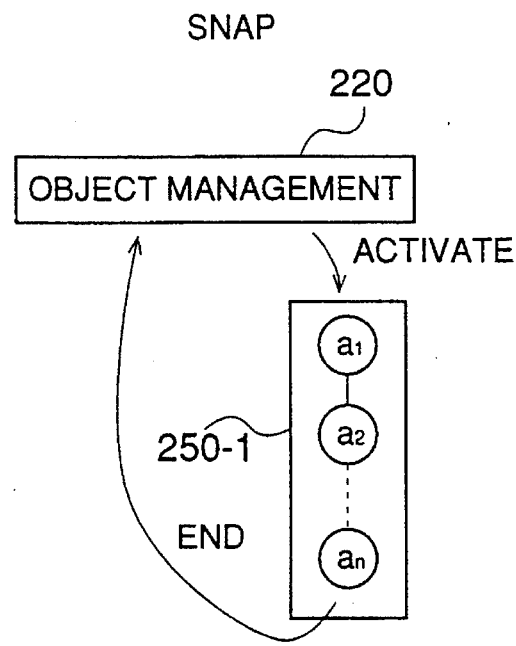
FIGS. 42A and 42B are diagrams showing examples of the process of FIG. 41.
Figure 42B:
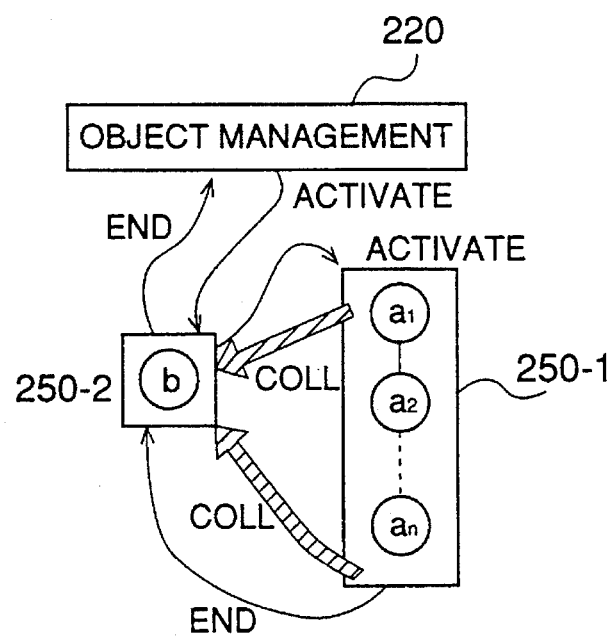

FIGS. 42A and 42B show the examples of operation according to the process of FIG. 41. In FIGS. 42A and 42B, the reference numerals correspond to those of FIG. 41.

When executing the original executionable process data 250-1, the object management unit 220 shown in FIG. 42A is activated, and the processing units $a_1, a_2, \ldots a_n$ are executed consecutively. Upon the completion of execution of the processing unit $a_n$, the object management 220 receives a notification indicative of the completion of the execution.

On the other hand, the processing that includes the processing unit b according to the modified object 230-1, proceeds as follows. It should be noted that modification object 230-1 used here collects the parameters immediately before the activation of the original executionable process data 250-1, wherein the parameters include various parameters in the data processing system. Further, the modification object 230-1 is constructed to collect the aforementioned parameters immediately after the modified executionable process data 250-1 is executed.

In such a case, the modified object 230-1 applies an activation to itself (modified object 230-1) as indicated in FIG. 42B when the modified object 230-1 activates the original executionable process data 250-1 via the object management unit 220. In response to the activation, the processing unit group 250-2 that correspond to the modification object 230-1, collects the aforementioned parameters in the state immediately before the execution of the original executionable process data, and activates the original executionable process data 250-1. Further, the processing unit group 250-2 indicates that the notification of end of the execution from the original executionable process data 250-1 is directed to the processing unit group 250-2 corresponding to the modification object 230-1.

When the execution for the original executionable process data 250-1 has been completed, the original executionable process data 250-1 informs to the modification object 230-1 of the completion of the execution. In response to this, the processing unit group 250-2 collects the parameters immediately after the execution of the original executionable process data 250-1 and sends a report to the object management unit 220 of the completion of the execution. Thus, it becomes possible to collect the parameters by introducing the modification object 230-1.

Figure 43:
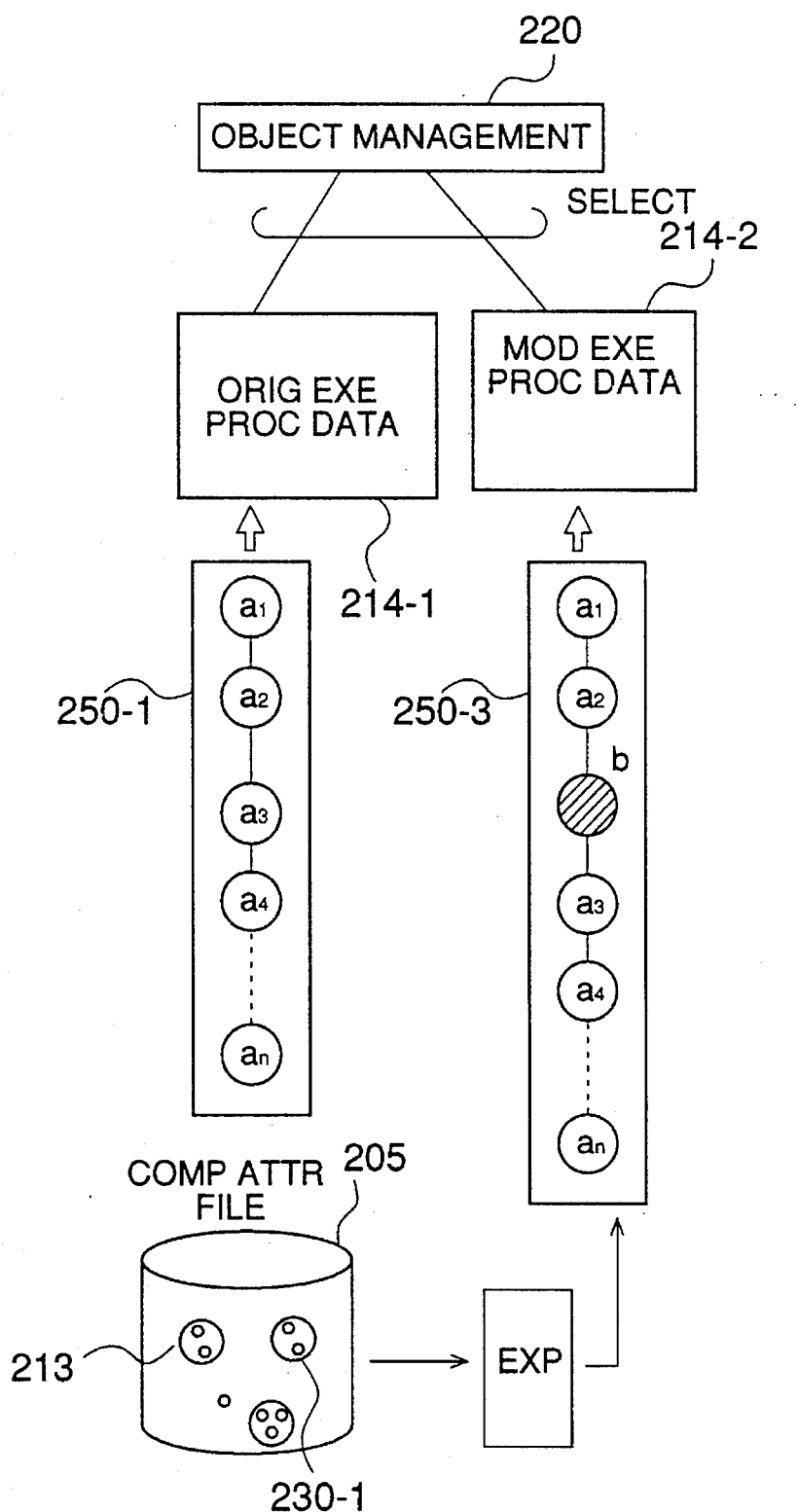
FIG. 43 is a diagram for explaining the system for executing processing by creating modified executionable data.

FIG. 43 explains the process based upon the creation of the modified executionable process data, wherein FIG. 43 includes, in addition to the elements 205, 213, 230-1, 220, 214-1, 250-1 that are already described with reference to FIG. 38 or FIG. 41, modified executionable process data 214-2 and a processing unit group 230-3 corresponding to the modified executionable process data 214-2.

The original executionable process data 214-1 is obtained as a result of compilation of the "mode of combination in the state before the modification object is incorporated" wherein various objects are combined to form a complex structure, and hence it is generally not easy to grasp the content by the inspection of the original executionable process data. Because of this, it is difficult to use the interpreter system described with reference to FIG. 11.

In such a case, the original executionable process data 214-1 is subjected to restoration to the "mode of combination in the state before the modification object is incorporated," and various objects in the mode are expanded upon addition of the foregoing modification object 230-1, to create modified executionable process data 230-3. Of course, the provisional operation should be checked before the step of expansion, according to the step S43 of FIG. 39, wherein such a check of the provisional operation is achieved upon confirmation, by way of simulation, that the processing in the "mode of combination in the state after the modification object is incorporated" operates properly.

In the processing unit group 250-3 corresponding to the modified executionable process data 214-2 includes the processing unit b that corresponds to the modified object 230-1 as indicated in FIG. 43.

Thus, the original executionable process data 214-1 and the modified executionable process data 214-3 are obtained, and the object management unit 220 switches, as indicated by the step S52 of FIG. 40, to the execution of the modified executionable process data 214-3. Further, the LAN or network 103 transmits the modified executionable process data 214-3 to other terminals.

Figure 44:
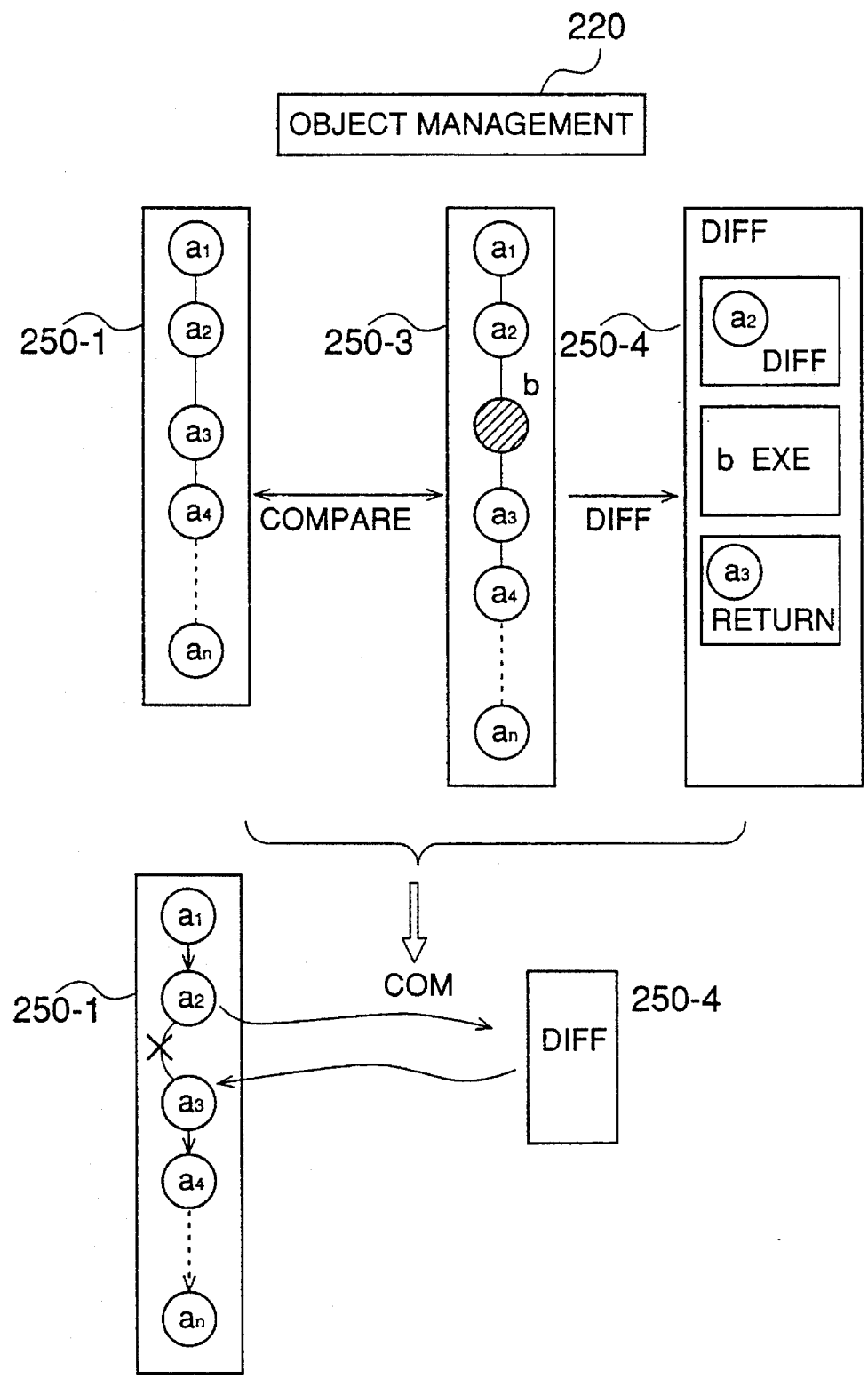
FIG. 44 is a diagram for explaining the processing according to the interpreter system after reorganization.

FIG. 44 describes the use of the interpreter system after the reorganization, wherein the elements in FIG. 44 correspond to the elements in FIG. 43. Further, the differential data is designated by a numeral 250-4.

As described already with reference to FIG. 36, it is possible to execute the function set in the modification object, upon the creation of the modified executionable process data 250-3. However, such a process provides a difficulty in that the restoration of the original executionable process data 250-1 is extremely difficult when the modified executionable process data 230-3 exists alone. Further, holding both of the modified executionable process data 250-3 and the original executionable process data 250-1 in the memory of the processing system may be not desirable in view point of reduced free memory area, particularly when the modified executionable process data 250-3 has a large amount of information. Further, the transmission of both of the original executionable process data 250-1 and the modified executionable process data 250-3 may be undesirable in view of the cost of transmission.

In such a case, it is preferable to create differential data 250-4 shown in FIG. 44.

More specifically, the differential data 250-4 is created as a difference between the modified executionable process data 250-3 and the original executionable process data 250-4, when the modified executionable process data 250-3 is created. In other words, the differential data 250-4 provides the modified executionable process data 250-3 when the original executionable process data 250-1 is executed in the interpreter system, with a relationship set with respect to the differential data 250-4.

When carrying out a process set in the modification object 230-1, a communication is made between the original executionable process data 250-1 and the differential data 250-4 under the supervising of the object management unit 220, similarly to the case described with reference to FIG. 41. As a result, the modified executionable process data 250-3 is executed.

As described above, it becomes possible to modify the program that is currently under execution to a desired program and execute the same by incorporating the modification object.

Although FIG. 41 or FIG. 44 indicates that the modification is applied only to one location of the original executionable process data 250-1, the present invention is by no means limited as such. Generally, the modification is applied at plural locations and simultaneously.

The modification object may be used for various purposes such as:
(A) collection of parameters in response to the occurrence of predetermined condition or state;
(B) modification of the program upon the occurrence of a predetermined condition or state;
(C) modification of the program from the older version to the newer version.

As described above, it becomes possible to transmit the modification object to another terminal via the LAN, such that a modified program is executed in such a terminal.

Particularly, it becomes possible to modify a complex program that contains the composite object, by returning to the mode of combination resulting from the incorporation of the object. In the modification, the existing processing system is not destroyed or damaged and one can easily restore the original processing system.

Figure 45:
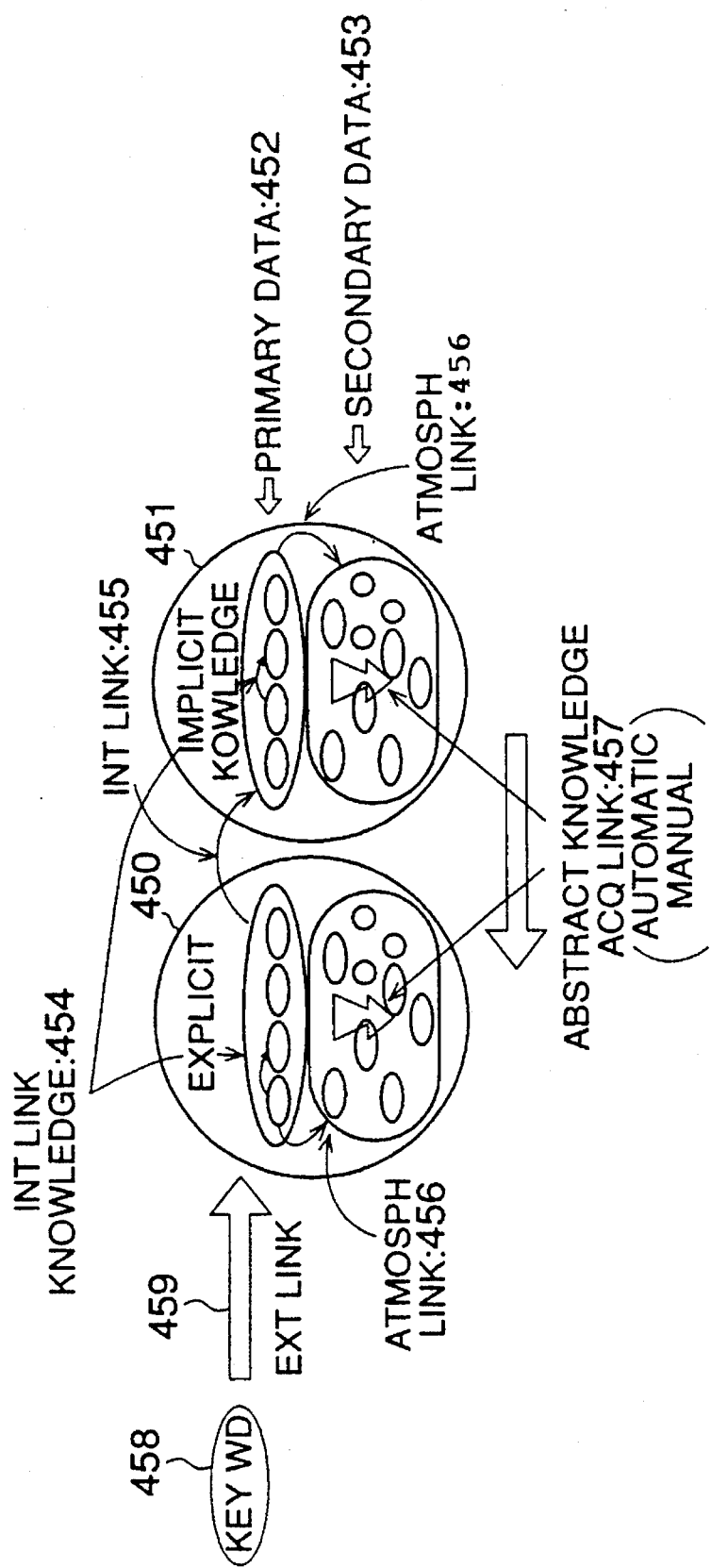
FIG. 45 is a diagram for representing the process of knowledge data extraction conceptually.

FIG. 45 shows the procedure of extracting knowledge data schematically. FIG. 45 includes explicit knowledge data 450, implicit knowledge data 451, primary data 452, secondary data 453, an internal link 454 within the same knowledge data, another internal link 455 extending from the explicit knowledge data 450 to the implicit knowledge data 451, an atmospheric link 456, an abstract structural knowledge acquisition link 457 that indicates the mode of knowledge acquisition in each of the secondary data 453, a keyword 458, and an external link 459.

It is believed that FIG. 45 models the human process of extracting knowledge data.

The knowledge data is divided into the explicit knowledge data 450 and the implicit knowledge data 451, wherein each of the data 450 and 451 contains the primary data 452 corresponding to the superficial knowledge and the secondary data 453 corresponding to the knowledge that are held in a black box. Thus, the primary data 452 indicates the direct projection of the real world, while the secondary data is the data that is obtained according to the abstract structural analysis.

In the actual data processing system, the data existing in the own terminal node may be regarded as the explicit knowledge data 450 while the data existing in the other terminal node may be regarded as the implicit knowledge data 451.

The data elements in the same knowledge data are linked by the internal link 454, while the internal link 455 links the implicit knowledge data. Further, there exists the perception link 456 that links the primary data and the secondary data. It should be noted that a person who has obtained the implicit knowledge data experiences the "cognition." When the cognition occurs, the implicit knowledge data is transferred to the explicit knowledge data gradually, and the person obtains the "inspiration." The reason that the link 456 is designated as atmospheric link is that the primary data 452 and the secondary data 453 are linked by the insight or association that tends to change each time depending upon one's atmosphere.

The process for extracting the knowledge data shown in FIG. 38 is started by accessing the primary data 452 in the explicit data 450. Then, the mode of knowledge acquisition expands from the primary data 452 via the internal link 454 that links within the same knowledge data. Further, the mode of knowledge acquisition reaches the implicit knowledge data 451 via the internal link 455 that links the implicit knowledge data. Further, there may be a case wherein the mode of knowledge acquisition reaches the secondary data 453 via the atmospheric link 456.

It should be noted that such an accessing from the explicit knowledge data 450 to the implicit knowledge data 451 corresponds to the communication with other terminal via the LAN or other network 103 in the system of FIG. 11 or FIG. 18 as well as to the object transfer in FIGS. 25A and 25B. Further, the mode of acquiring the primary data 452 or secondary data 453 in the explicit knowledge data 450 or in the implicit knowledge data 451, corresponds to the processing shown in FIG. 7, FIG. 12, or FIG. 14.

Further, it can be regarded that the acquisition in the secondary data 453 by way of the abstract structural knowledge acquisition link 457 corresponds to the assembling mode of the conceptual schema 300 shown in FIG. 12 or to the modification process shown in FIG. 38 or FIG. 44 that uses the modification object.

Figure 46:
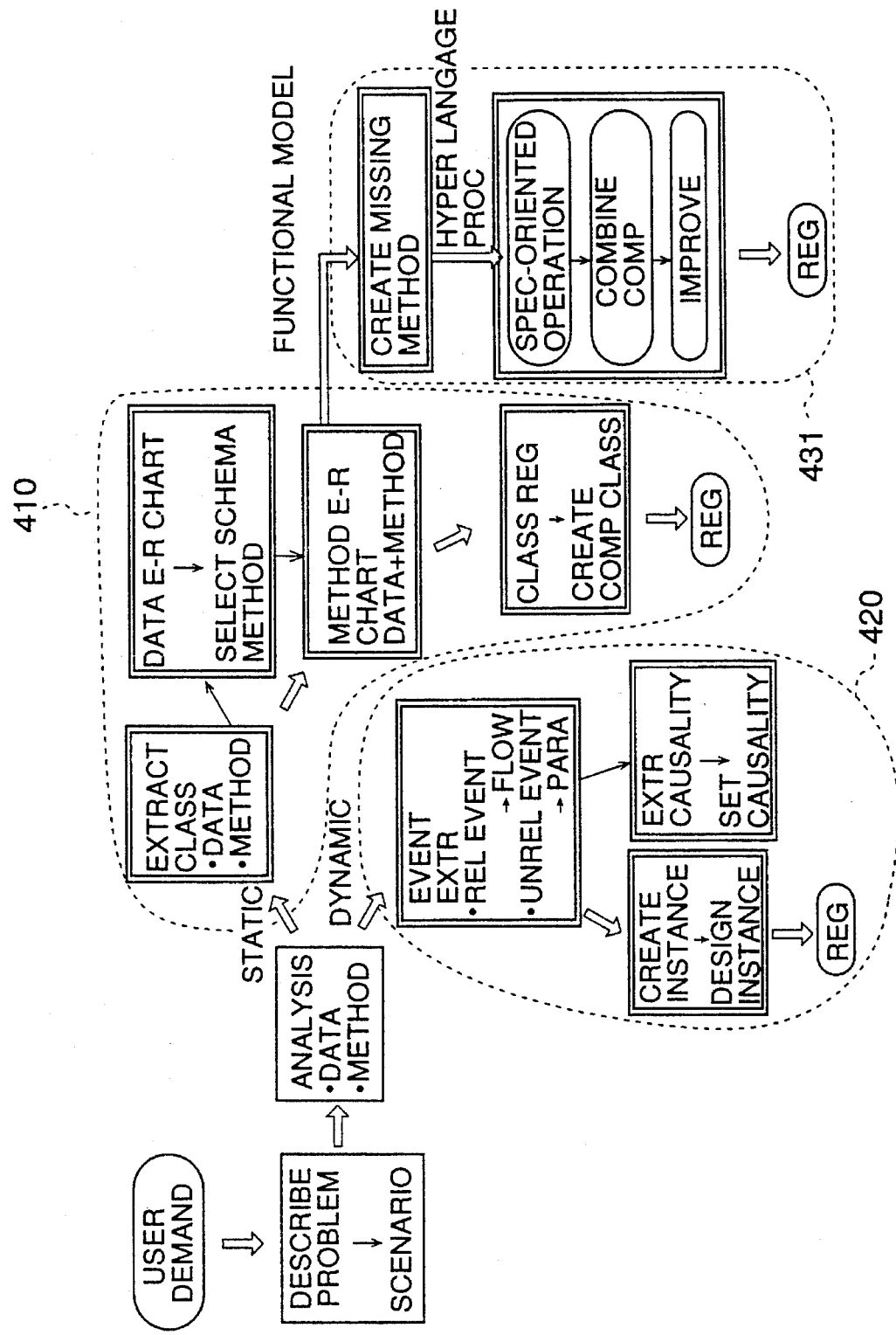
FIG. 46 is a diagram for explaining the object-oriented designing that forms the background of the present invention.

FIG. 46 shows the object-oriented system designing that forms the background of the present invention, wherein FIG. 46 shows the static world 410, dynamic world 420 and the functional world 431 similarly to FIGS. 8 and 9.

Referring to FIG. 46, the process proceeds as follows.
(1) The user creates a request about the system design.
(2) Description is made about the problems related to the request, and a scenario for defining the specification is created.
(3) Next, an analysis is made about the data and methods that are needed as well as the data and methods that are available.

Figure 2:
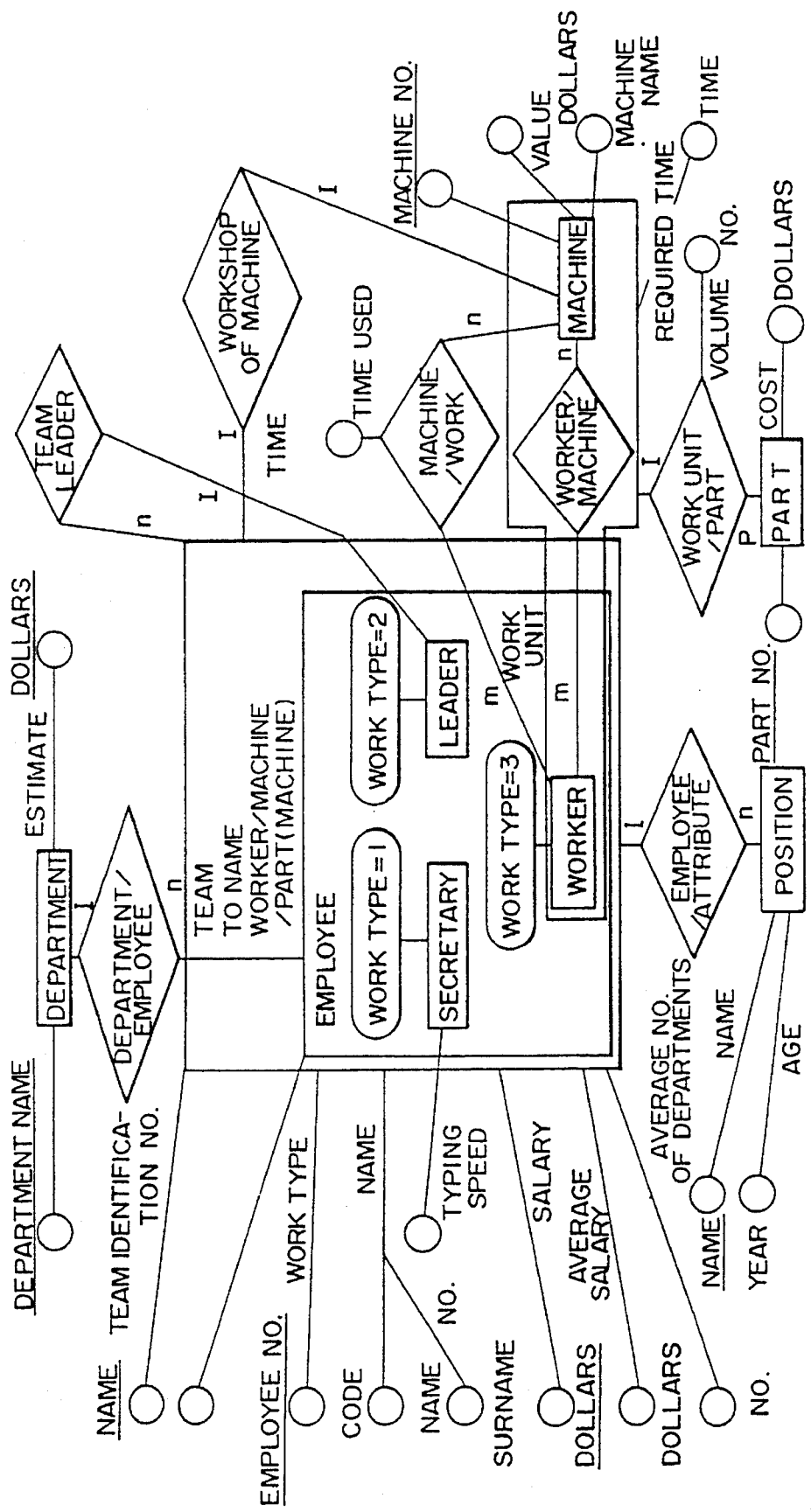
FIG. 2 is a diagram showing an example of modeling of a company organization.
Figure 3:
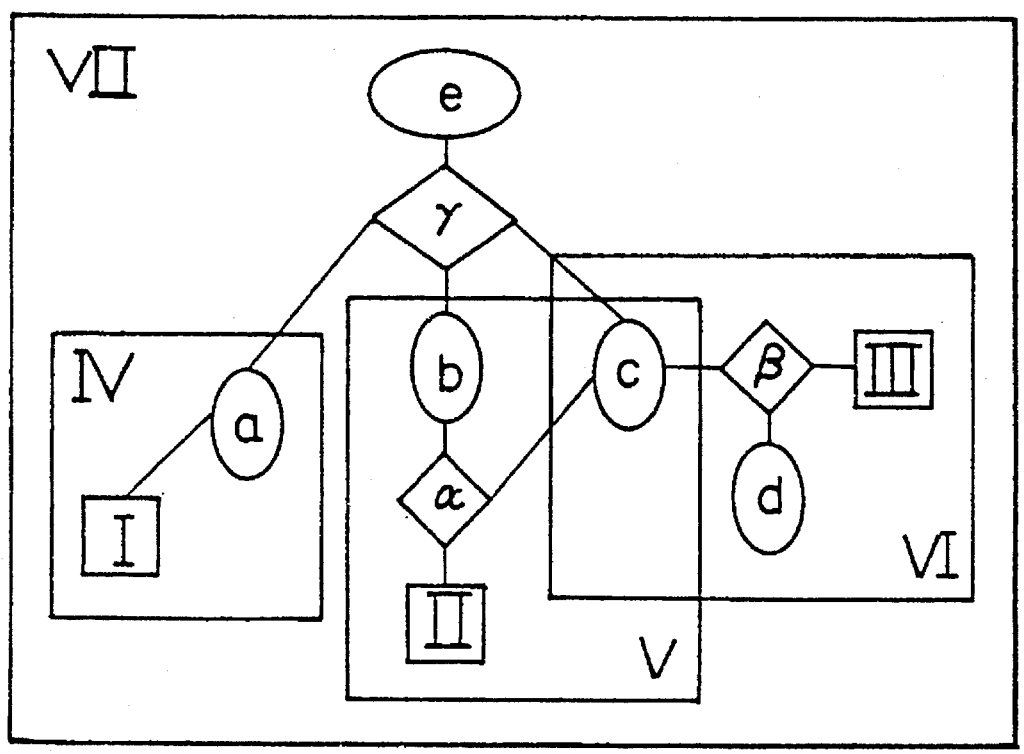
FIG. 3 is a diagram showing the abstraction of a model.

(4) Based upon the analysis, the extraction of necessary classes is made in the static world 410, and the entity-relation (E-R) charts such as the one shown in FIG. 2 are created for the necessary data and necessary methods. Further, the methods for the schema are selected based upon the E-R chart thus obtained. Furthermore, the data and the methods are properly related based upon the E-R chart of the methods.

(5) Once the E-R chart is obtained, the classes are created and registered as indicated in FIG. 7, 12, 13 or 14. Further, composite classes are created.

(6) In the dynamic world 420, a flowchart is created about the related events, and the events that can be processed parallel are determined. Further, the instances are created as indicated in FIG. 7, 12, 13 or 14, and the sequence is designed. Further, the causality is extracted in relation to the determination of the events that can be processed in parallel, and the causality is represented in the static world in the form of the state table 414 as indicated in FIG. 7 or FIG. 28.

(7) Based upon the instance thus obtained, it becomes possible to meet the request of the user. Further, the classes and the composite classes thus obtained are kept as the functional model 431 for future reuse. In addition, those methods that are needed for the creation of the class but not existing, are created, and the methods thus created are also registered for future reuse. The creation of the missing methods is achieved by the processing shown in FIG. 7, 10 or ! 1 that corresponds to the processing of the hyper language processing unit 222, wherein an improvement is made based upon the provisional operation conducted for various combinations of the components.

Figure 47:
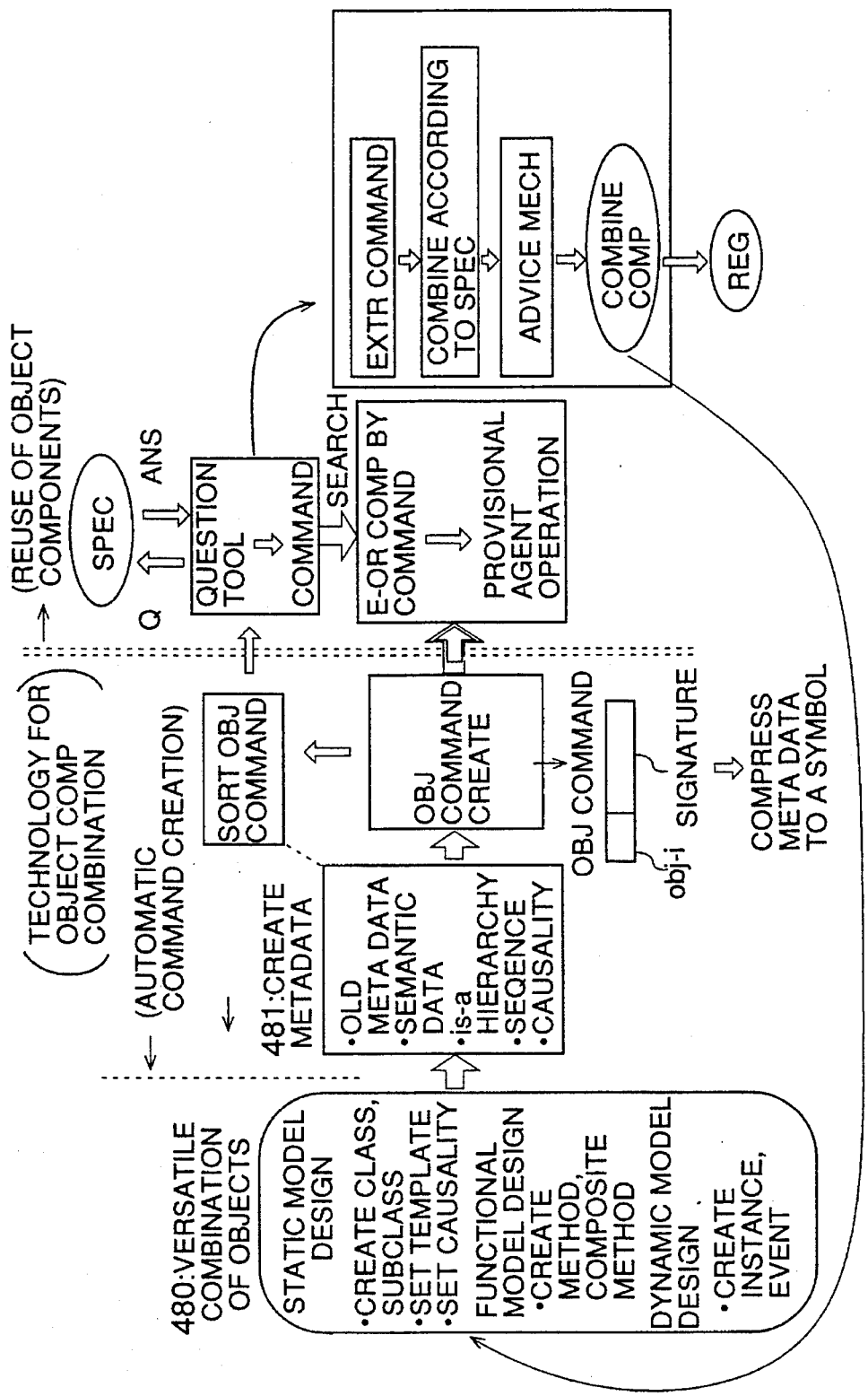
FIG. 47 is a diagram for explaining the mode of using objects.

FIG. 47 shows the reuse of the object, wherein the right half of FIG. 47 represents the processing in the static world 410, the dynamic world 420 or the functional model 431 of FIG. 46, while the left half of FIG. 47 represents the technology for combining the object components.

The technology for combining the object components shown in the left half of FIG. 47 corresponds to the processing shown in FIG. 7, FIG. 12, FIG. 13 or FIG. 14. Further, the creation of the metadata 481 corresponds to the creation of the metadata shown in FIG. 16, FIG. 17 or FIG. 18. Furthermore, the object command 201 of FIG. 47 corresponds to the object command shown in FIG. 18 and is created in correspondence to each of the object components 206 in which the metadata and the real data are combined as indicated in FIG. 17 or FIG. 18.

The object commands 201 thus created are sorted automatically and held in the freely available state. Thus, the object command 201 is used in the inquiry tool of the reuse technology of the object command shown in the right half of FIG. 47. Thus, a necessary object component 206 is called based upon the object command when reusing the same.

Figure 48:
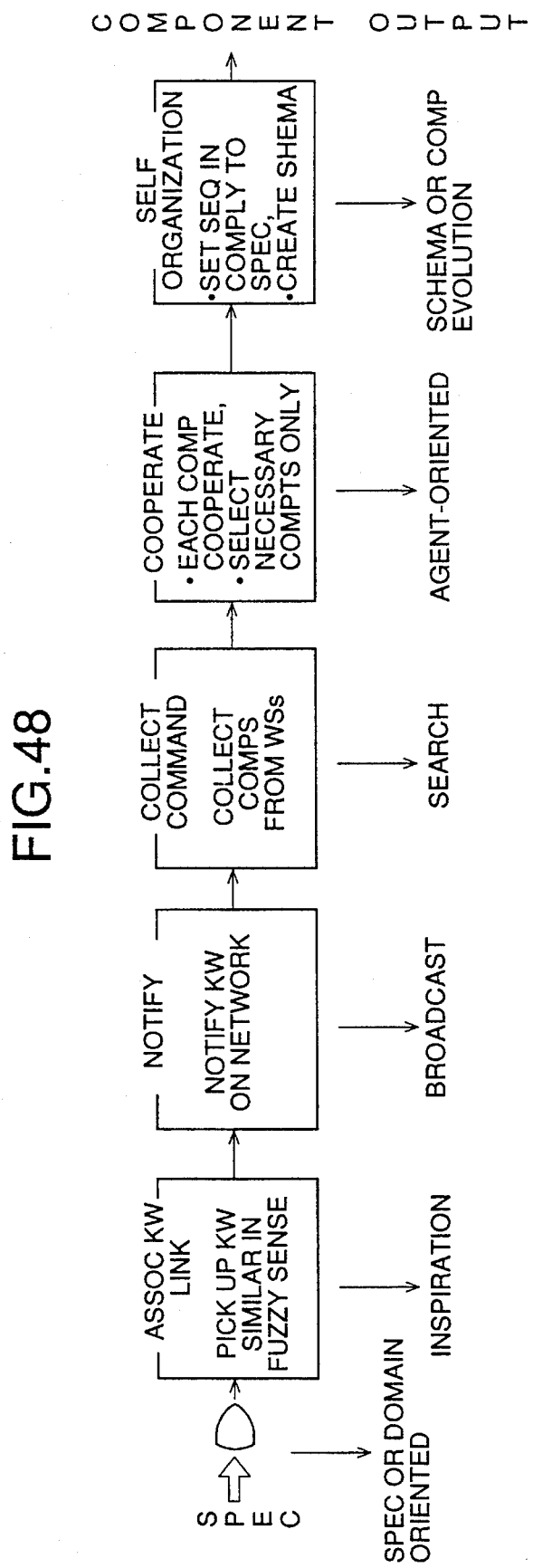
FIG. 48 is a diagram showing the mode of creating object components according to a spec-oriented process.

FIG. 48 shows the creation of the object components according to the spec-oriented process. The process of FIG. 48 proceeds as follows.

(A) When a specification for a new demand of processing is given, keywords are linked by means of association. In other words, those keywords that are similar in the fuzzy sense are extracted. This procedure may be achieved according to a type of "inspiration".

(B) In this step, the terminal notifies the keyword thus obtained to the other terminal on the LAN or other network. This procedure is conducted by the broadcasting shown in FIGS. 32 - 37.

(C) In this step, corresponding object components 206 and object commands 201 are collected from each of the terminals or work stations.

(D) In this step, the object command that matches the specification is obtained from the object components 206 of the terminals.

(E) In this step, the sequence is assembled according to the given specification and create the schema.

As described heretofore, the present invention existing objects held in the concealed world or objects that are newly created are incorporated by the object command in accordance to the needs of the user, and the static model and the dynamic model are designed, in accordance with the needs of the user. Thus, the system of the present invention possesses a capability of flexibly complying with the demand of the user and a versatile processing becomes possible. Further, the object components thus created are accumulated for future reuse.

Further, the present invention is not limited to the embodiments described heretofore, but various variations and modifications may be made without departing from the scope of the invention.

What is claimed is:

1. An object-oriented data processing system for processing an object model, said object model including a plurality of objects combined with each other, each of said objects being formed of data and methods, said object-oriented data processing system comprising:

an external definition for each of said objects for identifying each of said objects, said external definition including an identifier that identifies said objects;

an internal definition for each of said objects for carrying out a procedure of said object, said internal definition including, in each of said objects, the identifier of the same object in said external definition;

model classification means for classifying said object model, from said external definition, into a static model that indicates a relationship between classes, and a dynamic model that indicates the time sequential relationship between instances of said classes as a session;

causality restriction means for imposing a causality existing between said static model and said dynamic model, to said static model;

class generation means for creating a class by combining existing and/or newly created methods; and instance generation means for creating an instance for each of said classes, wherein said class include a composite class formed of a plurality of classes.

2. An object-oriented data processing system as claimed in claim 1, wherein said existing and/or newly created methods and said class and/or composite class are held in a concealed area corresponding to said internal definition as a functional component, said system further including an internal schema for creating said classes and instances, said internal schema comprising: a class schema that gathers one or more methods as current methods to create a class as a current class and describes the name of said one or more current methods as a current method name; and an instance schema for creating an instance by substituting particular instance data to general variables in a class, such that said instance is linked to the method described in said class schema, wherein said object-oriented data processing system models a desired processing by said static model and said dynamic model such that said static model indicates a relationship between said current classes and/or methods and other classes and/or methods and such that said dynamic model indicates a time sequential relationship between said current instances and other instances;

said object-oriented data processing system executing said instances of said dynamic model such that the progress of said instances does not violate said causality imposed between said classes in said static model.

3. An object-oriented data processing system as claimed in claim 1, wherein said static model includes a description about a mutual relationship between said plurality of methods and/or plurality of classes, including hierarchy, and wherein said object-oriented data processing system causes, with the progress of execution of said instances in said dynamic model, an inheritance of information from one method and/or class to another method and/or class that are related with each other by said mutual relationship.

4. An object-oriented data processing system as claimed in claim 1, wherein said static model includes a state table, said object-oriented data processing system referring to the content of said state table each time the session is started, said object-oriented data processing system describing the result of operation each time the session is finished.

5. An object-oriented data processing system as claimed in claim 1, wherein said object-oriented data processing system further comprises:

a component attribute file for holding said objects in the form of object components, said object component being formed of entity data that constitutes an object and metadata that describes the nature of said object; and object management means for communicating with said object components in said component attribute file for executing said desired processing;

said object-oriented data processing system identifying said object component by a corresponding object command;

said object command including therein: a signature that contains description of said metadata in a compressed form and hierarchical information that describes a hierarchical relationship between said classes; and an object identification for representing the instance that corresponds to said entity data, said signature and said object identification being combined to form a code;

said object-oriented data processing system performing said desired processing by combining one or more object components by identifying said object component by means of said object command.

6. An object-oriented data processing system as claimed in claim 5, wherein said signature comprises a header for describing information including the information about location of various information within said signature, a description area for accommodating description of the object corresponding to said signature in a compressed form, hierarchical information for representing the hierarchical relationship of said object with respect to other objects, and sequence information about the order of execution of smaller objects within said object.

7. An object-oriented data processing system as claimed in claim 5, wherein said hierarchical information in said signature about said hierarchical relationship between said classes, is described by means of a code, such that the code includes a symbol for representing a highest class, a symbol for representing a second highest class belonging to said highest class, a symbol for representing a third highest class belonging to said second highest class, and the like, said symbols being arranged in order.

8. An object-oriented data processing system as claimed in claim 1, wherein said object-oriented data processing system further comprises:

a component attribute file for holding said objects in the form of object components, said object component being formed of entity data that constitutes an object and metadata that describes the nature of said object; and object management means for communicating with said object components in said component attribute file for executing said desired processing; and an internal schema for creating said object components, said internal schema at least including: a class schema for describing in said data, at least a method identification that points one or more methods incorporated into said own class in a manner to allow modification; and an instance schema for incorporating therein the instance data used by said incorporated methods in a manner to allow modification; said class schema including therein a sequence schema that represents the order of use of those methods that are incorporated in the own class;

said method identification described in said class schema and the content of said instance schema 316 being connected by a link;

said object-oriented data processing system transmitting said class schema, said instance schema and said methods to other object-oriented data processing systems via a communication channel.

9. An object-oriented data processing system as claimed in claim 8, wherein said object management means incorporates, upon reception of a message indicating an activation of an instance that is specified by one of said instance schema and by the class that is related to said instance schema: said instance schema corresponding to said instance; and a corresponding class schema based upon the class name described in said instance schema; said object management unit activating said methods indicated by said class schema according to a sequence.

10. An object-oriented data processing system as claimed in claim 9, wherein said object management means checks, when activating said class upon reception of said message from another data processing system in the form of command, whether or not there exists a class schema corresponding to said class and receives a transfer of said class schema when said class schema is missing, said object management means further checks whether or not said object-oriented data processing system to which said object management means belongs, includes one or more methods that are described in the existing class schema or in the transferred class schema, said object management means setting a link, when said one or more methods exist, upon those existing methods, said object management means setting a link, when said one or more methods do not exist, upon said methods after said transfer via said communication channel.

11. An object-oriented data processing system as claimed in claim 10, wherein said object management unit checks, when activating said instance upon reception of said message from said other data processing system in the form of command, whether or not there exists an instance schema corresponding to said instance and receives a transfer of said instance schema when said instance schema is missing, said object management means checks the name of the class described in said instance schema that exists already or in said transferred instance schema and activates said class, said object management means further checks whether or not a class schema corresponding to said class exists in said own object-oriented data processing system and receives the said class schema when said class schema does not exist.

12. An object-oriented data processing system as claimed in claim 1, wherein said object-oriented data processing system forms a terminal, a plurality of said terminals being connected with each other by a network, said terminals executing a processing according to own program based upon own data subjected to processing;

said terminals transmitting said data subjected to processing and/or program with each other;

wherein said network includes a three-layer communication network comprising:

a main line for transmitting fundamental format that includes transmission side terminal identification and a reception side terminal identification, and a data format indicating the method of processing data to be transmitted;

a control line for broadcasting, from own terminal, an inquiry about the location of said data subjected to processing and/or program absent in said own terminal, with an identification of said own terminal attached thereto; and a sub-line for transmitting said data subjected to processing and/or program with a speed substantially higher than a speed of said main line, said main line being used for ordinary communication.

13. An object-oriented data processing system as claimed in claim 12, wherein said there-layer communication network comprises a broadband integrated service digital network.

14. An object-oriented data processing system as claimed in claim 12, wherein said sub-line carries a transmission with a format that includes a transmission side terminal identification, a reception side terminal identification, and data subjected to high speed transmission.

15. An object-oriented data processing system as claimed in claim 12, wherein said main line is used for communication, without sending said inquiry via said control line when the terminal that holds said data subjected to processing and/or program is already known, to urge said terminal that holds said data subjected to processing and/or data such that said requested data subjected to processing and/or program is transmitted to the requesting terminal via said subline with a high speed.

16. An object-oriented data processing system as claimed in claim 1, wherein said object-oriented data processing system introduces a modification object that causes a desired modification in the operation of said object-oriented data processing system, into a combination of objects formed of said objects combined with each other according to said desired processing of said object-oriented data processing system, to form a modified combination of objects, such that said object-oriented data processing system performs a modified processing in accordance with said modified combination of objects.

17. An object-oriented data processing system as claimed in claim 16, wherein said modified objects communicates, in the state that said modified combination of objects is formed, with an object manager and/or other objects forming said modified combination of objects, said object manager managing said objects that form said modified combination of objects, such that a processing corresponding to said modified combination of objects is executed.

18. An object-oriented data processing system as claimed in claim 16, wherein said modified object is incorporated within one or more objects forming said modified combination of objects, said object that includes said modified object communicates, in the state that said modified combination of objects is formed, with an object manager and/or other objects forming said modified combination of objects, said object manager managing said objects that form said modified combination of objects, such that a processing corresponding to said modified combination of objects is executed.

19. An object-oriented data processing system as claimed in claim 16, wherein at least one of said objects that form said modified combination of objects is expanded in a sequential order of processing including branching, to form executionable process data.

20. An object-oriented data processing system as claimed in claim 16, wherein said modified combination of objects as a whole is expanded in a sequential order of processing including branching, to form executionable process data.

21. An object-oriented data processing system as claimed in claim 16, wherein said combination of objects in the state before introducing said modification object is expanded at least partially in a sequential order of processing including branching, to form original executionable process data, said modified combination of objects is expanded at least partially in a sequential order of processing including branching, to form modified executionable process data, wherein said original executionable process data and said modified executionable process data are selectively executed.

22. An object-oriented data processing system as claimed in claim 20, wherein said modified executionable process data is represented by said original executionable process data and differential data representing a difference between said modified executionable process data and said original executionable process data.

23. An object-oriented data processing system as claimed in claim 19, wherein said modified executionable process data is expanded based upon confirmation, by way of simulation, that said modified combination of objects provides said desired modification of processing.

* * * * *

UNITED STATES PATENT AND TRADEMARK OFFICE
CERTIFICATE OF CORRECTION

PATENT NO. : 5,481,718
DATED : January 2, 1996
INVENTOR(S) : Tadamitsu RYU et al.

It is certified that error appears in the above-indentified patent and that said Letters Patent is hereby corrected as shown below:

| | |
|---|---|
| Col. 2, | line 45, change "e" to --α--;<br>line 48, insert --,-- after "VI". |
| Col. 3, | line 12, insert --,-- after "C";<br>line 16, insert --,-- after "B2";<br>line 22, change "orimitive" to --primitive--;<br>line 37, insert --,-- after "words"; |
| Col. 7, | line 29, change "pressing" to --processing--. |
| Col. 8, | line 36, change "a" to --$\underline{a}$--;<br>line 37, change "b" to --$\underline{b}$--. |
| Col. 21, | line 59, change "0f" to --Of--. |
| Col. 22, | line 27, change "A.ID, B.ID" to --A•ID, B•ID--;<br>line 28, change "C.ID" to --C•ID--. |
| Col. 23, | line 20, change "," (first occurrence) to --.--. |
| Col. 26, | line 16, insert --,-- after ")". |

UNITED STATES PATENT AND TRADEMARK OFFICE
CERTIFICATE OF CORRECTION

PATENT NO. : 5,481,718
DATED : January 2, 1996
INVENTOR(S) : Tadamitsu RYU et al.

It is certified that error appears in the above-indentified patent and that said Letters Patent is hereby corrected as shown below:

Col. 32, line 29, insert --,-- after "205"

Col. 35, line 45, change "an" to --a$_1$--.

Signed and Sealed this

Second Day of April, 1996

BRUCE LEHMAN

Attest:

Attesting Officer

Commissioner of Patents and Trademarks